US012086205B2

United States Patent
Mei et al.

(10) Patent No.: US 12,086,205 B2
(45) Date of Patent: Sep. 10, 2024

(54) RANDOM SPARSITY HANDLING IN A SYSTOLIC ARRAY

(71) Applicant: Intel Corporation, Santa Clara, CA (US)

(72) Inventors: Chunhui Mei, San Diego, CA (US); Hong Jiang, El Dorado Hills, CA (US); Jiasheng Chen, El Dorado Hills, CA (US); Yongsheng Liu, San Diego, CA (US); Yan Li, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 17/211,627

(22) Filed: Mar. 24, 2021

(65) Prior Publication Data

US 2022/0309124 A1 Sep. 29, 2022

(51) Int. Cl.
| | |
|---|---|
| *G06F 17/16* | (2006.01) |
| *G06F 7/544* | (2006.01) |
| *G06F 9/30* | (2018.01) |
| *G06F 15/80* | (2006.01) |
| *G06F 17/11* | (2006.01) |

(52) U.S. Cl.
CPC ............ *G06F 17/16* (2013.01); *G06F 7/5443* (2013.01); *G06F 9/3001* (2013.01); *G06F 9/30043* (2013.01); *G06F 15/8046* (2013.01); *G06F 17/11* (2013.01)

(58) Field of Classification Search
CPC ............... G06F 7/5443; G06F 15/8046; G06F 9/30036; G06F 9/3893; G06F 9/5027; G06N 3/048; G06N 3/0495; G06N 3/063; G06N 3/082; G06N 20/00; G06T 1/20
USPC ......................................................... 708/520
See application file for complete search history.

(56) References Cited

U.S. PATENT DOCUMENTS

| | | | |
|---|---|---|---|
| 11,520,853 B2 * | 12/2022 | Nair ...................... G06F 17/153 |
| 2022/0057993 A1 * | 2/2022 | Meng ...................... G06F 17/16 |
| 2022/0261456 A1 * | 8/2022 | Gladding ................ G06F 17/16 |
| 2022/0309124 A1 | 9/2022 | Mei et al. |

FOREIGN PATENT DOCUMENTS

CN 115129464 A 9/2022

* cited by examiner

*Primary Examiner* — Tan V Mai
(74) *Attorney, Agent, or Firm* — Jaffery Watson Mendonsa & Hamilton LLP

(57) ABSTRACT

Matrix multiply units can take advantage of input sparsity by zero gating ALUs, which saves power consumption, but compute throughput does not increase. To improve compute throughput from sparsity, processing resources in a matrix accelerator can skip computation with zero involved in input or output. If zeros in input can be skipped, the processing units can focus calculations on generating meaningful non-zero output.

20 Claims, 39 Drawing Sheets

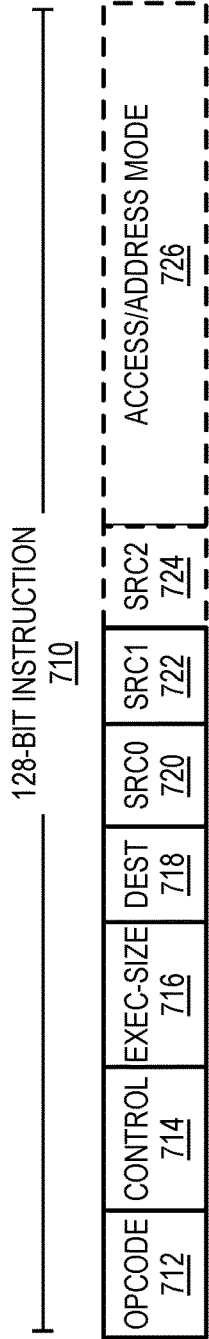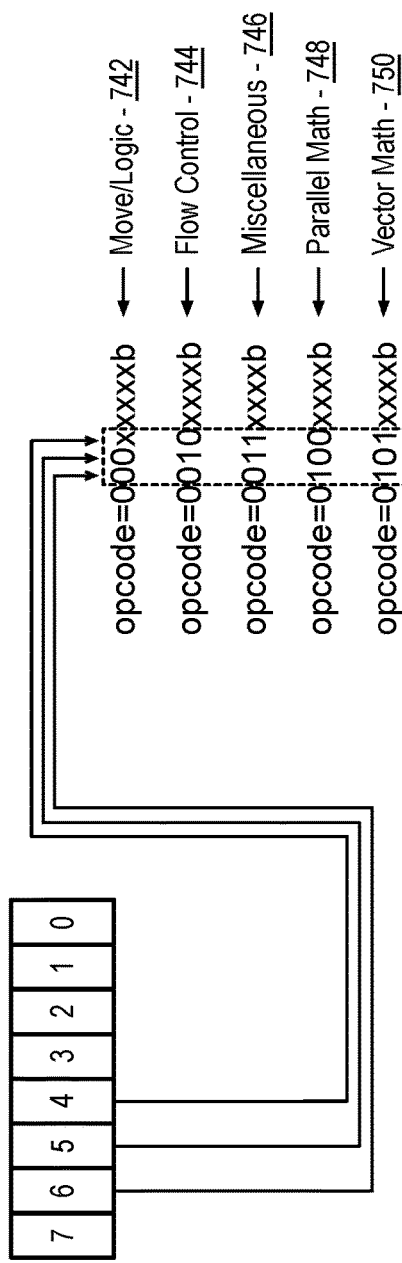
FIG. 7

FIG. 9A GRAPHICS PROCESSOR COMMAND FORMAT 900

FIG. 9B GRAPHICS PROCESSOR COMMAND SEQUENCE 910

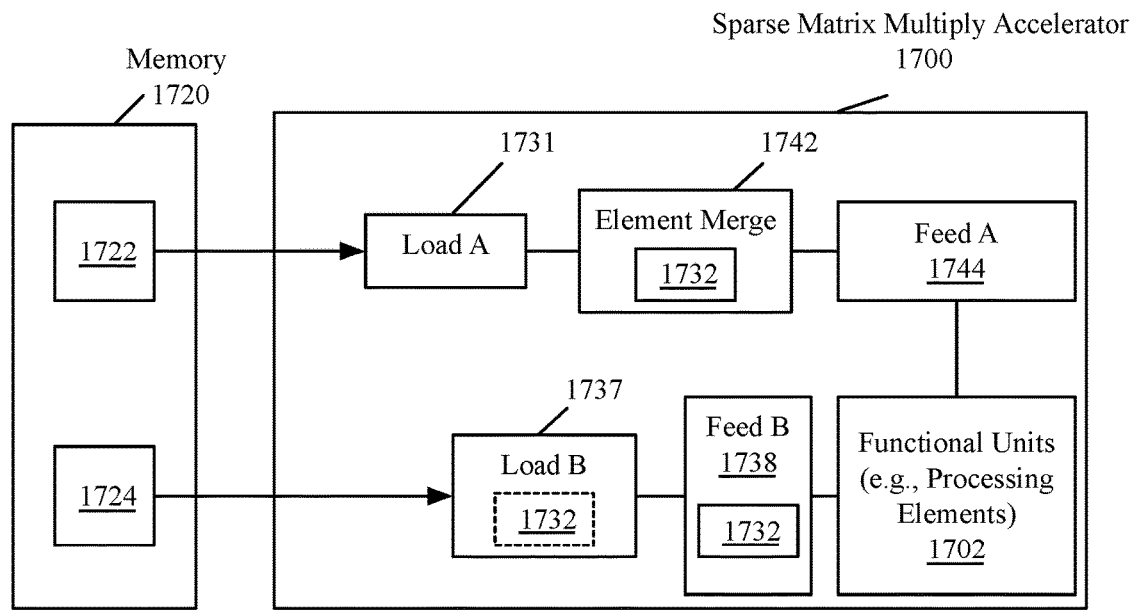
FIG. 17B
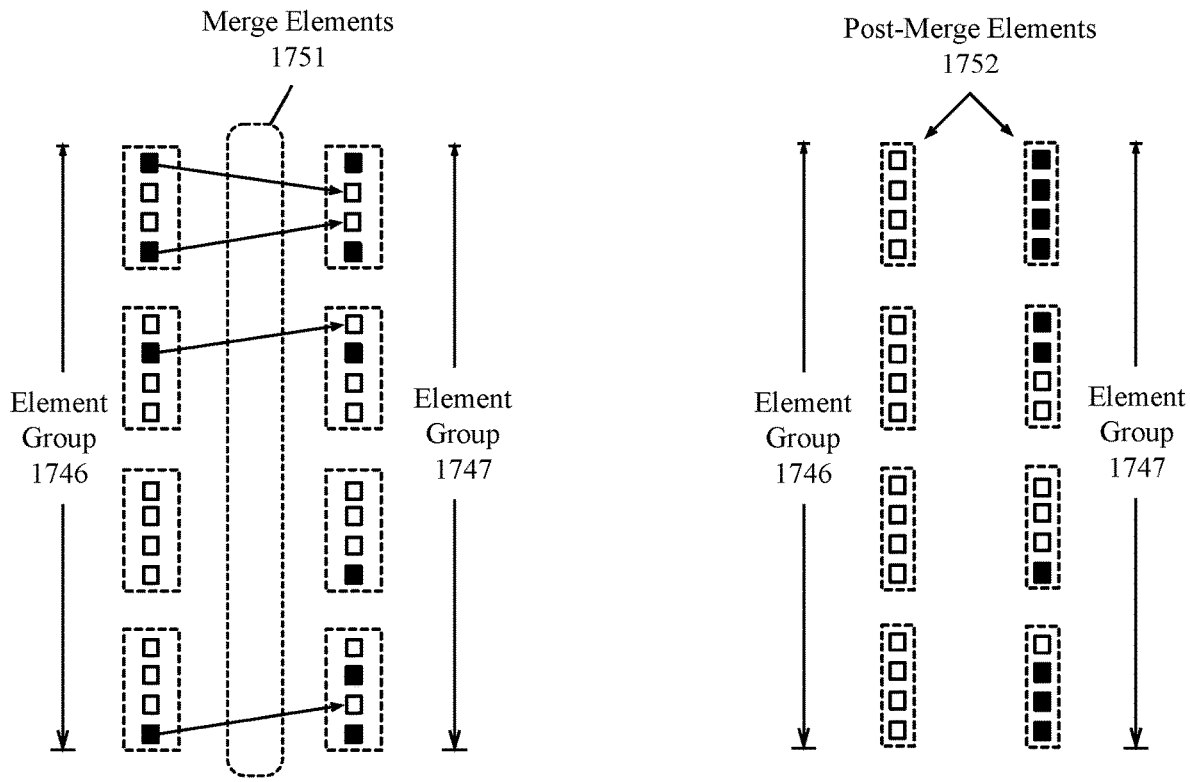
FIG. 17C  FIG. 17D

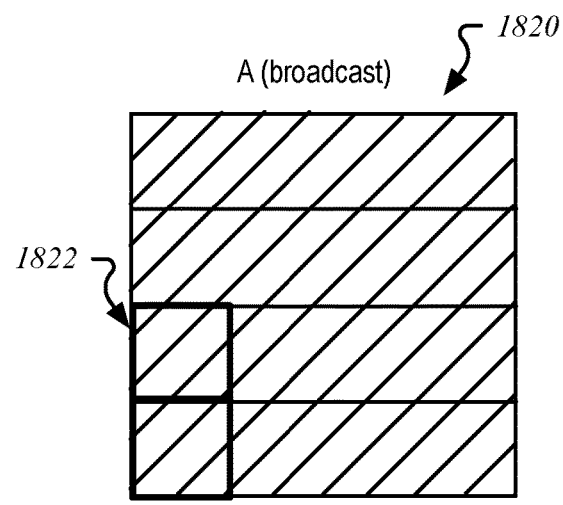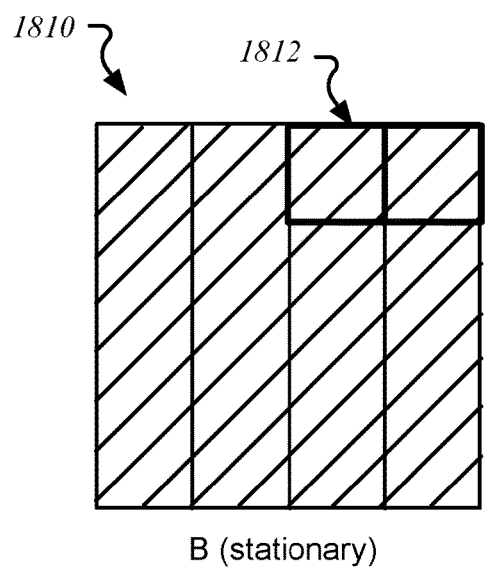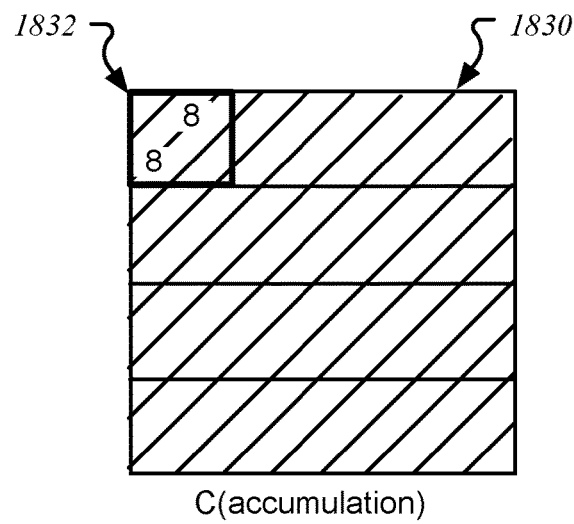
FIG. 18

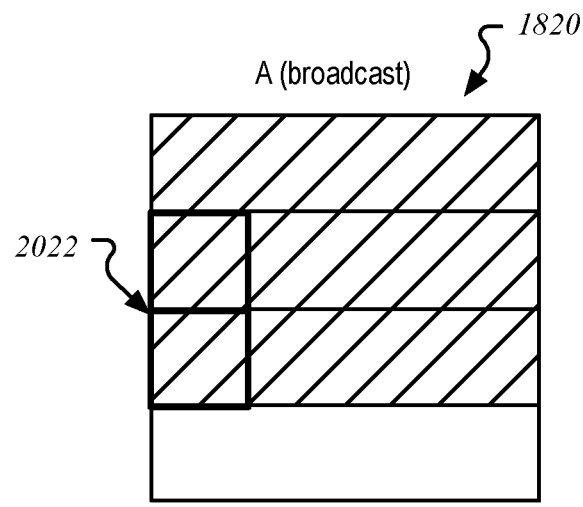
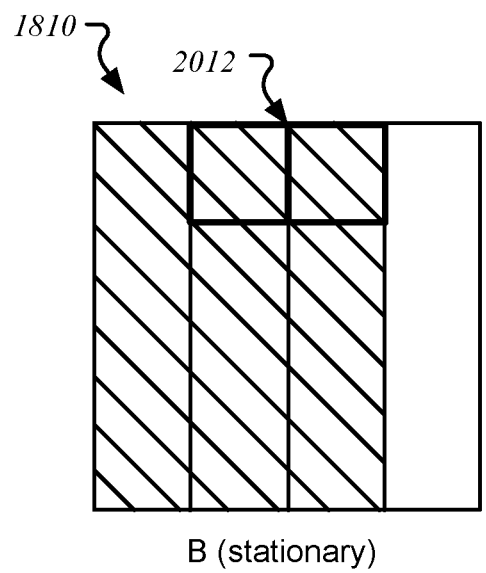
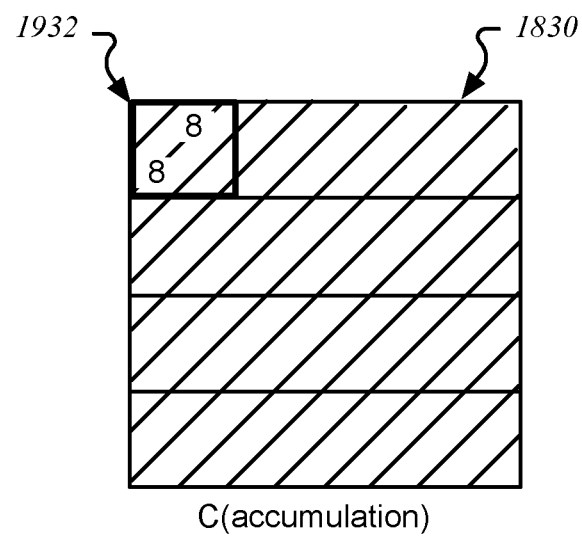
FIG. 20

2500

```
┌─────────────────────────────────────────────────────────────────────┐
│ READ A FIRST SET OF TWO OR MORE TILES OF ELEMENTS ASSOCIATED WITH   │
│                            A FIRST MATRIX                           │
│                                2502                                 │
└─────────────────────────────────────────────────────────────────────┘
                                   │
                                   ▼
┌─────────────────────────────────────────────────────────────────────┐
│ MERGE A FIRST GROUP OF ELEMENTS IN A FIRST TILE OF THE TWO OR MORE  │
│   TILES OF ELEMENTS INTO A SECOND GROUP OF ELEMENTS OF A            │
│ CORRESPONDING GROUP OF ELEMENTS IN A SECOND TILE OF THE TWO OR      │
│                        MORE TILES OF ELEMENTS                       │
│                                2504                                 │
└─────────────────────────────────────────────────────────────────────┘
                                   │
                                   ▼
┌─────────────────────────────────────────────────────────────────────┐
│ READING A SECOND SET OF TWO OR MORE TILES OF ELEMENTS ASSOCIATED    │
│                         WITH A SECOND MATRIX                        │
│                                2506                                 │
└─────────────────────────────────────────────────────────────────────┘
                                   │
                                   ▼
┌─────────────────────────────────────────────────────────────────────┐
│ PERFORMING A MATRIX MULTIPLY OPERATION HAVING INPUT INCLUDING       │
│ THE SECOND GROUP OF ELEMENTS IN THE SECOND TILE AND SELECTED        │
│ ELEMENTS FROM THE SECOND SET OF TWO OR MORE TILES OF ELEMENTS       │
│                                2508                                 │
└─────────────────────────────────────────────────────────────────────┘
```

DURING A MERGE OPERATION, BYPASSING A MERGE OF A FIRST COLUMN OF ELEMENTS INTO A SECOND COLUMN OF ELEMENTS WHEN ALL ELEMENTS OF THE SECOND COLUMN ARE ZERO
2512

DURING A MATRIX MULTIPLY OPERATION, BYPASSING A DOT PRODUCT OPERATION INCLUDING THE SECOND COLUMN OF ELEMENTS WHEN ALL ELEMENTS OF THE SECOND COLUMN ARE ZERO
2514

RANDOM SPARSITY HANDLING IN A SYSTOLIC ARRAY

BACKGROUND

In deep learning applications, random sparsity is very common in all types of data including activations, gradients, and weights. Data sparsity exists in both inference and training cases. The sparsity mainly come from two sources, RELU function and pruning. RELU function clamps negative activation values to zeros which serve as input to next layer; pruning process drops weights that are less important to save storage. Matrix multiply is a foundation of deep learning computation. Zeros in activation, weights, or gradient input to a matrix multiply unit produce zero as result and have no impact on accumulation. If an output element is known to be zero beforehand, the entire compute effort for that element is wasted.

BRIEF DESCRIPTION OF THE DRAWINGS

The present invention is illustrated by way of example and not limitation in the figures of the accompanying drawings in which like references indicate similar elements, and in which:

FIG. 7 is a block diagram illustrating a graphics processor instruction formats according to some embodiments;

FIG. 17A-17D illustrates a sparse matrix multiply accelerator using systolic arrays with feedback inputs;

FIG. 18 illustrates a matrix multiply in which random sparsity is handled via element merges;

FIG. 20 illustrates a successive set of operations that are performed to merge residual input elements during a successive iteration;

FIG. 25A-25C illustrates methods of handling random sparsity of an input matrix during a matrix multiply operation;

DETAILED DESCRIPTION

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1 through 13A-13B provide an overview of exemplary data processing system and graphics processor logic that incorporates or relates to the various embodiments. FIGS. 14-26 provide specific details of the various embodiments. Some aspects of the following embodiments are described with reference to a graphics processor, while other aspects are described with respect to a general-purpose processor, such as a central processing unit (CPU). Similar techniques and teachings can be applied to other types of circuits or semiconductor devices, including but not limited to a many integrated core processor, a GPU cluster, or one or more instances of a field programmable gate array (FPGA). In general, the teachings are applicable to any processor or machine that manipulates or processes image (e.g., sample, pixel), vertex data, or geometry data or that performs parallel processing operations for machine learning and high-performance computing applications.

System Overview

Figure 1:
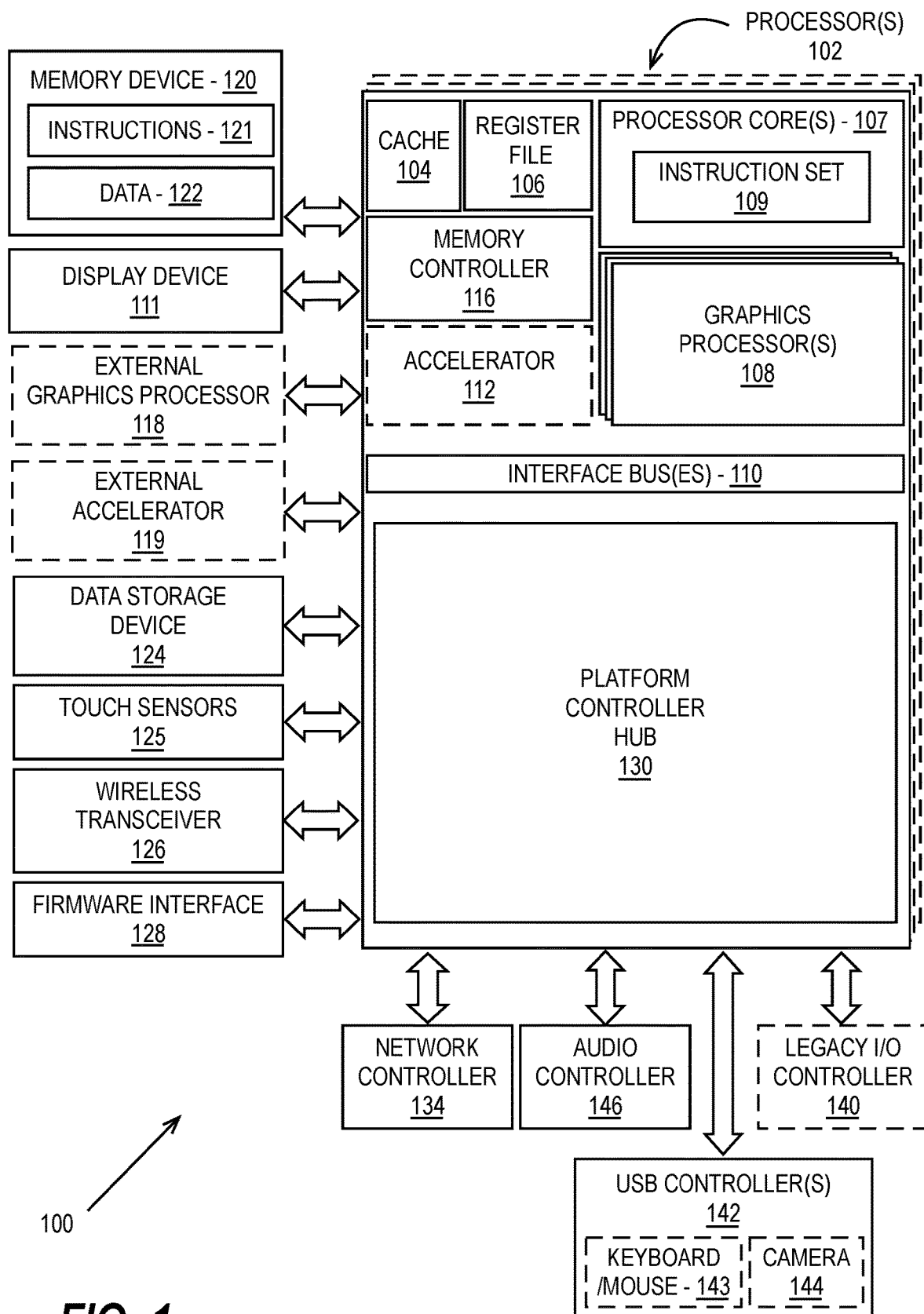
FIG. 1 is a block diagram of a processing system, according to an embodiment.

FIG. 1 is a block diagram of a processing system 100, according to an embodiment. Processing system 100 may be used in a single processor desktop system, a multiprocessor workstation system, or a server system having a large number of processors 102 or processor cores 107. In one embodiment, the processing system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, processing system 100 can include, couple with, or be integrated within: a server-based gaming platform; a game console, including a game and media console; a mobile gaming console, a handheld game console, or an online game console. In some embodiments the processing system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, processing system 100 can include, couple with, or be integrated within a self-driving vehicle such as a bus, tractor trailer, car, motor or electric power cycle, plane or glider (or any combination thereof). The self-driving vehicle may use processing system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the processing system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the processing system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the processing system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124

(e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the processing system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the processing system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the processing system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to processing system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIG. 2A-2D illustrate computing systems and graphics processors provided by embodiments described herein. The elements of FIG. 2A-2D having the same reference numbers (or names) as the elements of any other figure herein can operate or function in any manner similar to that described elsewhere herein, but are not limited to such.

Figure 2A:
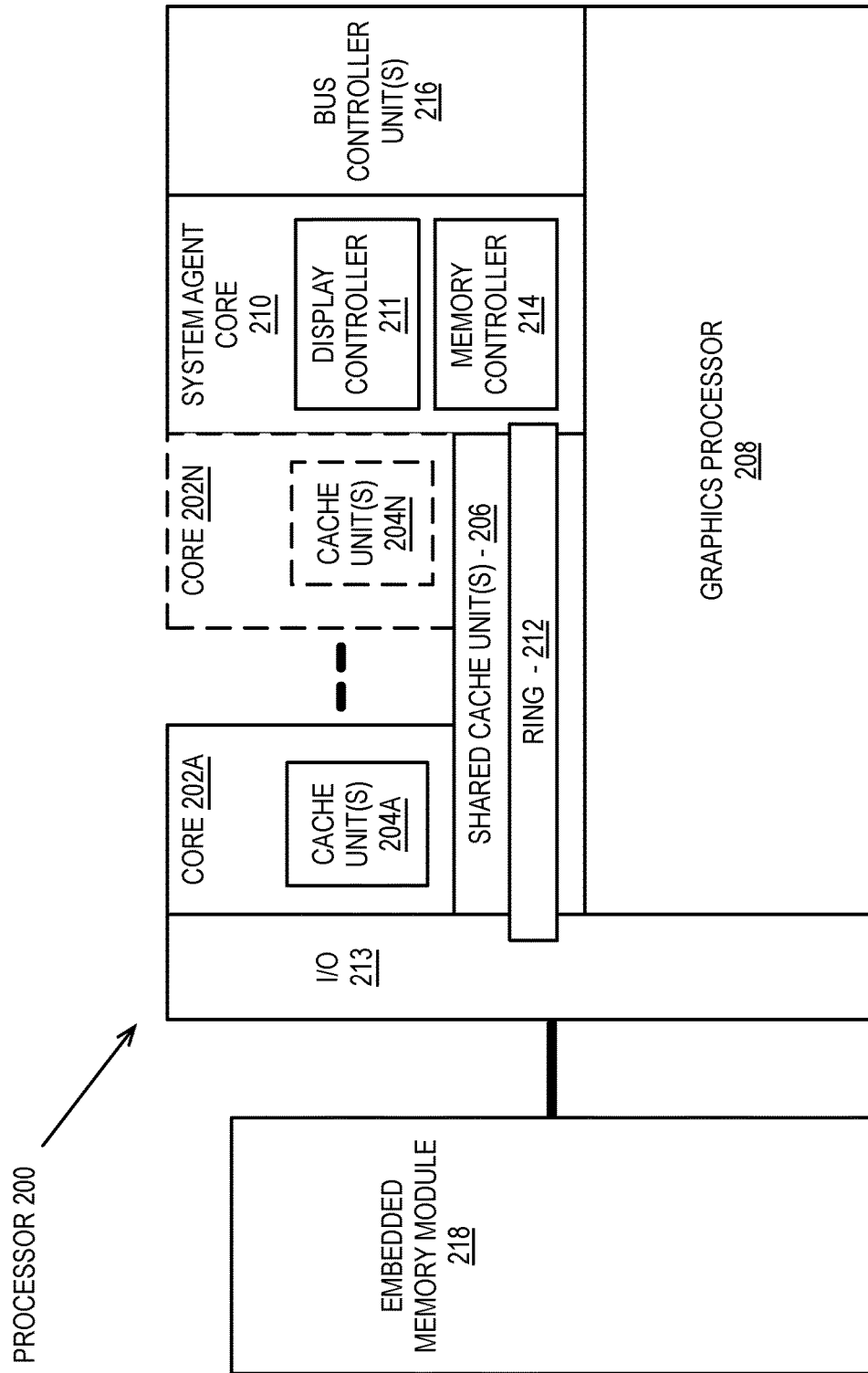
FIG. 2A-2D illustrate computing systems and graphics processors provided by embodiments described herein.

FIG. 2A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring-based interconnect 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring-based interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 can use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 2B:
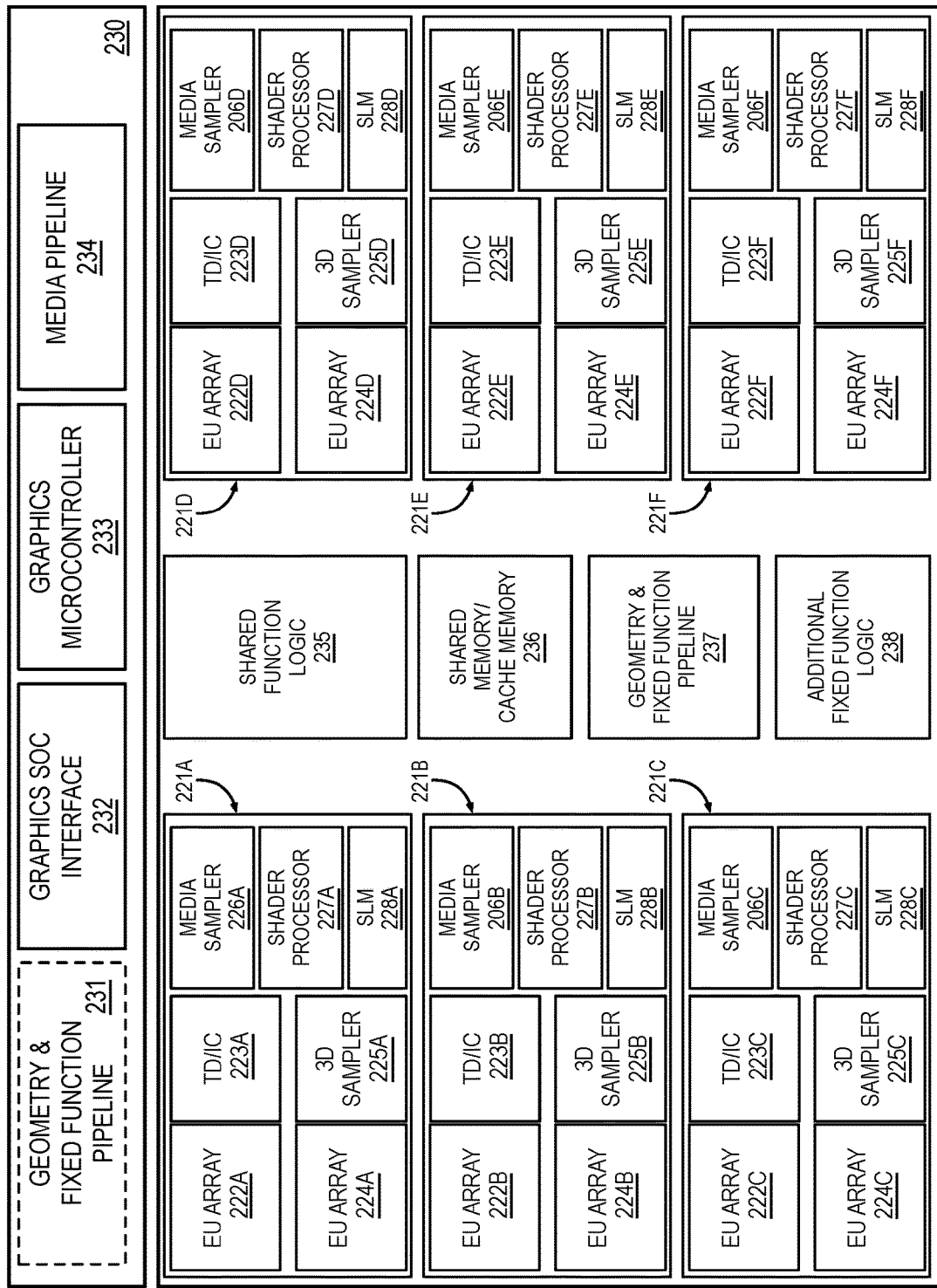

FIG. 2B is a block diagram of hardware logic of a graphics processor core 219, according to some embodiments described herein. Elements of FIG. 2B having the same reference numbers (or names) as the elements of any other figure herein can operate or function in any manner similar to that described elsewhere herein, but are not limited to such. The graphics processor core 219, sometimes referred to as a core slice, can be one or multiple graphics cores within a modular graphics processor. The graphics processor core 219 is exemplary of one graphics core slice, and a graphics processor as described herein may include multiple graphics core slices based on target power and performance envelopes. Each graphics processor core 219 can include a fixed function block 230 coupled with multiple sub-cores 221A-221F, also referred to as sub-slices, that include modular blocks of general-purpose and fixed function logic.

In some embodiments, the fixed function block 230 includes a geometry/fixed function pipeline 231 that can be shared by all sub-cores in the graphics processor core 219, for example, in lower performance and/or lower power graphics processor implementations. In various embodiments, the geometry/fixed function pipeline 231 includes a 3D fixed function pipeline (e.g., 3D pipeline 312 as in FIG. 3A and FIG. 4, described below) a video front-end unit, a thread spawner and thread dispatcher, and a unified return buffer manager, which manages unified return buffers (e.g., unified return buffer 418 in FIG. 4, as described below).

In one embodiment the fixed function block 230 also includes a graphics SoC interface 232, a graphics microcontroller 233, and a media pipeline 234. The graphics SoC interface 232 provides an interface between the graphics processor core 219 and other processor cores within a system on a chip integrated circuit. The graphics microcontroller 233 is a programmable sub-processor that is configurable to manage various functions of the graphics processor core 219, including thread dispatch, scheduling, and pre-emption. The media pipeline 234 (e.g., media pipeline 316 of FIG. 3A and FIG. 4) includes logic to facilitate the decoding, encoding, pre-processing, and/or post-processing of multimedia data, including image and video data. The media pipeline 234 implement media operations via requests to compute or sampling logic within the sub-cores 221-221F.

In one embodiment the SoC interface 232 enables the graphics processor core 219 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core 219 and CPUs within the SoC. The SoC interface 232 can also implement power management controls for the graphics processor core 219 and enable an interface between a clock domain of the graphics processor core 219 and other clock domains within the SoC. In one embodiment the SoC interface 232 enables receipt of command buffers from a command streamer and global thread dispatcher that are configured to provide commands and instructions to each of one or more graphics cores within a graphics processor. The commands and instructions can be dispatched to the media pipeline 234, when media operations are to be performed, or a geometry and fixed function pipeline (e.g., geometry and fixed function pipeline 231, geometry and fixed function pipeline 237) when graphics processing operations are to be performed.

The graphics microcontroller 233 can be configured to perform various scheduling and management tasks for the graphics processor core 219. In one embodiment the graphics microcontroller 233 can perform graphics and/or compute workload scheduling on the various graphics parallel engines within execution unit (EU) arrays 222A-222F, 224A-224F within the sub-cores 221A-221F. In this scheduling model, host software executing on a CPU core of an SoC including the graphics processor core 219 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core 219, providing the graphics processor core 219 with the ability to save and restore registers within the graphics processor core 219 across low-power state transitions independently from the operating system and/or graphics driver software on the system.

The graphics processor core 219 may have greater than or fewer than the illustrated sub-cores 221A-221F, up to N modular sub-cores. For each set of N sub-cores, the graphics processor core 219 can also include shared function logic 235, shared and/or cache memory 236, a geometry/fixed function pipeline 237, as well as additional fixed function logic 238 to accelerate various graphics and compute processing operations. The shared function logic 235 can include logic units associated with the shared function logic 420 of FIG. 4 (e.g., sampler, math, and/or inter-thread communication logic) that can be shared by each N sub-cores within the graphics processor core 219. The shared and/or cache memory 236 can be a last-level cache for the set of N sub-cores 221A-221F within the graphics processor core 219, and can also serve as shared memory that is accessible by multiple sub-cores. The geometry/fixed function pipeline 237 can be included instead of the geometry/fixed function pipeline 231 within the fixed function block 230 and can include the same or similar logic units.

In one embodiment the graphics processor core 219 includes additional fixed function logic 238 that can include various fixed function acceleration logic for use by the graphics processor core 219. In one embodiment the additional fixed function logic 238 includes an additional geometry pipeline for use in position only shading. In position-only shading, two geometry pipelines exist, the full geometry pipeline within the geometry/fixed function pipeline 231 and a cull pipeline, which is an additional geometry pipeline which may be included within the additional fixed function logic 238. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 238 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 238 can also include machine-learning acceleration logic, such as fixed function matrix multiplication logic, for implementations including optimizations for machine learning training or inferencing.

Within each graphics sub-core 221A-221F includes a set of execution resources that may be used to perform graphics, media, and compute operations in response to requests by graphics pipeline, media pipeline, or shader programs. The graphics sub-cores 221A-221F include multiple EU arrays 222A-222F, 224A-224F, thread dispatch and inter-thread communication (TD/IC) logic 223A-223F, a 3D (e.g., texture) sampler 225A-225F, a media sampler 206A-206F, a shader processor 227A-227F, and shared local memory (SLM) 228A-228F. The EU arrays 222A-222F, 224A-224F each include multiple execution units, which are general-purpose graphics processing units capable of performing floating-point and integer/fixed-point logic operations in service of a graphics, media, or compute operation, including graphics, media, or compute shader/GPGPU programs.

The TD/IC logic 223A-223F performs local thread dispatch and thread control operations for the execution units within a sub-core and facilitate communication between threads executing on the execution units of the sub-core. The 3D sampler 225A-225F can read texture or other 3D graphics related data into memory. The 3D sampler can read texture data differently based on a configured sample state and the texture format associated with a given texture. The media sampler 206A-206F can perform similar read operations based on the type and format associated with media data. In one embodiment, each graphics sub-core 221A-221F can alternately include a unified 3D and media sampler. Threads executing on the execution units within each of the sub-cores 221A-221F can make use of shared local memory 228A-228F within each sub-core, to enable threads executing within a thread group to execute using a common pool of on-chip memory.

Figure 2C:
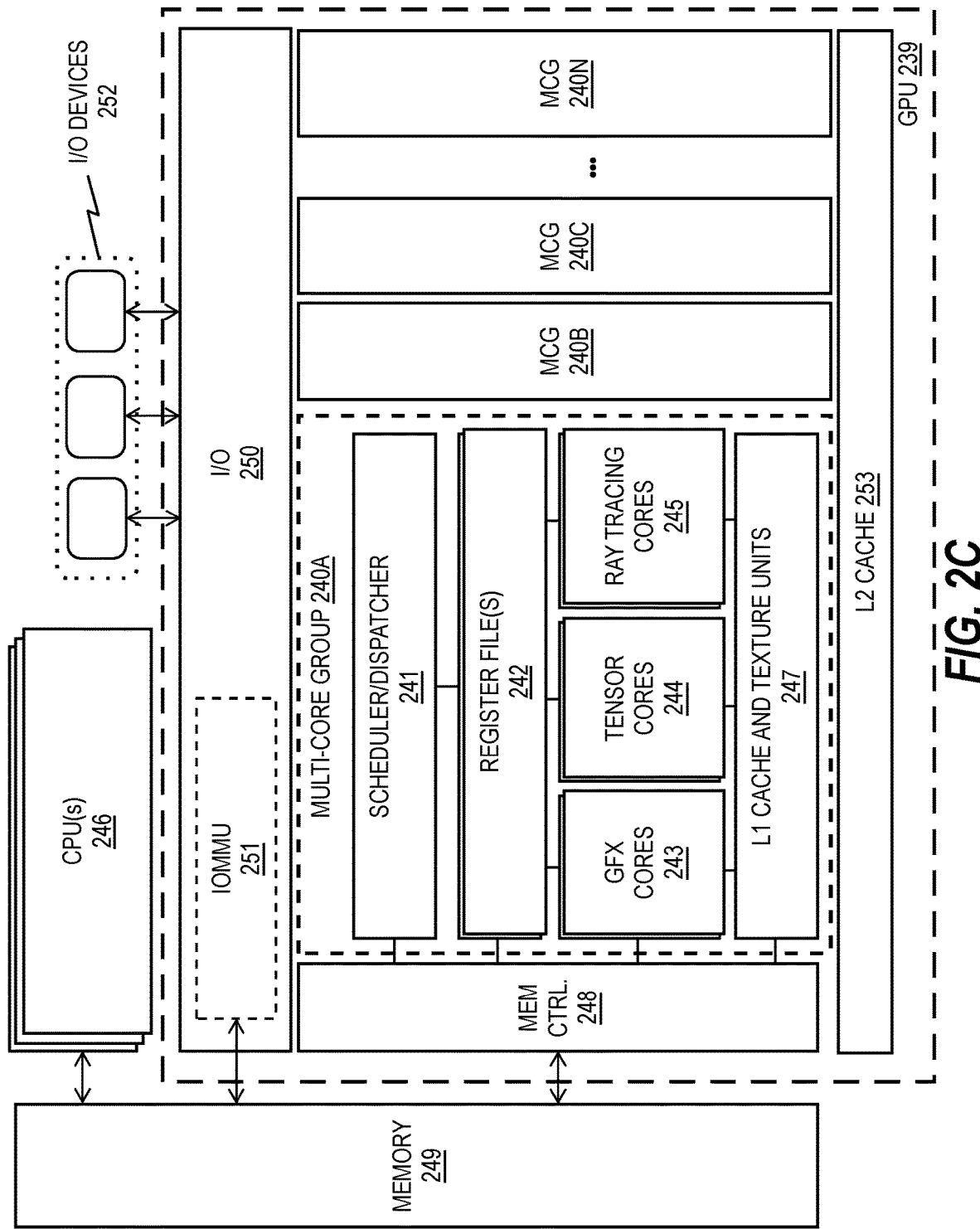

FIG. 2C illustrates a graphics processing unit (GPU) 239 that includes dedicated sets of graphics processing resources arranged into multi-core groups 240A-240N. The details of multi-core group 240A are illustrated. Multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. In one embodiment the tensor cores 244 are sparse tensor cores with hardware to enable multiplication operations having a zero value input to be bypassed.

A set of register files 242 can store operand values used by the cores 243, 244, 245 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the memory 249. In one embodiment, the IOMMU 251 manages multiple sets of page tables to map virtual addresses to physical addresses in memory 249. In this embodiment, the I/O devices 252, CPU(s) 246, and GPU 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPUs 246, GPU 239, and I/O devices 252 are integrated on a single semiconductor chip and/or chip package. The memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles of the invention are not limited to this specific implementation.

In one embodiment, the tensor cores 244 include a plurality of execution units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number of matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles of the invention are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

In one embodiment the ray tracing cores 245 may be adapted to accelerate general-purpose compute operations that can be accelerated using computational techniques that are analogous to ray intersection tests. A compute framework can be provided that enables shader programs to be compiled into low level instructions and/or primitives that perform general-purpose compute operations via the ray tracing cores. Exemplary computational problems that can benefit from compute operations performed on the ray tracing cores 245 include computations involving beam, wave, ray, or particle propagation within a coordinate space. Interactions associated with that propagation can be computed relative to a geometry or mesh within the coordinate space. For example, computations associated with electromagnetic signal propagation through an environment can be accelerated via the use of instructions or primitives that are executed via the ray tracing cores. Diffraction and reflection of the signals by objects in the environment can be computed as direct ray-tracing analogies.

Ray tracing cores 245 can also be used to perform computations that are not directly analogous to ray tracing. For example, mesh projection, mesh refinement, and volume sampling computations can be accelerated using the ray tracing cores 245. Generic coordinate space calculations, such as nearest neighbor calculations can also be performed. For example, the set of points near a given point can be discovered by defining a bounding box in the coordinate space around the point. BVH and ray probe logic within the ray tracing cores 245 can then be used to determine the set of point intersections within the bounding box. The intersections constitute the origin point and the nearest neighbors to that origin point. Computations that are performed using the ray tracing cores 245 can be performed in parallel with computations performed on the graphics cores 243 and tensor cores 244. A shader compiler can be configured to compile a compute shader or other general-purpose graphics processing program into low level primitives that can be parallelized across the graphics cores 243, tensor cores 244, and ray tracing cores 245.

Figure 2D:
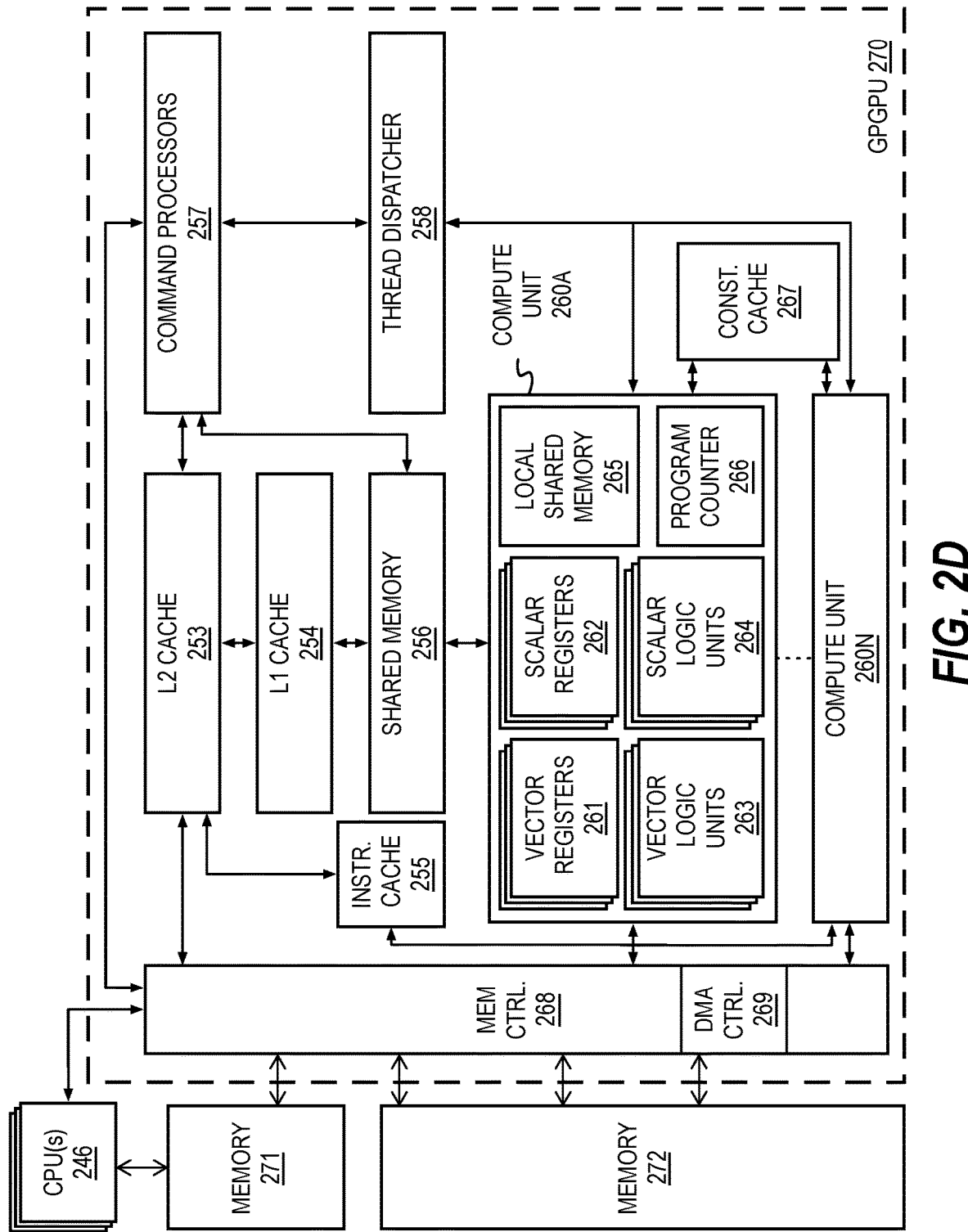

FIG. 2D is a block diagram of general purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. Additionally each compute unit 260A-260N can be independently configured for conditional computation and can conditionally output the results of computation to memory. The command processors 257 can interrupt the one or more CPU(s) 246 when the submitted commands are complete.

Figure 3A:
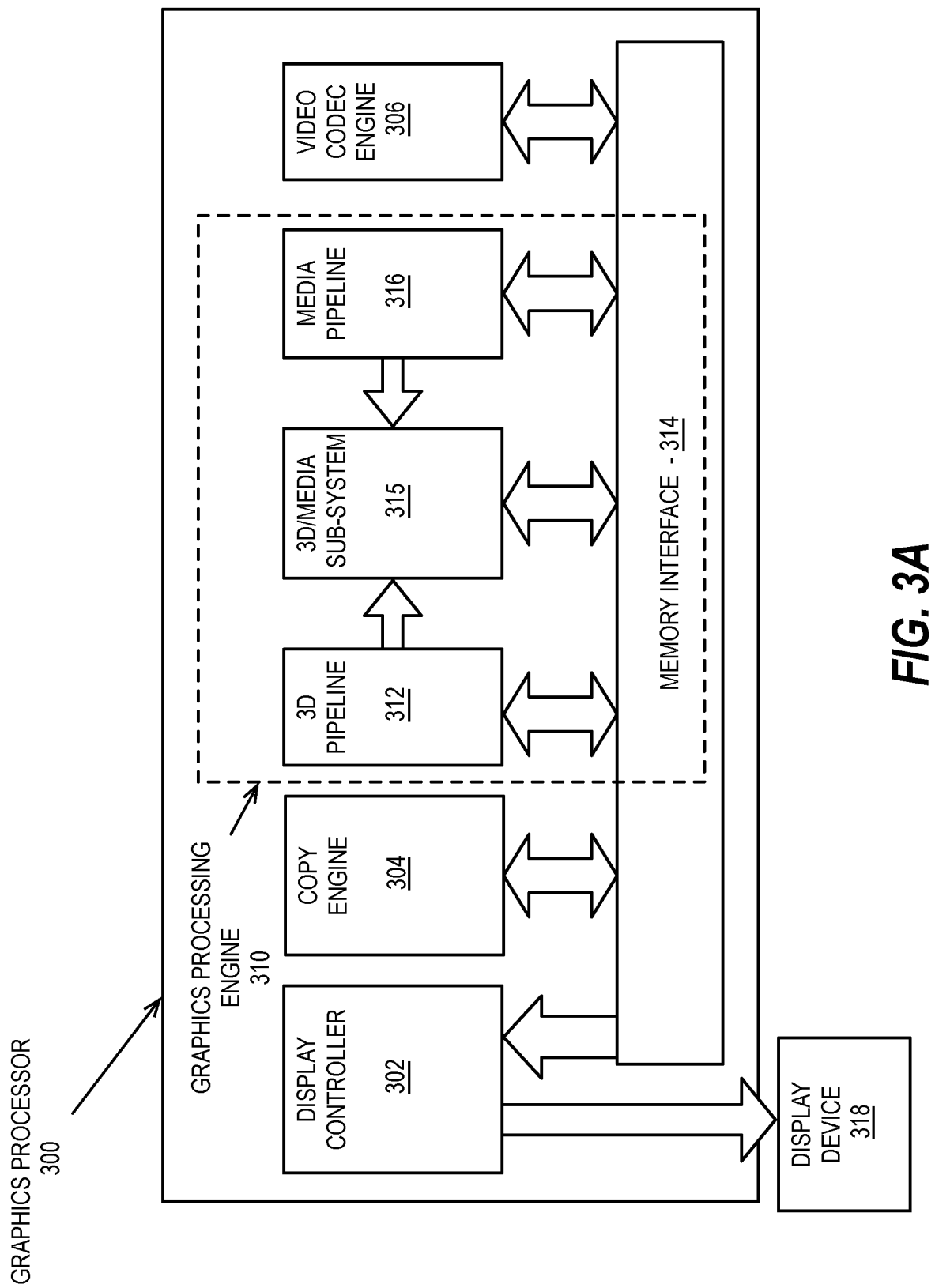
FIG. 3A-3C illustrate block diagrams of additional graphics processor and compute accelerator architectures provided by embodiments described herein.
Figure 3B:
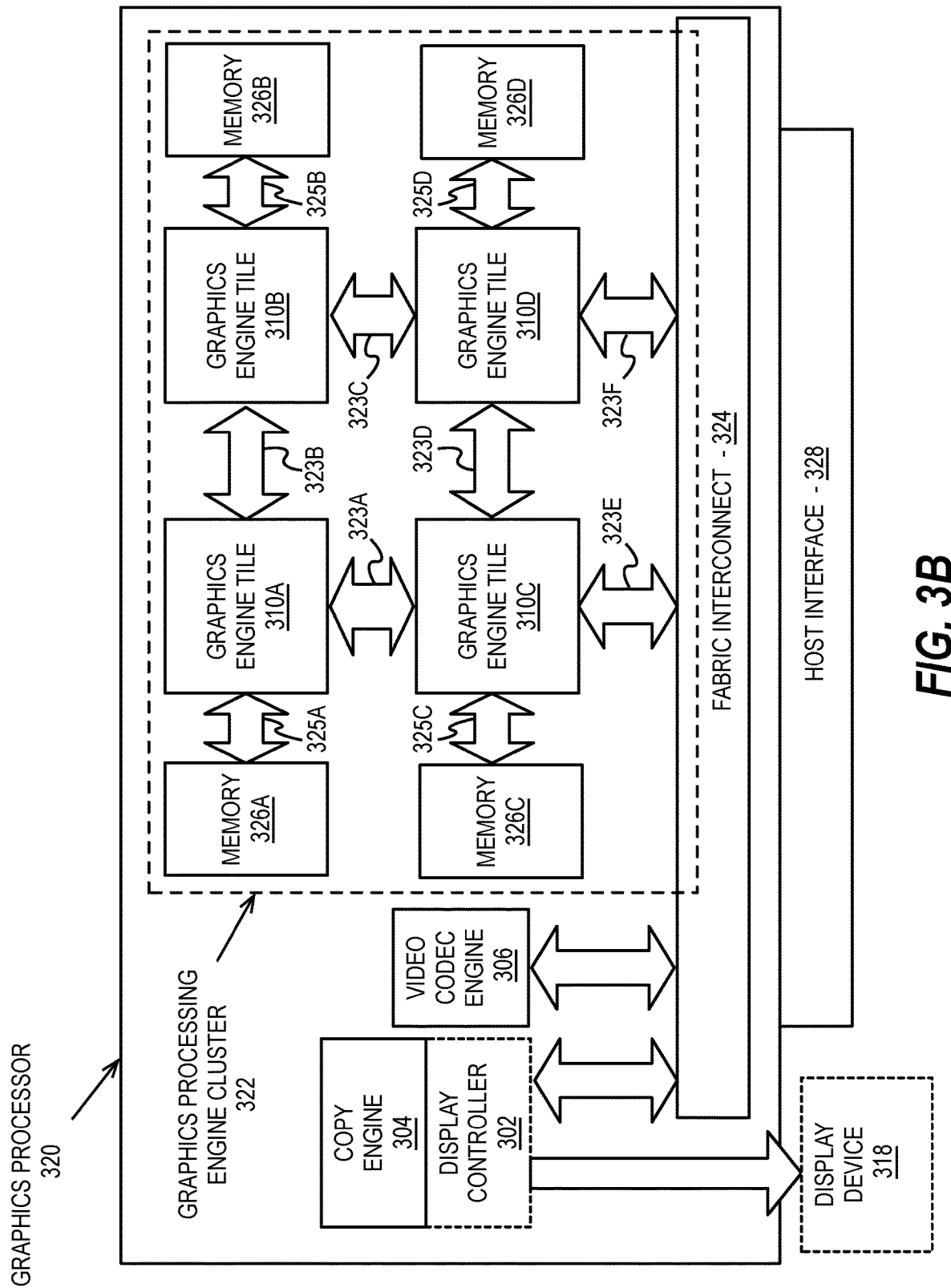
Figure 3C:
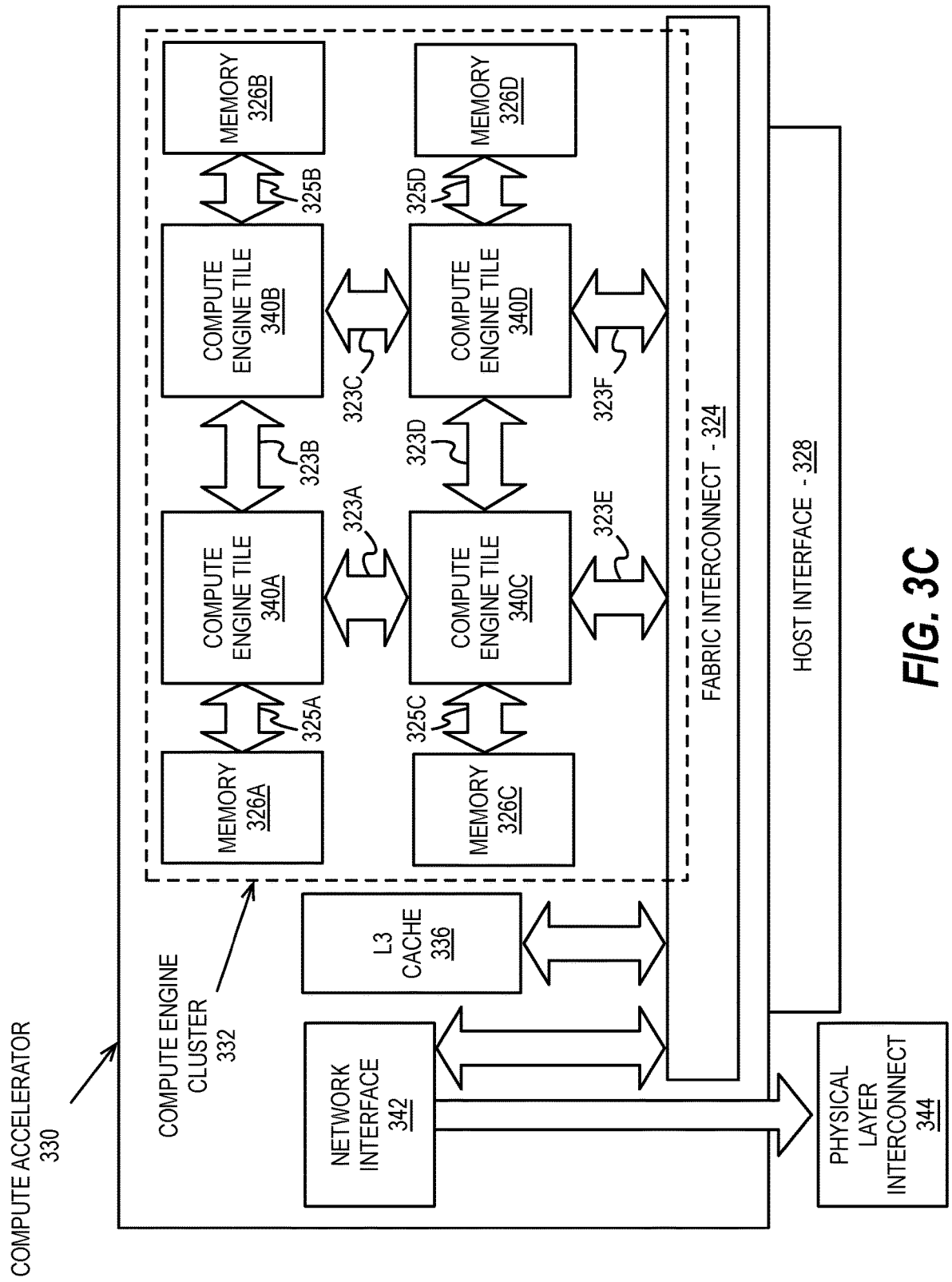

FIG. 3A-3C illustrate block diagrams of additional graphics processor and compute accelerator architectures provided by embodiments described herein. The elements of FIG. 3A-3C having the same reference numbers (or names) as the elements of any other figure herein can operate or function in any manner similar to that described elsewhere herein, but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, AV1 as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media subsystem 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media subsystem 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 3B illustrates a graphics processor 320 having a tiled architecture, according to embodiments described herein. In one embodiment the graphics processor 320 includes a graphics processing engine cluster 322 having multiple instances of the graphics processing engine 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D.

The memory devices 326A-326D can use any graphics memory technology. For example, the memory devices 326A-326D may be graphics double data rate (GDDR) memory. The memory devices 326A-326D, in one embodiment, are high-bandwidth memory (HBM) modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIG. 11B-11D.

The graphics processor 320 may be configured with a non-uniform memory access (NUMA) system in which memory devices 326A-326D are coupled with associated graphics engine tiles 310A-310D. A given memory device may be accessed by graphics engine tiles other than the tile to which it is directly connected. However, access latency to the memory devices 326A-326D may be lowest when accessing a local tile. In one embodiment, a cache coherent NUMA (ccNUMA) system is enabled that uses the tile interconnects 323A-323F to enable communication between cache controllers within the graphics engine tiles 310A-310D to maintain a consistent memory image when more than one cache stores the same memory location.

The graphics processing engine cluster 322 can connect with an on-chip or on-package fabric interconnect 324. In one embodiment the fabric interconnect 324 includes a network processor, network on a chip (NoC), or another switching processor to enable the fabric interconnect 324 to act as a packet switched fabric interconnect that switches data packets between components of the graphics processor 320. The fabric interconnect 324 can enable communication between graphics engine tiles 310A-310D and components such as the video codec engine 306 and one or more copy engines 304. The copy engines 304 can be used to move data out of, into, and between the memory devices 326A-326D and memory that is external to the graphics processor 320 (e.g., system memory). The fabric interconnect 324 can also couple with one or more of the tile interconnects 323A-323F to facilitate or enhance the interconnection between the graphics engine tiles 310A-310D. The fabric interconnect 324 is also configurable to interconnect multiple instances of the graphics processor 320 (e.g., via the host interface 328), enabling tile-to-tile communication between graphics engine tiles 310A-310D of multiple GPUs. In one embodiment, the graphics engine tiles 310A-310D of multiple GPUs can be presented to a host system as a single logical device.

The graphics processor 320 may optionally include a display controller 302 to enable a connection with the display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface. For example, the host interface 328 may be an NVLink or NVSwitch interface. The host interface 328 and fabric interconnect 324 can cooperate to enable multiple instances of the graphics processor 320 to act as single logical device. Cooperation between the host interface 328 and fabric interconnect 324 can also enable the individual graphics engine tiles 310A-310D to be presented to the host system as distinct logical graphics devices.

FIG. 3C illustrates a compute accelerator 330, according to embodiments described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320, or can be different. The graphics compute engine tiles 340A-340D can also be interconnected via a set of tile interconnects 323A-323F and may be connected with and/or interconnected by a fabric interconnect 324. Cross-tile communications can be facilitated via the fabric interconnect 324. The fabric interconnect 324 (e.g., via the host interface 328) can also facilitate communication between compute engine tiles 340A-340D of multiple instances of the compute accelerator 330. In one embodiment the compute accelerator 330 includes a large L3 cache 336 that can be configured as a device-wide cache. The compute accelerator 330 can also connect to a host processor and memory via a host interface 328 in a similar manner as the graphics processor 320 of FIG. 3B.

The compute accelerator 330 can also include an integrated network interface 342. In one embodiment the integrated network interface 342 includes a network processor and controller logic that enables the compute engine cluster 332 to communicate over a physical layer interconnect 344 without requiring data to traverse memory of a host system. In one embodiment, one of the compute engine tiles 340A-340D is replaced by network processor logic and data to be transmitted or received via the physical layer interconnect 344 may be transmitted directly to or from memory 326A-326D. Multiple instances of the compute accelerator 330 may be joined via the physical layer interconnect 344 into a single logical device. Alternatively, the various compute engine tiles 340A-340D may be presented as distinct network accessible compute accelerator devices.

Graphics Processing Engine

Figure 4:
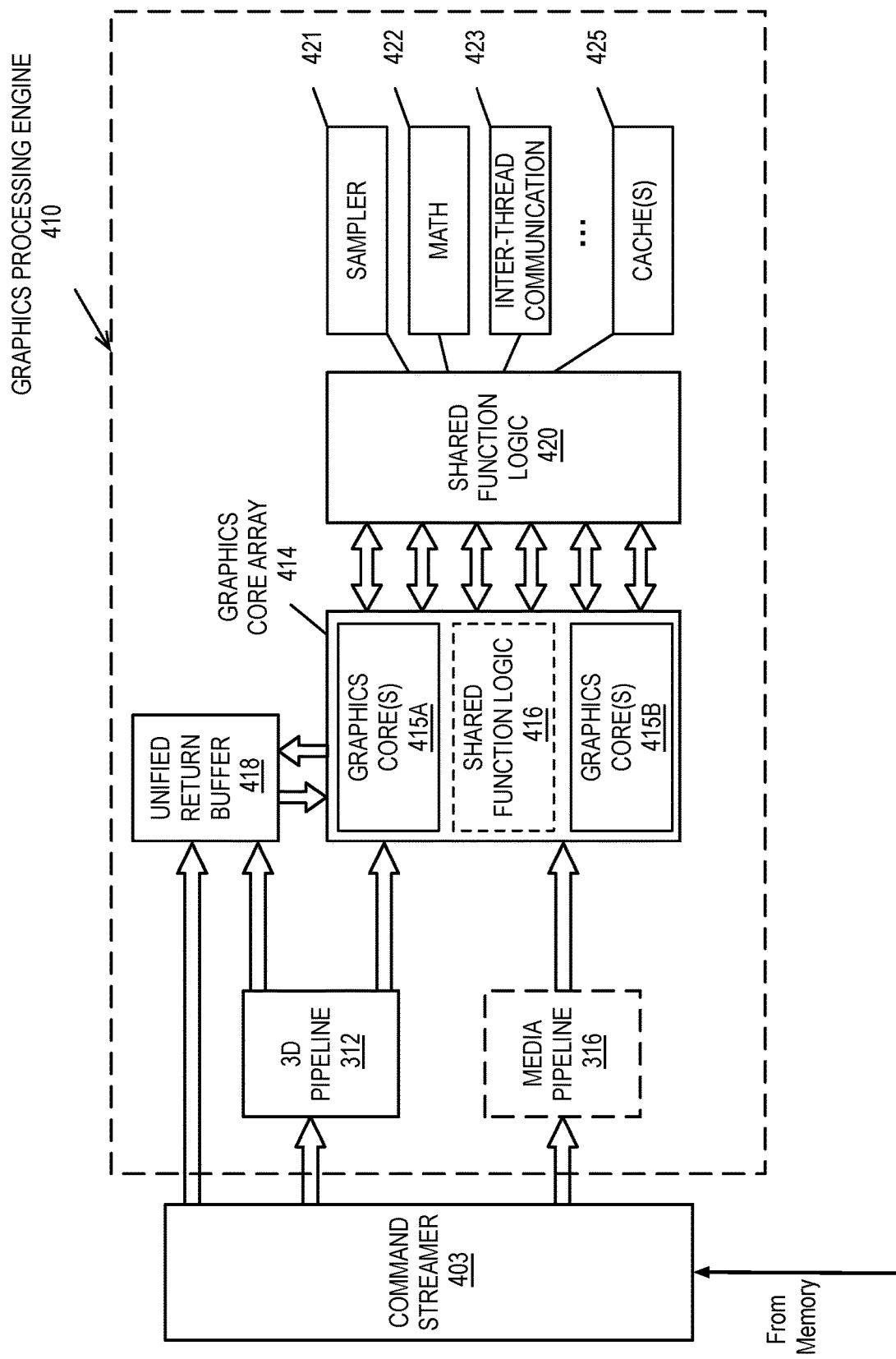
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3A, and may also represent a graphics engine tile 310A-310D of FIG. 3B. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3A are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. Alternatively or additionally, the command streamer 403 may be directly coupled to a unified return buffer 418. The unified return buffer 418 may be communicatively coupled to a graphics core array 414. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 can include fixed function and programmable logic to process one or more shader programs, such as vertex shaders, geometry shaders, pixel shaders, fragment shaders, compute shaders, or other shader and/or GPGPU programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphics core array 414 includes support for various 3D API shader languages and can execute multiple simultaneous execution threads associated with multiple shaders.

In some embodiments, the graphics core array 414 includes execution logic to perform media functions, such as video and/or image processing. In one embodiment, the execution units include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented at least in a case where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Execution Units

Figure 5A:
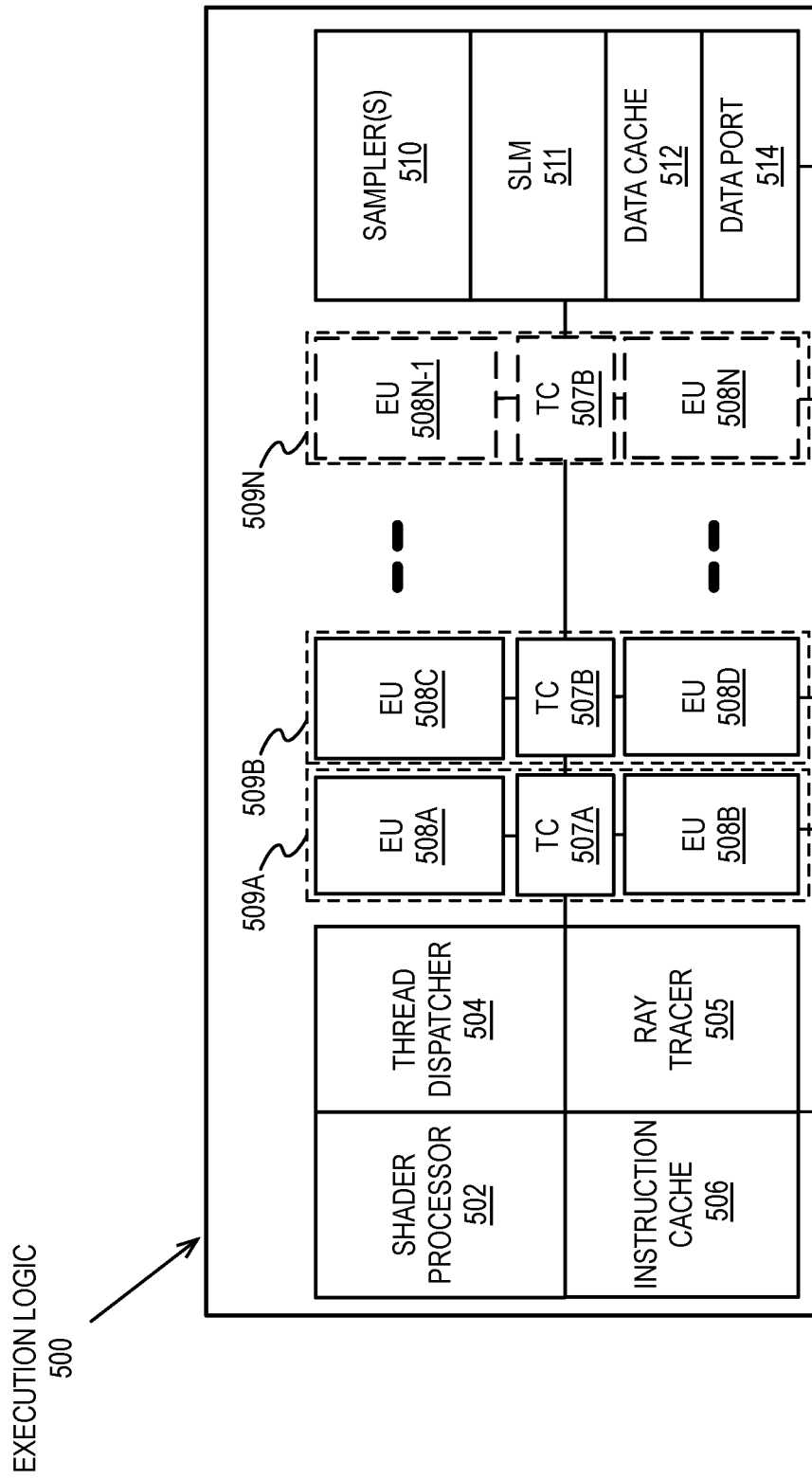
FIG. 5A-5B illustrate thread execution logic including an array of processing elements employed in a graphics processor core according to embodiments described herein.
Figure 5B:
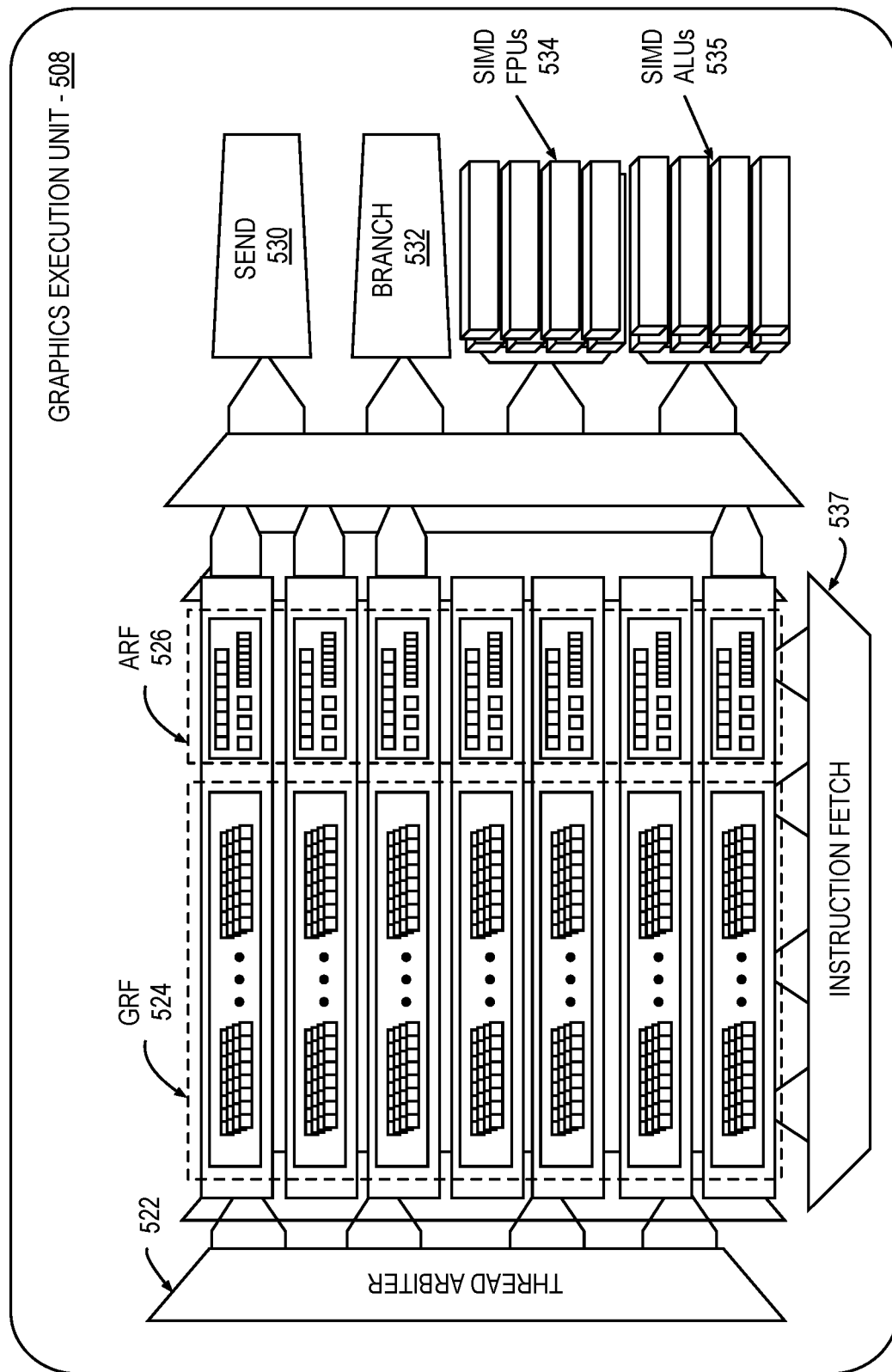

FIG. 5A-5B illustrate thread execution logic 500 including an array of processing elements employed in a graphics processor core according to embodiments described herein. Elements of FIG. 5A-5B having the same reference numbers (or names) as the elements of any other figure herein can operate or function in any manner similar to that described elsewhere herein, but are not limited to such. FIG. 5A-5B illustrates an overview of thread execution logic 500, which may be representative of hardware logic illustrated with each sub-core 221A-221F of FIG. 2B. FIG. 5A is representative of an execution unit within a general-purpose graphics processor, while FIG. 5B is representative of an execution unit that may be used within a compute accelerator.

As illustrated in FIG. 5A, in some embodiments thread execution logic 500 includes a shader processor 502, a thread dispatcher 504, instruction cache 506, a scalable execution unit array including a plurality of graphics execution units 508A-508N, a sampler 510, shared local memory 511, a data cache 512, and a data port 514. In one embodiment the scalable execution unit array can dynamically scale by enabling or disabling one or more execution units (e.g., any of graphics execution units 508A, 508B, 508C, 508D, through 508N-1 and 508N) based on the computational requirements of a workload. In one embodiment the included components are interconnected via an interconnect fabric that links to each of the components. In some embodiments, thread execution logic 500 includes one or more connections to memory, such as system memory or cache memory, through one or more of instruction cache 506, data port 514, sampler 510, and graphics execution units 508A-508N. In some embodiments, each execution unit (e.g. 508A) is a stand-alone programmable general-purpose computational unit that is capable of executing multiple simultaneous hardware threads while processing multiple data elements in parallel for each thread. In various embodiments, the array of graphics execution units 508A-508N is scalable to include any number individual execution units.

In some embodiments, the graphics execution units 508A-508N are primarily used to execute shader programs. A shader processor 502 can process the various shader programs and dispatch execution threads associated with the shader programs via a thread dispatcher 504. In one embodiment the thread dispatcher includes logic to arbitrate thread initiation requests from the graphics and media pipelines and instantiate the requested threads on one or more execution unit in the graphics execution units 508A-508N. For example, a geometry pipeline can dispatch vertex, tessellation, or geometry shaders to the thread execution logic for processing. In some embodiments, thread dispatcher 504 can also process runtime thread spawning requests from the executing shader programs.

In some embodiments, the graphics execution units 508A-508N support an instruction set that includes native support for many standard 3D graphics shader instructions, such that shader programs from graphics libraries (e.g., Direct 3D, OpenGL, Vulkan, etc.) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 508A-508N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the graphics execution units 508A-508N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in graphics execution units 508A-508N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs), Floating Point Units (FPUs), or other logic units (e.g., tensor cores, ray tracing cores, etc.) for a particular graphics processor. In some embodiments, graphics execution units 508A-508N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 54-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused graphics execution unit 509A-509N having thread control logic (507A-507N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 509A-509N includes at least two execution units. For example, fused execution unit 509A includes a first EU 508A, second EU 508B, and thread control logic 507A that is common to the first EU 508A and the second EU 508B. The thread control logic 507A controls threads executed on the fused graphics execution unit 509A, allowing each EU within the fused execution units 509A-509N to execute using a common instruction pointer register.

One or more internal instruction caches (e.g., 506) are included in the thread execution logic 500 to cache thread instructions for the execution units. In some embodiments, one or more data caches (e.g., 512) are included to cache thread data during thread execution. Threads executing on the execution logic 500 can also store explicitly managed data in the shared local memory 511. In some embodiments, a sampler 510 is included to provide texture sampling for 3D operations and media sampling for media operations. In some embodiments, sampler 510 includes specialized texture or media sampling functionality to process texture or media data during the sampling process before providing the sampled data to an execution unit.

During execution, the graphics and media pipelines send thread initiation requests to thread execution logic 500 via thread spawning and dispatch logic. Once a group of geometric objects has been processed and rasterized into pixel data, pixel processor logic (e.g., pixel shader logic, fragment shader logic, etc.) within the shader processor 502 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 502 then executes an application programming interface (API)-supplied pixel or fragment shader program. To execute the shader program, the shader processor 502 dispatches threads to an execution unit (e.g., 508A) via thread dispatcher 504. In some embodiments, shader processor 502 uses texture sampling logic in the sampler 510 to access texture data in texture maps stored in memory. Arithmetic operations on the texture data and the input geometry data compute pixel color data for each geometric fragment, or discards one or more pixels from further processing.

In some embodiments, the data port 514 provides a memory access mechanism for the thread execution logic 500 to output processed data to memory for further processing on a graphics processor output pipeline. In some embodiments, the data port 514 includes or couples to one or more cache memories (e.g., data cache 512) to cache data for memory access via the data port.

In one embodiment, the execution logic 500 can also include a ray tracer 505 that can provide ray tracing acceleration functionality. The ray tracer 505 can support a ray tracing instruction set that includes instructions/functions for ray generation. The ray tracing instruction set can be similar to or different from the ray-tracing instruction set supported by the ray tracing cores 245 in FIG. 2C.

FIG. 5B illustrates exemplary internal details of an execution unit 508, according to embodiments. A graphics execution unit 508 can include an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of dedicated integer SIMD ALUs 535. The GRF 524 and ARF 526 includes the set of general register files and architecture register files associated with each simultaneous hardware thread that may be active in the graphics execution unit 508. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the graphics execution unit 508 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 508 is not limited to the number of hardware threads, and multiple logical threads can be assigned to each hardware thread.

In one embodiment, the graphics execution unit 508 can co-issue multiple instructions, which may each be different instructions. The thread arbiter 522 of the graphics execution unit thread 508 can dispatch the instructions to one of the send unit 530, branch unit 532, or SIMD FPU(s) 534 for execution. Each execution thread can access 128 general-purpose registers within the GRF 524, where each register can store 32 bytes, accessible as a SIMD 8-element vector of 32-bit data elements. In one embodiment, each execution unit thread has access to 4 Kbytes within the GRF 524, although embodiments are not so limited, and greater or fewer register resources may be provided in other embodiments. In one embodiment the graphics execution unit 508 is partitioned into seven hardware threads that can independently perform computational operations, although the number of threads per execution unit can also vary according to embodiments. For example, in one embodiment up to 16 hardware threads are supported. In an embodiment in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the graphics execution unit 508 includes one or more SIMD floating point units (FPU(s)) 534 to perform floating-point operations. In one embodiment, the FPU(s) 534 also support integer computation. In one embodiment the FPU(s) 534 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 54-bit floating-point. In some embodiments, a set of 8-bit integer SIMD ALUs 535 are also present, and may be specifically optimized to perform operations associated with machine learning computations.

In one embodiment, arrays of multiple instances of the graphics execution unit 508 can be instantiated in a graphics sub-core grouping (e.g., a sub-slice). For scalability, product architects can choose the exact number of execution units per sub-core grouping. In one embodiment the execution unit 508 can execute instructions across a plurality of execution channels. In a further embodiment, each thread executed on the graphics execution unit 508 is executed on a different channel.

Figure 6:
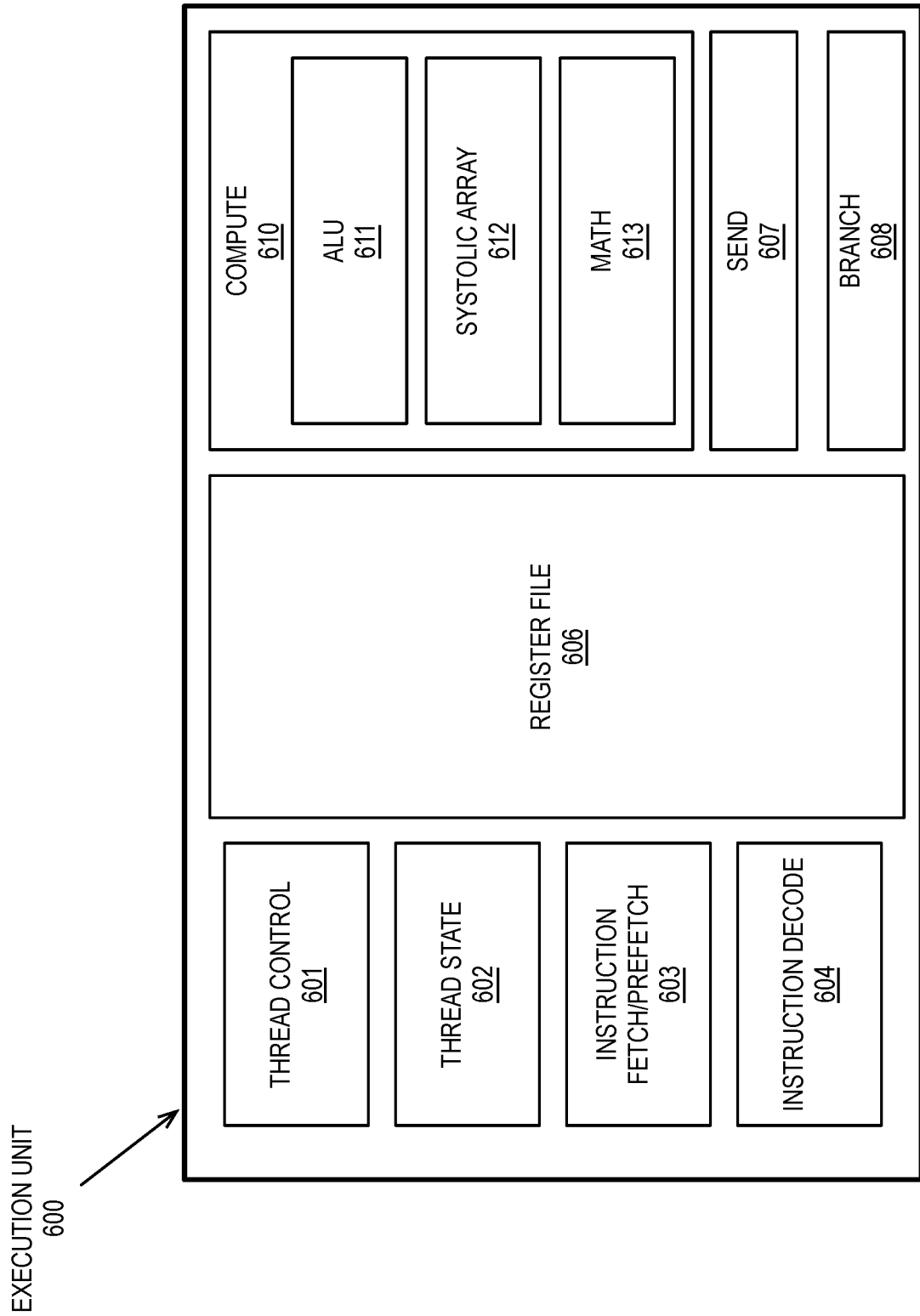
FIG. 6 illustrates an additional execution unit, according to an embodiment.

FIG. 6 illustrates an additional execution unit 600, according to an embodiment. The execution unit 600 may be a compute-optimized execution unit for use in, for example, a compute engine tile 340A-340D as in FIG. 3C, but is not limited as such. Variants of the execution unit 600 may also be used in a graphics engine tile 310A-310D as in FIG. 3B. In one embodiment, the execution unit 600 includes a thread control unit 601, a thread state unit 602, an instruction fetch/prefetch unit 603, and an instruction decode unit 604. The execution unit 600 additionally includes a register file 606 that stores registers that can be assigned to hardware threads within the execution unit. The execution unit 600 additionally includes a send unit 607 and a branch unit 608. In one embodiment, the send unit 607 and branch unit 608 can operate similarly as the send unit 530 and a branch unit 532 of the graphics execution unit 508 of FIG. 5B.

The execution unit 600 also includes a compute unit 610 that includes multiple different types of functional units. The compute unit 610 can include an ALU 611, a systolic array 612, and a math unit 613. The ALU 611 includes an array of arithmetic logic units. The ALU 611 can be configured to perform 64-bit, 32-bit, and 16-bit integer and floating point operations across multiple processing lanes and data channels and for multiple hardware and/or software threads. The ALU 611 can perform integer and floating point operations simultaneously (e.g., within the same clock cycle).

The systolic array 612 includes a W wide and D deep network of data processing units that can be used to perform vector or other data-parallel operations in a systolic manner. In one embodiment the systolic array 612 can be configured to perform various matrix operations, including as dot product, outer product, and general matrix-matrix multiplication (GEMM) operations. In one embodiment the systolic array 612 supports 16-bit floating point operations, as well as 8-bit, 4-bit, 2-bit, and binary integer operations. The systolic array 612 can be configured to accelerate specific machine learning operations, in addition to matrix multiply operations. In such embodiments, the systolic array 612 can be configured with support for the bfloat (brain floating point) 16-bit floating point format or a tensor float 32-bit floating point format (TF32) that have different numbers of mantissa and exponent bits relative to Institute of Electrical and Electronics Engineers (IEEE) 754 formats.

The systolic array 612 includes hardware to accelerate sparse matrix operations. In one embodiment, multiplication operations for sparse regions of input data can be bypassed at the processing element level by skipping multiply operations that have a zero value operand. In on embodiment, sparsity within input matrices can be detected and operations having known output values can be bypassed before being submitted to the processing elements of the systolic array 612. Additionally, the loading of zero value operands into the processing elements can be bypassed and the processing elements can be configured to perform multiplications on the non-zero value input elements. Output can be generated in a compressed (e.g., dense) format, with associated decompression or decoding metadata. The output can be cached in the compressed format. The output can be maintained in the compressed format when written to local memory or host system memory. The output may also be decompressed before being written to local memory or host system memory.

In one embodiment, the systolic array 612 includes hardware to enable operations on sparse data having a compressed representation. A compressed representation of a sparse matrix stores non-zero values and metadata that identifies the positions of the non-zero values within the matrix. Exemplary compressed representations include but are not limited to compressed tensor representations such as compressed sparse row (CSR), compressed sparse column (CSC), compressed sparse fiber (CSF) representations. Support for compressed representations enable operations to be performed on input in a compressed tensor format without requiring the compressed representation to be decompressed or decoded. In such embodiment, operations can be performed only on non-zero input values and the resulting non-zero output values can be mapped into an output matrix. In some embodiments, hardware support is also provided for machine-specific lossless data compression formats that are used when transmitting data within hardware or across system busses. Such data may be retained in a compressed format for sparse input data and the systolic array 612 can used the compression metadata for the compressed data to enable operations to be performed on only non-zero values, or to enable blocks of zero data input to be bypassed for multiply operations.

In one embodiment, a math unit 613 can be included to perform a specific subset of mathematical operations in an efficient and lower-power manner than the ALU 611. The math unit 613 can include a variant of math logic that may be found in shared function logic of a graphics processing engine provided by other embodiments (e.g., math logic 422 of the shared function logic 420 of FIG. 4). In one embodiment the math unit 613 can be configured to perform 32-bit and 64-bit floating point operations.

The thread control unit 601 includes logic to control the execution of threads within the execution unit. The thread control unit 601 can include thread arbitration logic to start, stop, and preempt execution of threads within the execution unit 600. The thread state unit 602 can be used to store thread state for threads assigned to execute on the execution unit 600. Storing the thread state within the execution unit 600 enables the rapid pre-emption of threads when those threads become blocked or idle. The instruction fetch/prefetch unit 603 can fetch instructions from an instruction cache of higher-level execution logic (e.g., instruction cache 506 as in FIG. 5A). The instruction fetch/prefetch unit 603 can also issue prefetch requests for instructions to be loaded into the instruction cache based on an analysis of currently executing threads. The instruction decode unit 604 can be used to decode instructions to be executed by the compute units. In one embodiment, the instruction decode unit 604 can be used as a secondary decoder to decode complex instructions into constituent micro-operations.

The execution unit 600 additionally includes a register file 606 that can be used by hardware threads executing on the execution unit 600. Registers in the register file 606 can be divided across the logic used to execute multiple simultaneous threads within the compute unit 610 of the execution unit 600. The number of logical threads that may be executed by the graphics execution unit 600 is not limited to the number of hardware threads, and multiple logical threads can be assigned to each hardware thread. The size of the register file 606 can vary across embodiments based on the number of supported hardware threads. In one embodiment, register renaming may be used to dynamically allocate registers to hardware threads.

FIG. 7 is a block diagram illustrating graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, the graphics processor instruction format 700 described and illustrated are macro-instructions, in that they are instructions supplied to the execution unit, as opposed to micro-operations resulting from instruction decode once the instruction is processed. Thus, a single instructions may cause hardware to perform multiple micro-operations.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math instruction group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one embodiment, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 8:
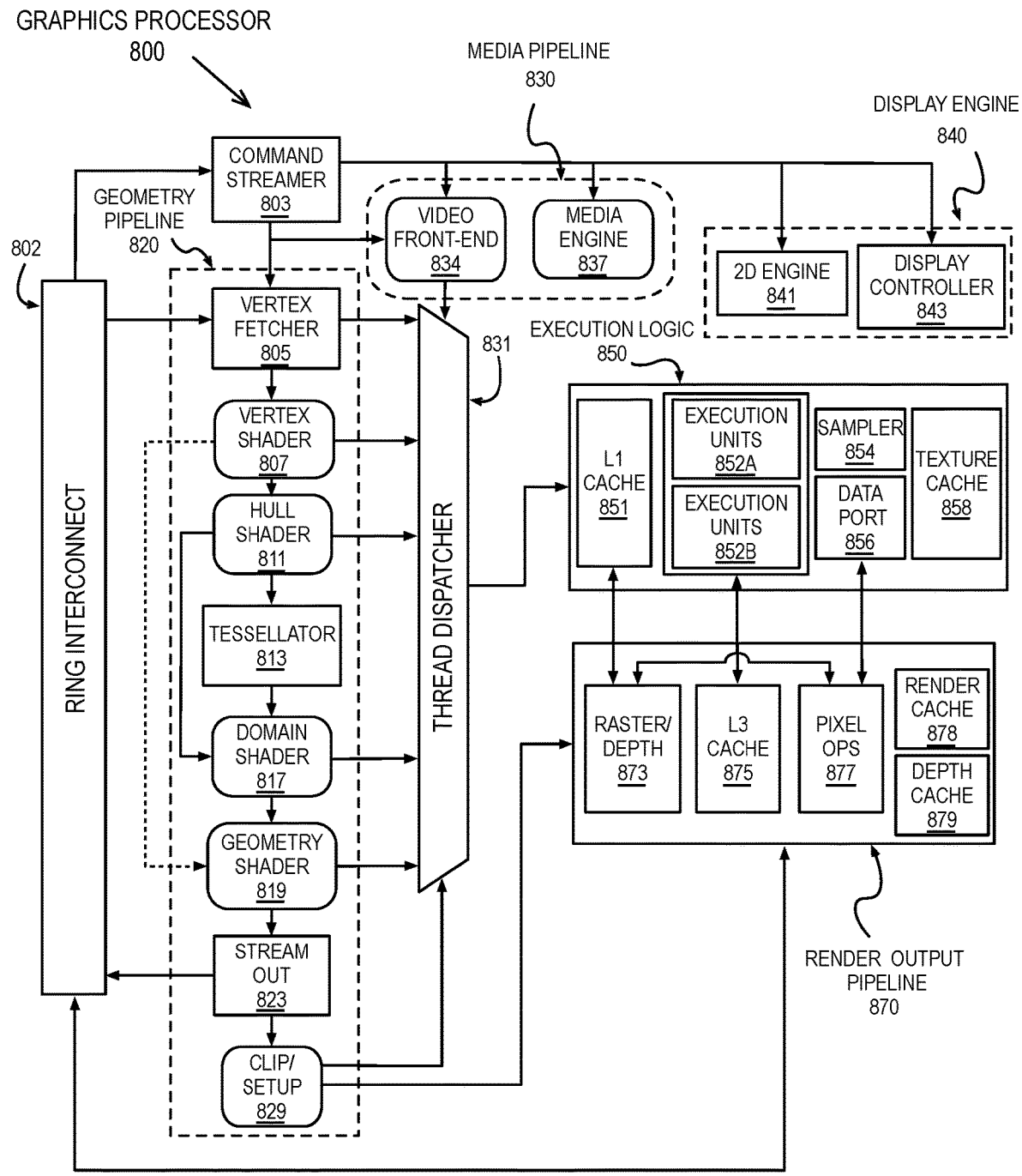
FIG. 8 is a block diagram of a graphics processor according to another embodiment.
Figure 9:
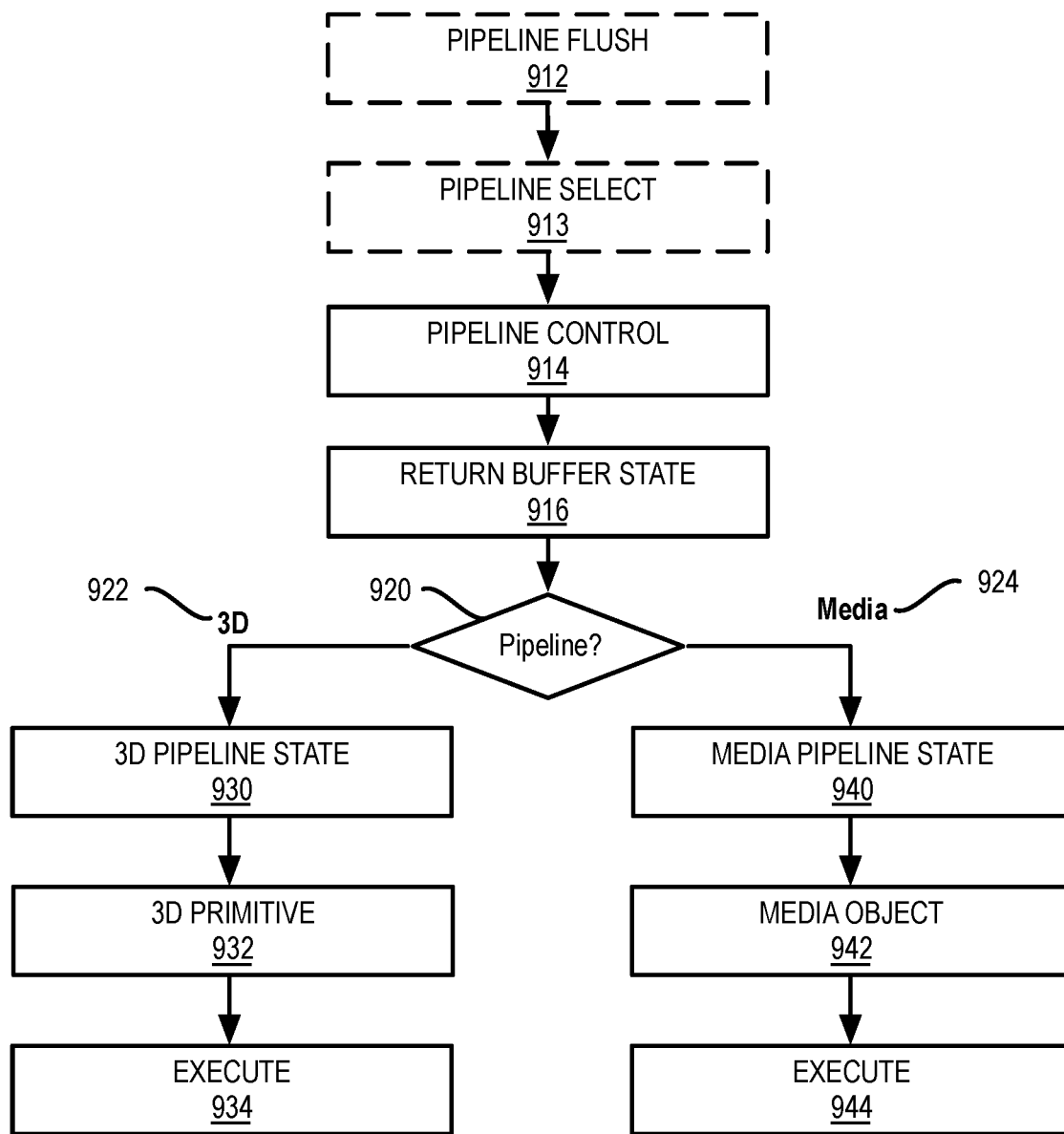
FIG. 9A-9B illustrate a graphics processor command format and command sequence, according to some embodiments.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed. The tessellation components can operate based on data received from the vertex shader 807.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 that may be used to program graphics processing pipelines according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and a data field 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word. Other command formats can be used.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands related to the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
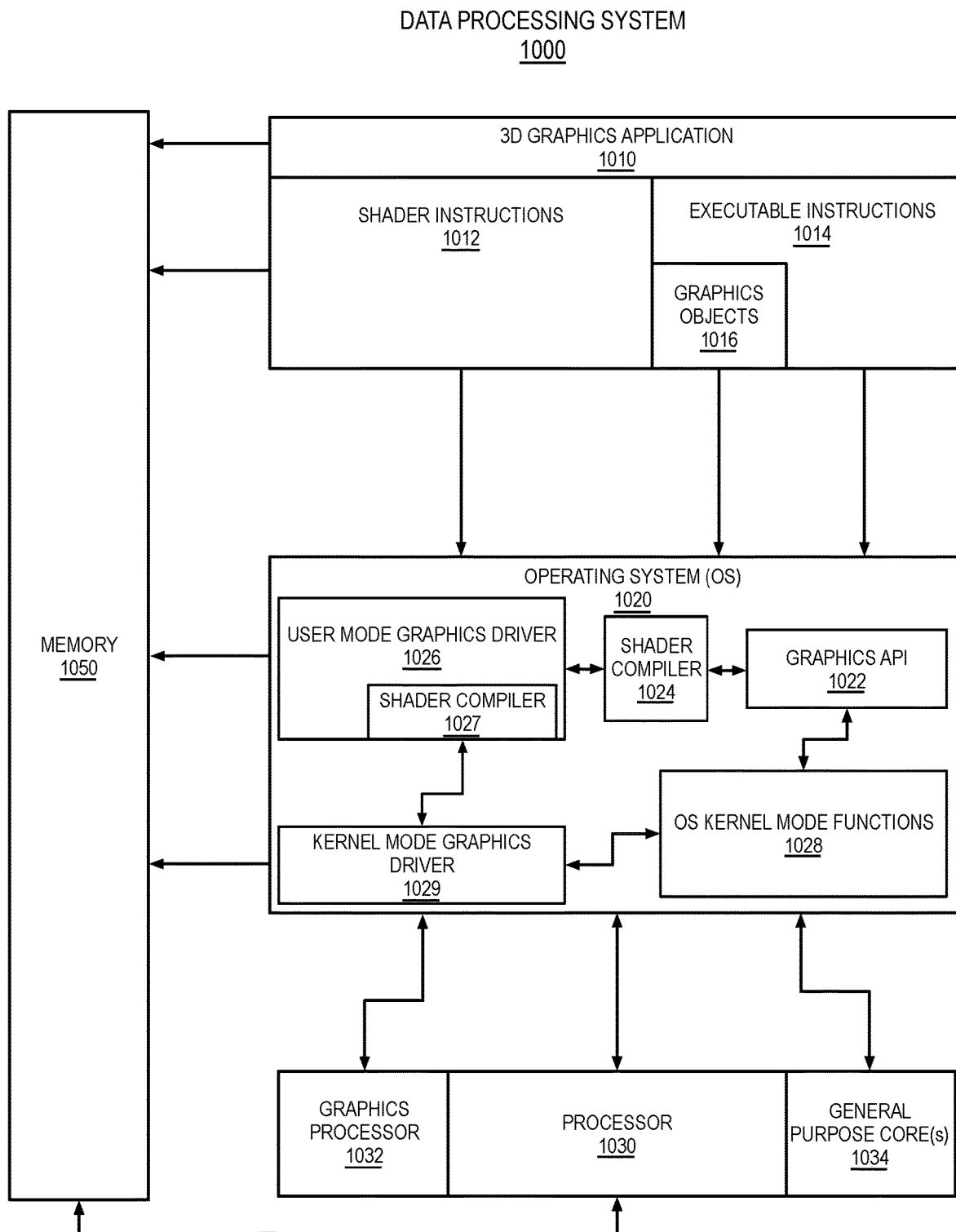
FIG. 10 illustrates exemplary graphics software architecture for a data processing system according to some embodiments.

FIG. 10 illustrates an exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
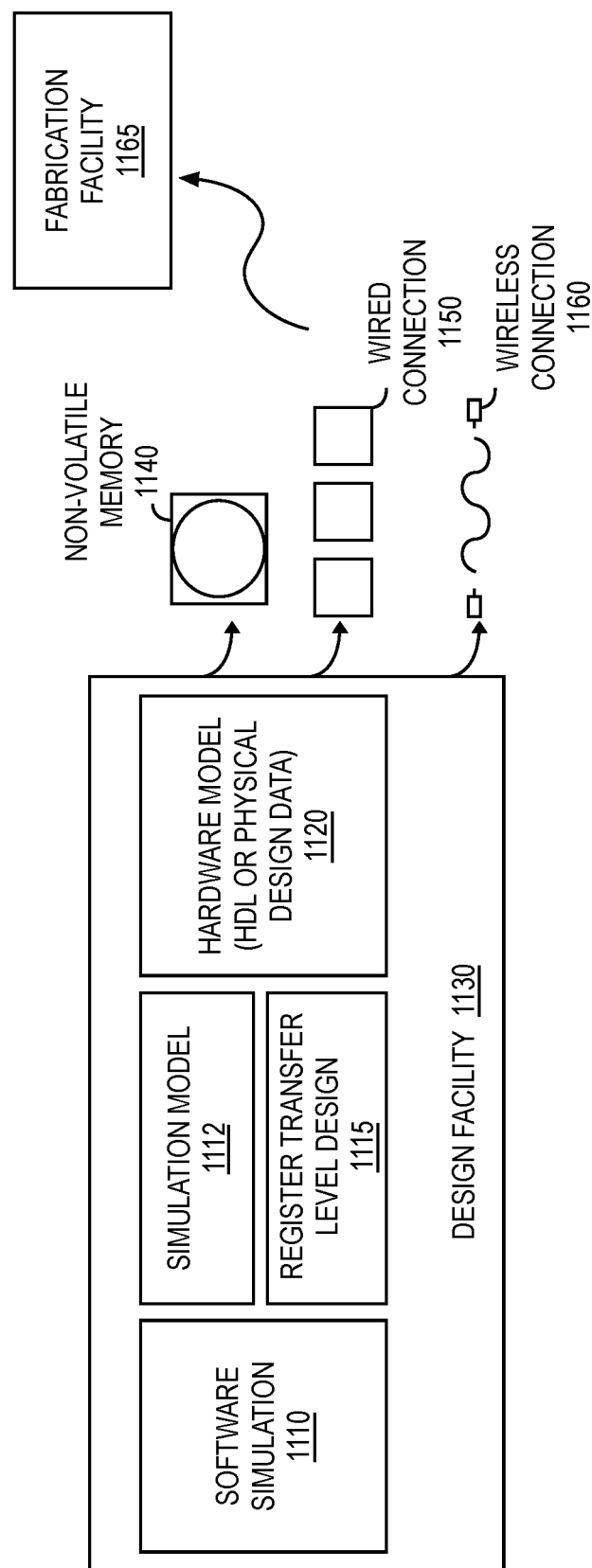
FIG. 11A is a block diagram illustrating an IP core development system, according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
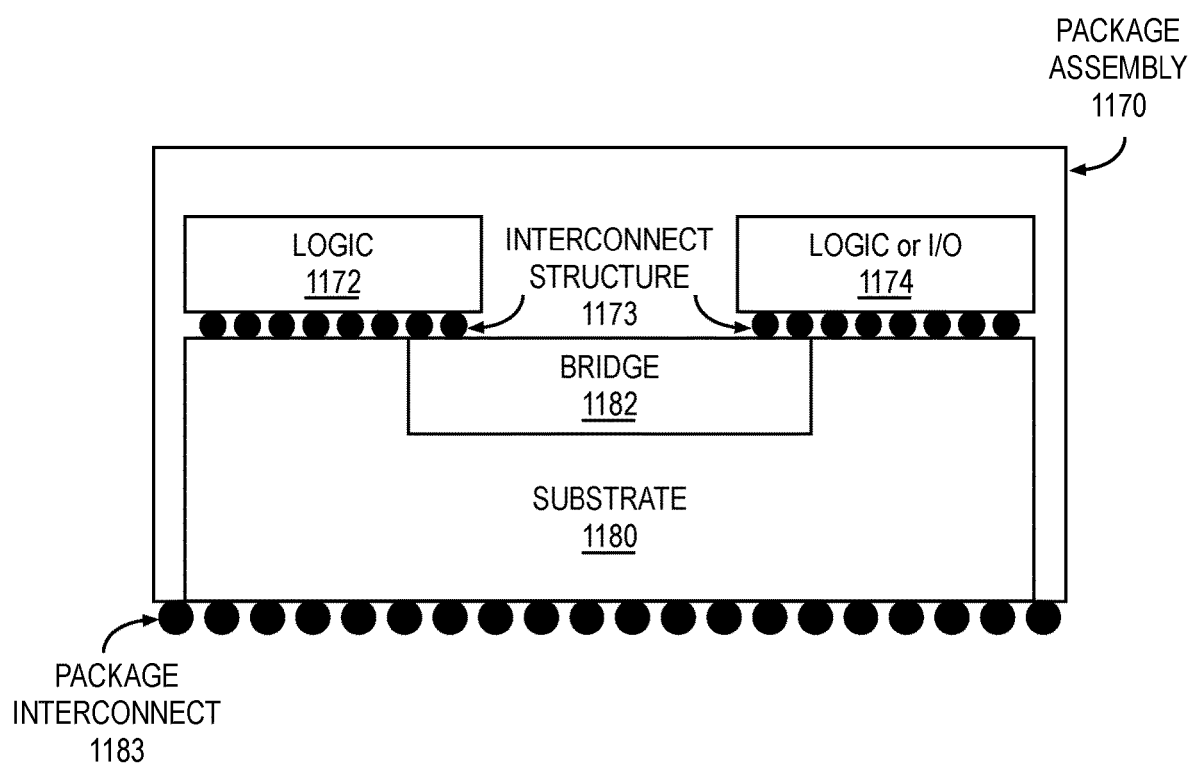
FIG. 11B illustrates a cross-section side view of an integrated circuit package assembly, according to some embodiments described herein.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 11C:
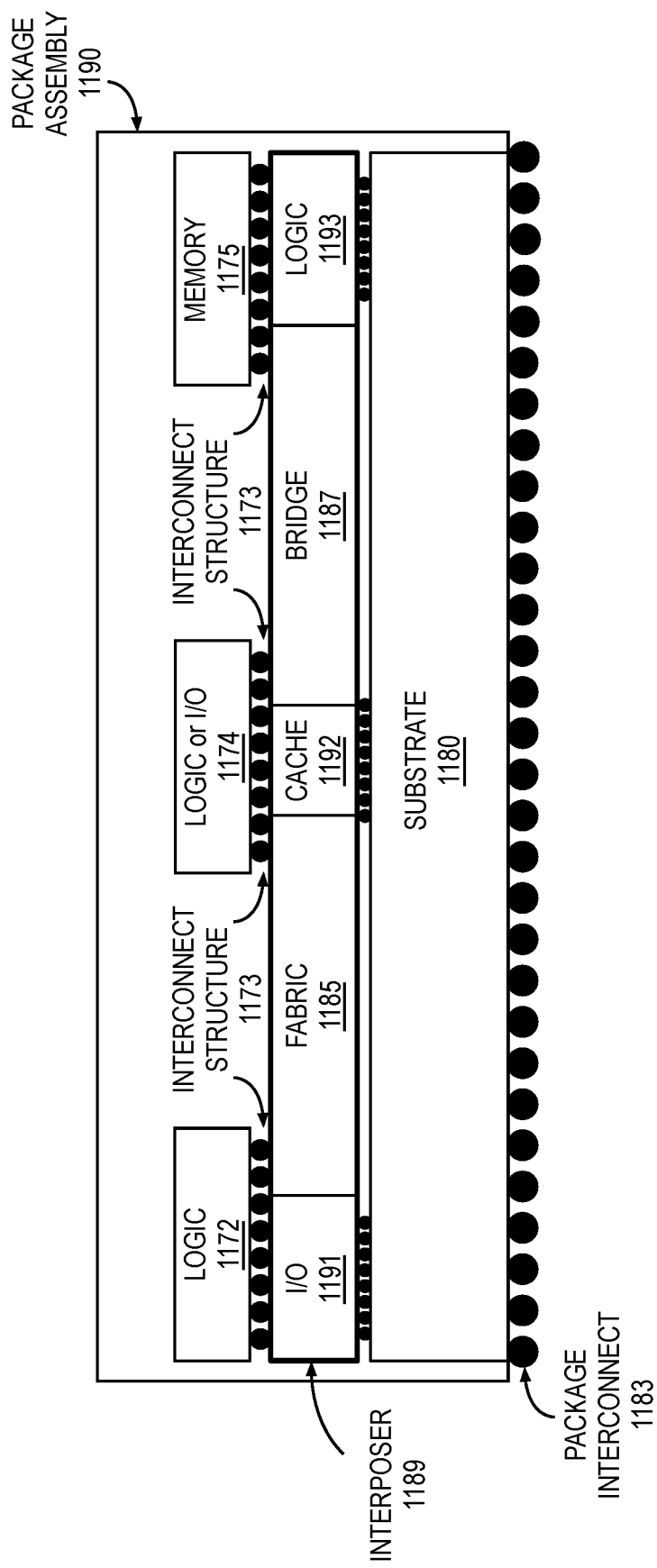
FIG. 11C illustrates a package assembly that includes multiple units of hardware logic chiplets connected to a substrate.

FIG. 11C illustrates a package assembly 1190 that includes multiple units of hardware logic chiplets connected to a substrate 1180. A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

In various embodiments a package assembly 1190 can include components and chiplets that are interconnected by a fabric 1185 and/or one or more bridges 1187. The chiplets within the package assembly 1190 may have a 2.5D arrangement using Chip-on-Wafer-on-Substrate stacking in which multiple dies are stacked side-by-side on a silicon interposer 1189 that couples the chiplets with the substrate 1180. The substrate 1180 includes electrical connections to the package interconnect 1183. In one embodiment the silicon interposer 1189 is a passive interposer that includes through-silicon vias (TSVs) to electrically couple chiplets within the package assembly 1190 to the substrate 1180. In one embodiment, silicon interposer 1189 is an active interposer that includes embedded logic in addition to TSVs. In such embodiment, the chiplets within the package assembly 1190 are arranged using 3D face to face die stacking on top of the active interposer 1189. The active interposer 1189 can include hardware logic for I/O 1191, cache memory 1192, and other hardware logic 1193, in addition to interconnect fabric 1185 and a silicon bridge 1187. The fabric 1185 enables communication between the various logic chiplets 1172, 1174 and the logic 1191, 1193 within the active interposer 1189. The fabric 1185 may be an NoC interconnect or another form of packet switched fabric that switches data packets between components of the package assembly. For complex assemblies, the fabric 1185 may be a dedicated chiplet enables communication between the various hardware logic of the package assembly 1190.

Bridge structures 1187 within the active interposer 1189 may be used to facilitate a point to point interconnect between, for example, logic or I/O chiplets 1174 and memory chiplets 1175. In some implementations, bridge structures 1187 may also be embedded within the substrate 1180. The hardware logic chiplets can include special purpose hardware logic chiplets 1172, logic or I/O chiplets 1174, and/or memory, chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, IBM) memory or cache (SRAM) memory. Cache memory 1192 within the active interposer 1189 (or substrate 1180) can act as a global cache for the package assembly 1190, part of a distributed global cache, or as a dedicated cache for the fabric 1185.

Each chiplet can be fabricated as separate semiconductor die and coupled with a base die that is embedded within or coupled with the substrate 1180. The coupling with the substrate 1180 can be performed via an interconnect structure 1173. The interconnect structure 1173 may be configured to route electrical signals between the various chiplets and logic within the substrate 1180. The interconnect structure 1173 can include interconnects such as, but not limited to bumps or pillars. In some embodiments, the interconnect structure 1173 may be configured to route electrical signals such as, for example, input/output (I/O) signals and/or power or ground signals associated with the operation of the logic, I/O and memory chiplets. In one embodiment, an additional interconnect structure couples the active interposer 1189 with the substrate 1180.

In some embodiments, the substrate 1180 is an epoxy-based laminate substrate. The substrate 1180 may include other suitable types of substrates in other embodiments. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some embodiments, is an Embedded Multi-die Interconnect Bridge (EMIB). In some embodiments, the bridge 1187 may simply be a direct connection from one chiplet to another chiplet.

Figure 11D:
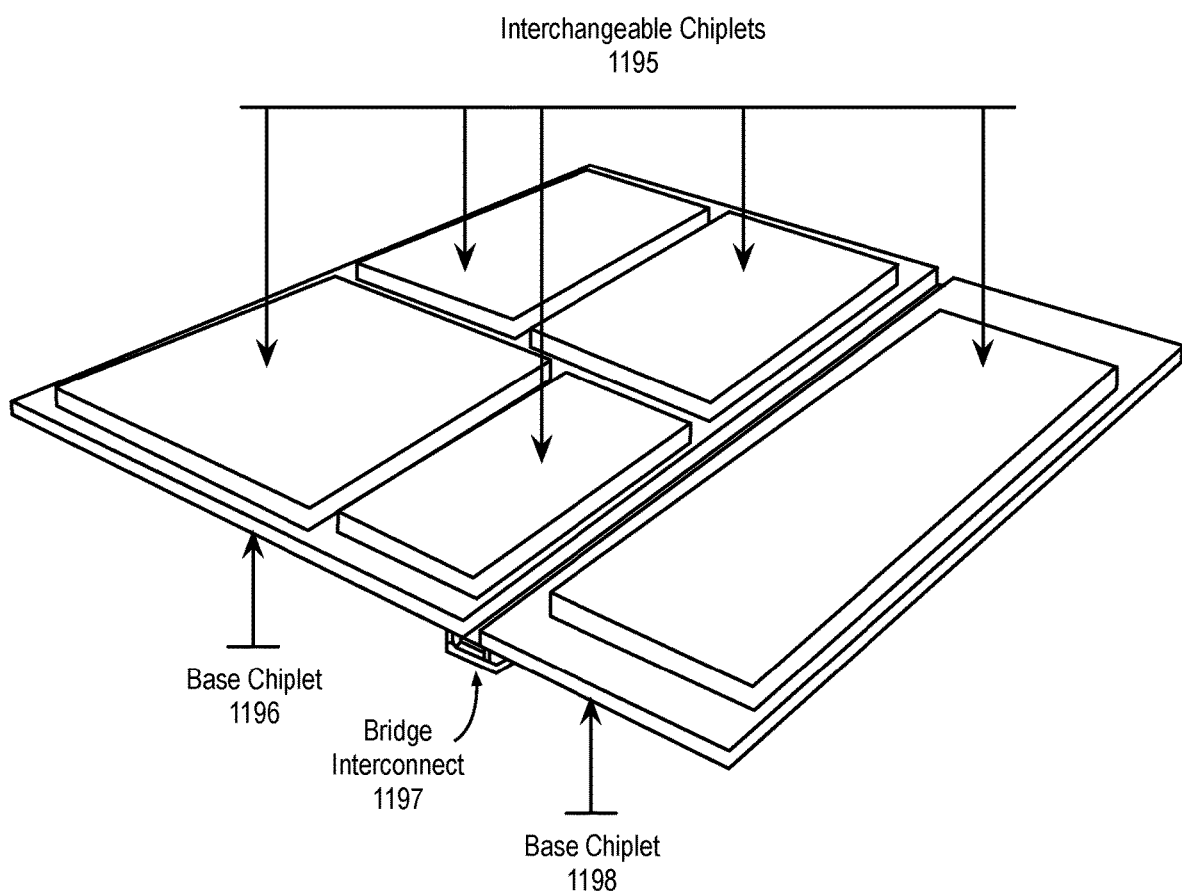
FIG. 11D illustrates a package assembly including interchangeable chiplets, according to an embodiment.

FIG. 11D illustrates a package assembly 1194 including interchangeable chiplets 1195, according to an embodiment. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 12:
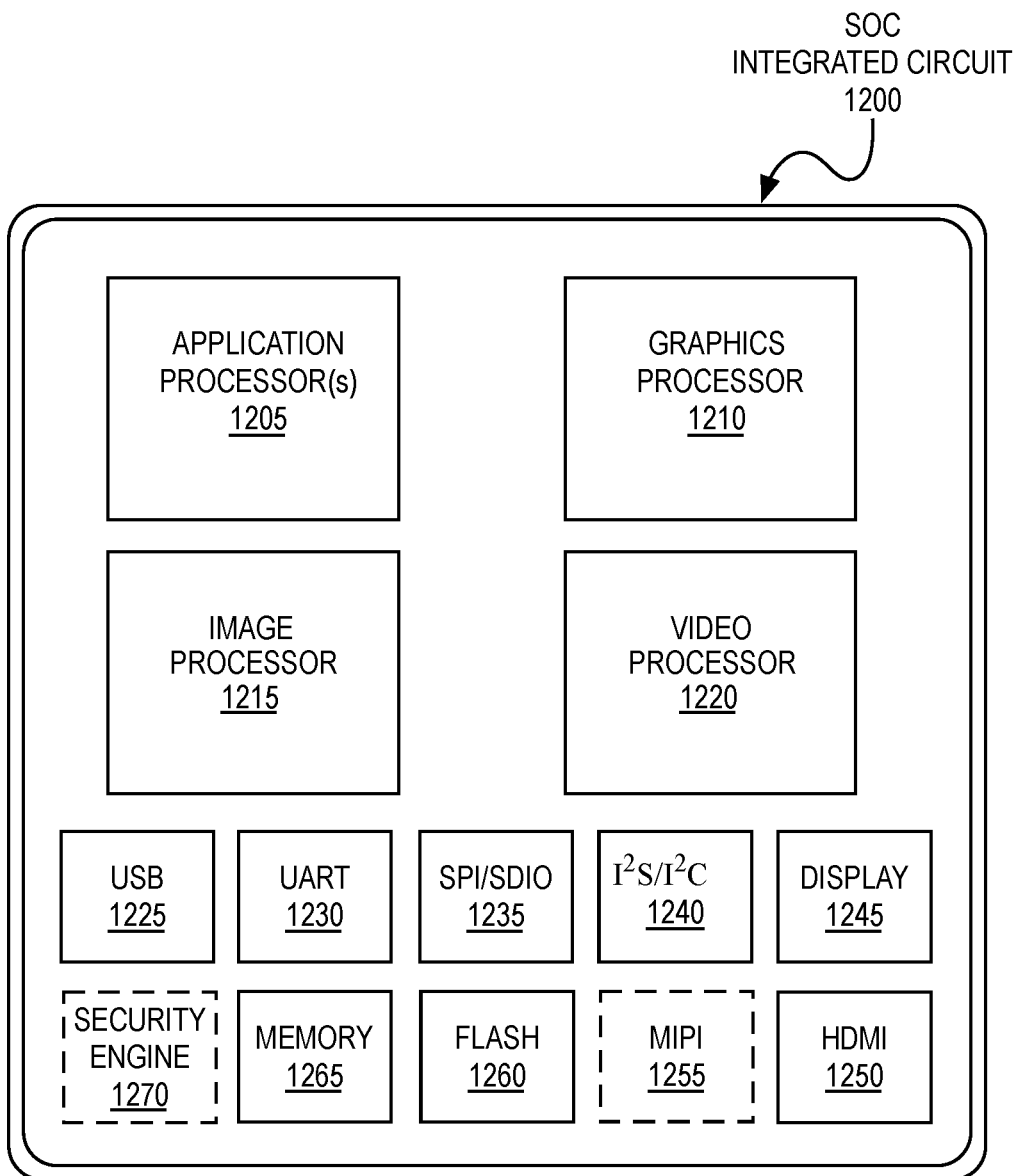
FIG. 12 is a block diagram illustrating an exemplary system on a chip integrated circuit that may be fabricated using one or more IP cores, according to an embodiment.
Figure 13A:
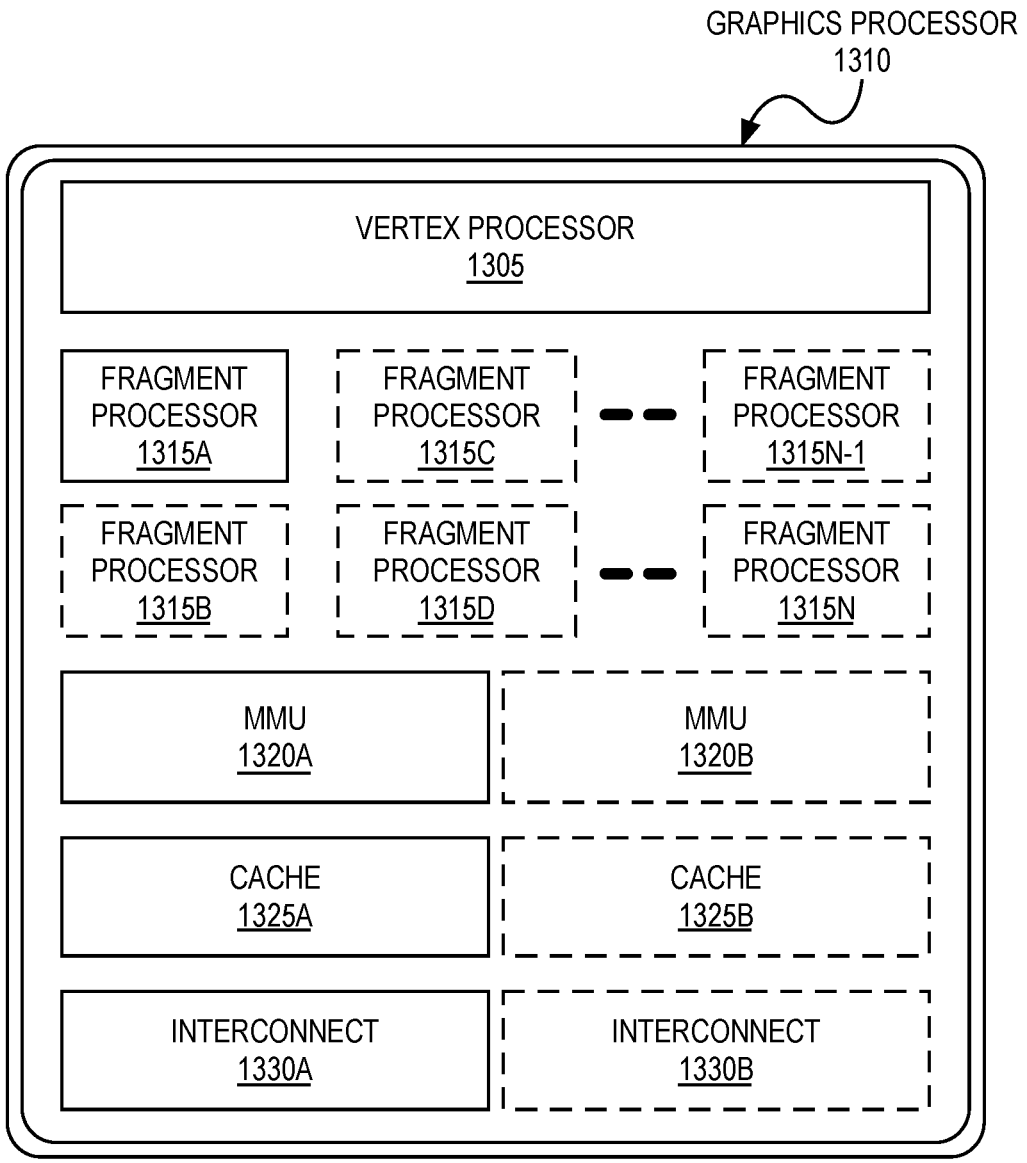
FIG. 13A-13B are block diagrams illustrating exemplary graphics processors for use within an SoC, according to embodiments described herein.
Figure 13B:
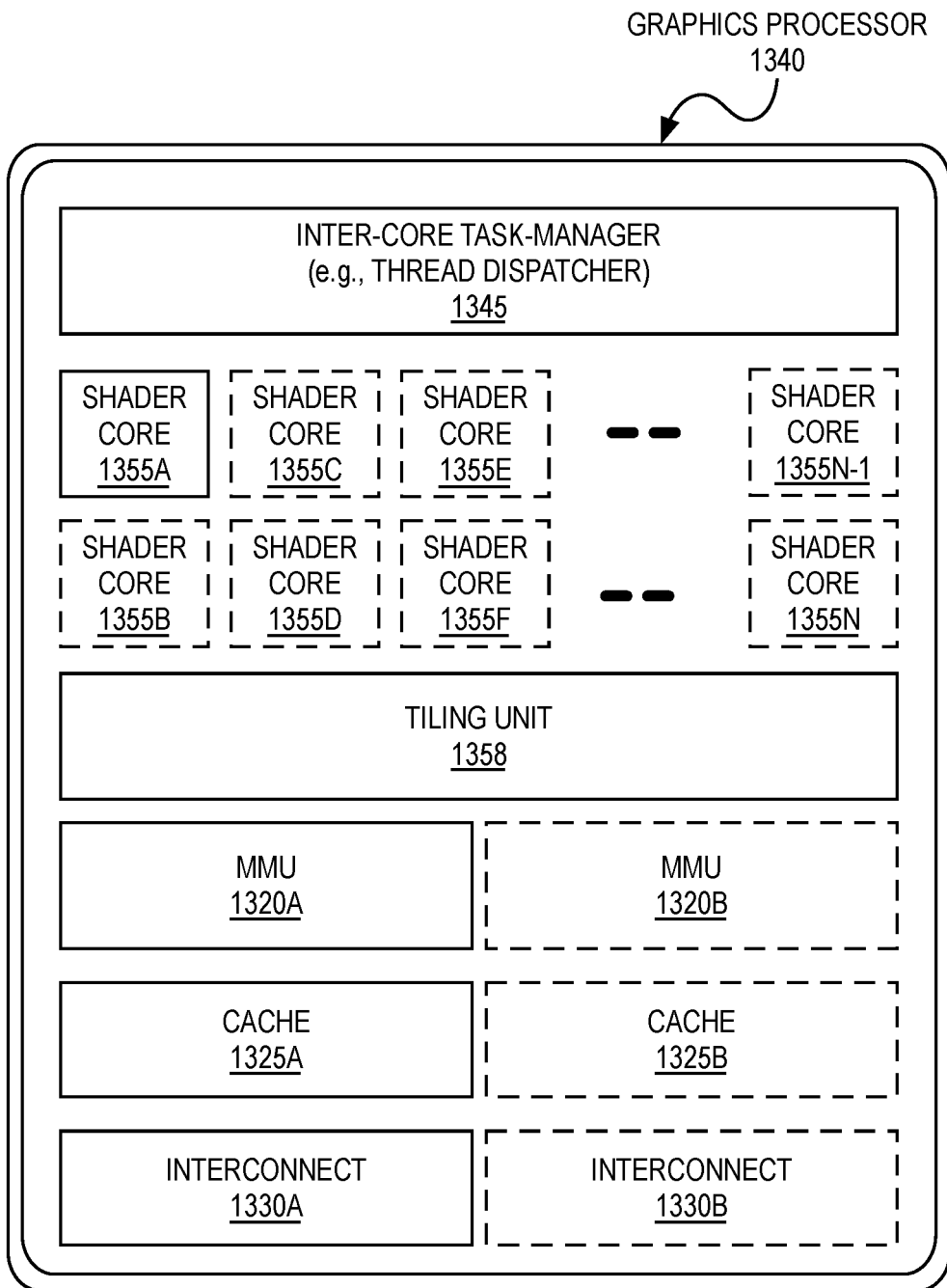

FIG. 12 and FIG. 13A-13B illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an FS/FC controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of graphics processor 1310 and graphics processor 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, cache(s) 1325A-1325B, and circuit interconnect(s) 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The unified shader core architecture is also configurable to execute direct compiled high-level GPGPU programs (e.g., CUDA). The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Random Sparsity Handling in a Systolic Array

Matrix multiply units can take advantage of input sparsity by zero gating ALUs, which saves power consumption, but compute throughput does not increase. To improve compute throughput from sparsity, processing resources in a matrix accelerator can skip computation with zero involved in input or output. The typical level of sparsity is about 50% for activations and corresponding gradient, and in case of pruning the level of sparsity can reaches as high as 90% in weights. If zeros in input can be skipped, the processing units can focus calculations on generating meaningful non-zero output. Accordingly, compute throughput can be increased theoretically by 2× for 50% sparsity, and by 10× for 90% sparsity in pruning case.

Described herein is a systolic array optimization for random sparsity to improve the performance of a broad range of machine learning applications. Unlike structured sparsity where certain patterns of sparsity is required and performance benefits are limited, random sparsity support covers networks from generic pruning process and takes advantage of higher level of sparsity in many networks. The systolic array described herein takes advantage of random sparsity in one input, either weights or feature maps for neural network inference or training operations. The technique described herein squeezes sparse input matrix at accumulation dimension and skips computation for zero-value elements after merging input vectors, which increases computation throughput for sparse neural networks or other matrix operations on sparse input data.

This technique improves computation throughput on systolic array for random sparse input, for example 1.5× improvement for 50% random sparsity. This technique covers structured sparsity as well, with similar 2× improvement for 50% structured sparsity. This technique is built on top of systolic array for dense matrices, without any impact on computation throughput for dense matrices.

Tensor Acceleration Logic for Machine Learning Workloads

Figure 14:
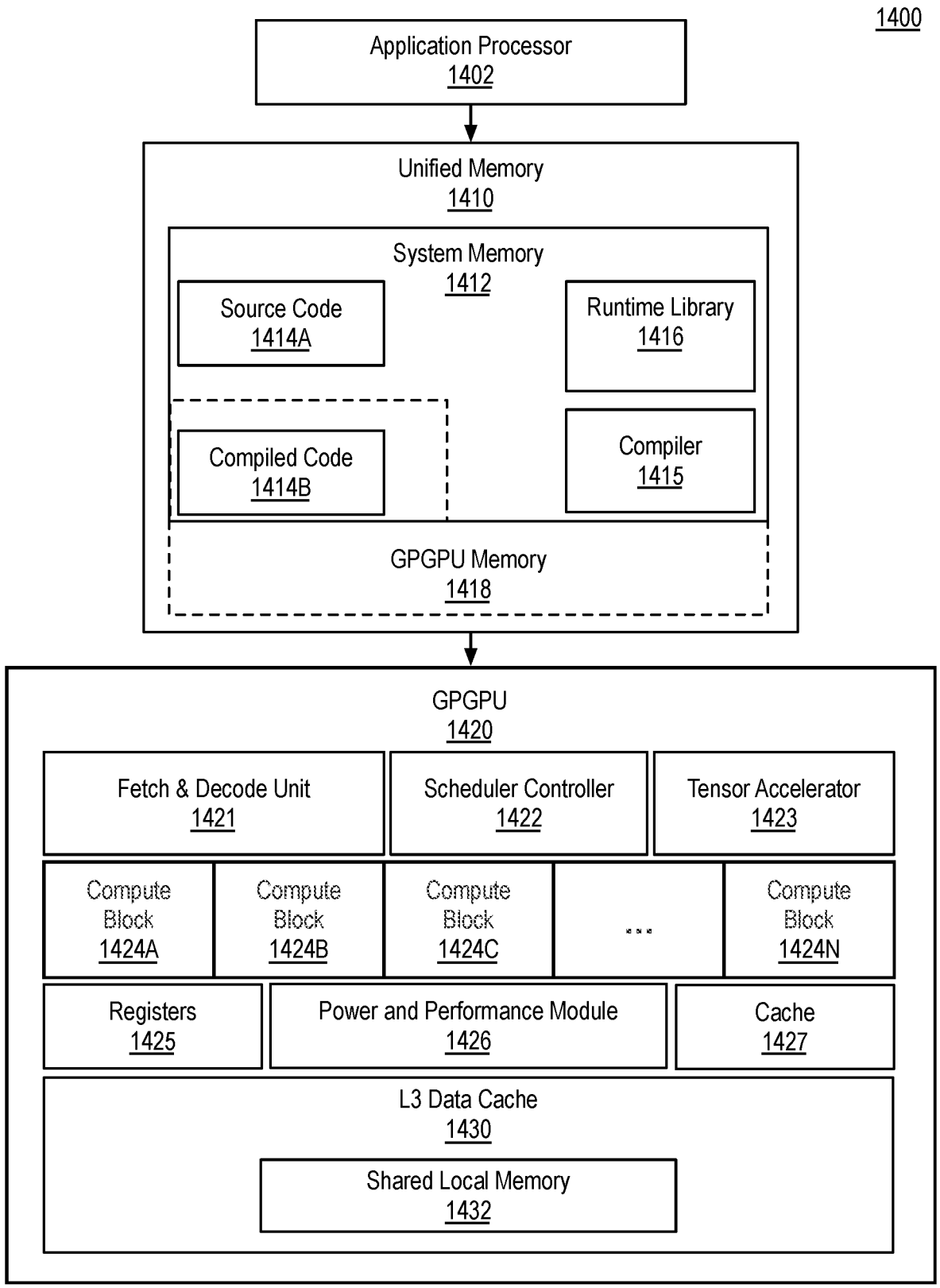
FIG. 14 is a block diagram of a data processing system, according to an embodiment.

FIG. 14 is a block diagram of a data processing system 1400, according to an embodiment. The data processing system 1400 is a heterogeneous processing system having a processor 1402, unified memory 1410, and a GPGPU 1420 including machine learning acceleration logic. The processor 1402 and the GPGPU 1420 can be any of the processors and GPGPU/parallel processors as described herein. The processor 1402 can execute instructions for a compiler 1415 stored in system memory 1412. The compiler 1415 executes on the processor 1402 to compile source code 1414A into compiled code 1414B. The compiled code 1414B can include instructions that may be executed by the processor 1402 and/or instructions that may be executed by the GPGPU 1420. During compilation, the compiler 1415 can perform operations to insert metadata, including hints as to the level of data parallelism present in the compiled code 1414B and/or hints regarding the data locality associated with threads to be dispatched based on the compiled code 1414B. The compiler 1415 can include the information necessary to perform such operations or the operations can be performed with the assistance of a runtime library 1416. The runtime library 1416 can also assist the compiler 1415 in the compilation of the source code 1414A and can also include instructions that are linked at runtime with the compiled code 1414B to facilitate execution of the compiled instructions on the GPGPU 1420.

The unified memory 1410 represents a unified address space that may be accessed by the processor 1402 and the GPGPU 1420. The unified memory can include system memory 1412 as well as GPGPU memory 1418. The GPGPU memory 1418 is memory within an address pace of the GPGPU 1420 and can include some or all of system memory 1412. In one embodiment the GPGPU memory 1418 can also include at least a portion of any memory dedicated for use exclusively by the GPGPU 1420. In one embodiment, compiled code 1414B stored in system memory 1412 can be mapped into GPGPU memory 1418 for access by the GPGPU 1420.

The GPGPU 1420 includes multiple compute blocks 1424A-1424N, which can include one or more of a variety of processing resources described herein. The processing resources can be or include a variety of different computational resources such as, for example, execution units, compute units, streaming multiprocessors, graphics multiprocessors, or multi-core groups. In one embodiment the GPGPU 1420 additionally includes a tensor (e.g., matrix) accelerator 1423, which can include one or more special function compute units that are designed to accelerate a subset of matrix operations (e.g., dot product, etc.). The tensor accelerator 1423 may also be referred to as a tensor accelerator or tensor core. In one embodiment, logic components within the tensor accelerator 1423 may be distributed across the processing resources of the multiple compute blocks 1424A-1424N.

The GPGPU 1420 can also include a set of resources that can be shared by the compute blocks 1424A-1424N and the tensor accelerator 1423, including but not limited to a set of registers 1425, a power and performance module 1426, and a cache 1427. In one embodiment the registers 1425 include directly and indirectly accessible registers, where the indirectly accessible registers are optimized for use by the tensor accelerator 1423. The power and performance module 1426 can be configured to adjust power delivery and clock frequencies for the compute blocks 1424A-1424N to power gate idle components within the compute blocks 1424A-1424N. In various embodiments the cache 1427 can include an instruction cache and/or a lower level data cache.

The GPGPU 1420 can additionally include an L3 data cache 1430, which can be used to cache data accessed from the unified memory 1410 by the tensor accelerator 1423 and/or the compute elements within the compute blocks 1424A-1424N. In one embodiment the L3 data cache 1430 includes shared local memory 1432 that can be shared by the compute elements within the compute blocks 1424A-1424N and the tensor accelerator 1423.

In one embodiment the GPGPU 1420 includes instruction handling logic, such as a fetch and decode unit 1421 and a scheduler controller 1422. The fetch and decode unit 1421 includes a fetch unit and decode unit to fetch and decode instructions for execution by one or more of the compute blocks 1424A-1424N or the tensor accelerator 1423. The instructions can be scheduled to the appropriate functional unit within the compute block 1424A-1424N or the tensor accelerator via the scheduler controller 1422. In one embodiment the scheduler controller 1422 is an ASIC configurable to perform advanced scheduling operations. In one embodiment the scheduler controller 1422 is a micro-controller or a low energy-per-instruction processing core capable of executing scheduler instructions loaded from a firmware module.

In one embodiment some functions to be performed by the compute blocks 1424A-1424N can be directly scheduled to or offloaded to the tensor accelerator 1423. In various embodiments the tensor accelerator 1423 includes processing element logic configured to efficiently perform matrix compute operations, such as multiply and add operations and dot product operations used by 3D graphics or compute shader programs. In one embodiment the tensor accelerator 1423 can be configured to accelerate operations used by machine learning frameworks. In one embodiment the tensor accelerator 1423 is an application specific integrated circuit explicitly configured to perform a specific set of parallel matrix multiplication and/or addition operations. In one embodiment the tensor accelerator 1423 is a field programmable gate array (FPGA) that provides fixed function logic that can updated between workloads. The set of matrix operations that can be performed by the tensor accelerator 1423 may be limited relative to the operations that can be performed by the compute block 1424A-1424N. However, the tensor accelerator 1423 can perform those the operations at a significantly higher throughput relative to the compute block 1424A-1424N.

Figure 15:
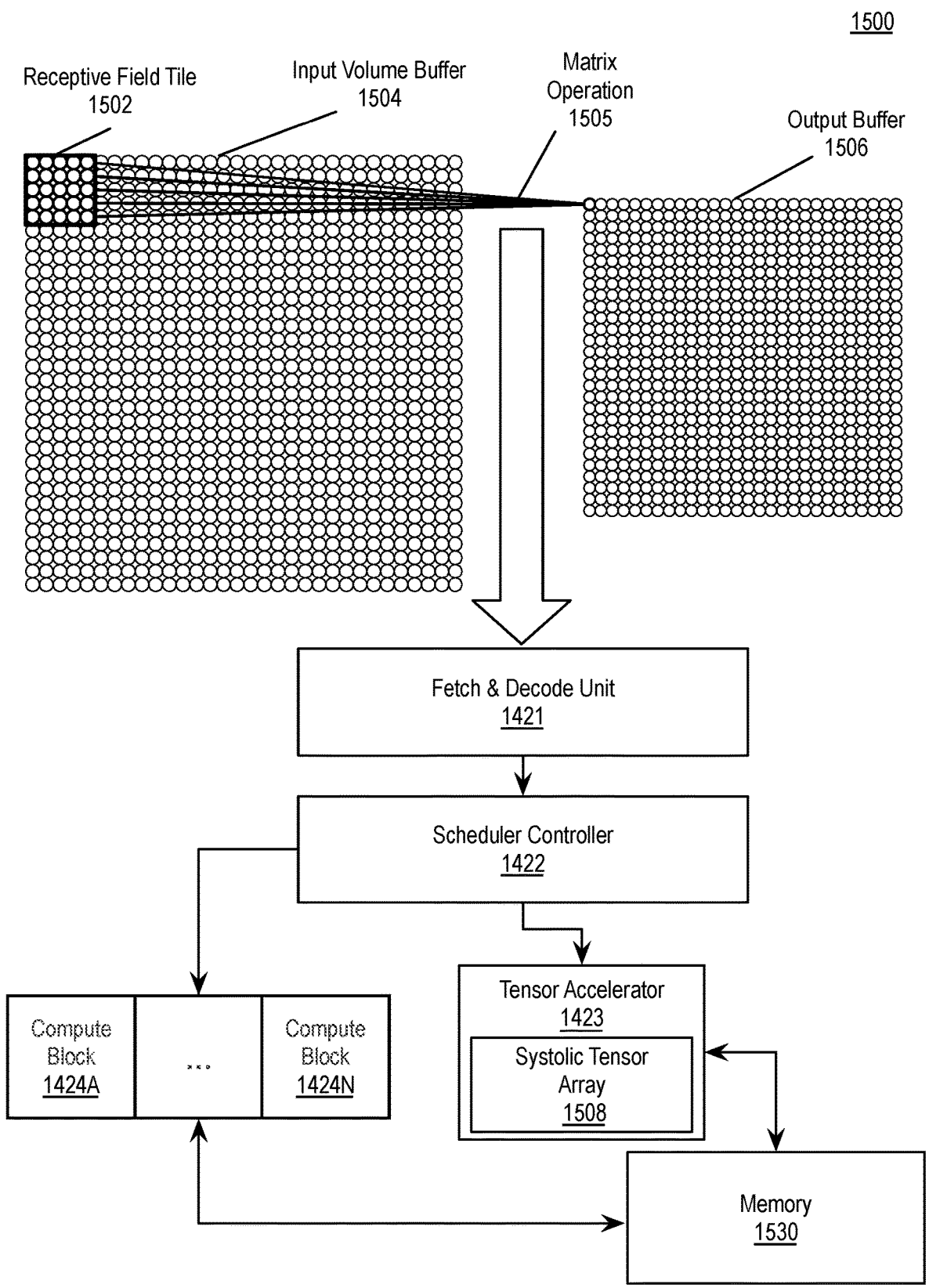
FIG. 15 illustrates a matrix operation performed by an instruction pipeline, according to an embodiment.

FIG. 15 illustrates a matrix operation 1505 performed by an instruction pipeline 1500, according to an embodiment. The instruction pipeline 1500 can be configured to perform a matrix operation 1505, such as, but not limited to a dot product operation and/or a matrix multiply and accumulate operation. The dot product of two vectors is a scalar value that is equal to sum of products of corresponding components of the vectors. The dot product can be calculated as shown in equation (1) below.

$$\vec{a} \cdot \vec{b} = \sum_{i=1}^{n} a_i b_i = a_1 b_1 + \ldots + a_n b_n \quad (1)$$

A matrix multiply and accumulate operation multiplies the elements of two matrices to generate a third matrix. To generate the third matrix, successive dot product operations are performed on rows and columns of the input matrices to generate elements of the output matrix.

The dot product can be used in a convolution operation for a convolutional neural network (CNN). FIG. 15 illustrates a two-dimensional (2D) convolution using a matrix operation 1505 including a dot product operation. While 2D convolution is illustrated, N-dimensional convolution can be performed on an N-dimensional volume using N-dimensional filters. A receptive field tile 1502 highlights a portion of an input volume in an input volume buffer 1504. The input volume buffer can be stored in memory 1530. A dot product matrix operation 1505 can be performed between the data within the receptive field tile 1502 and a convolutional filter to generate a data point within output buffer 1506, which can also be stored in memory 1530. The memory 1530 can be any of the memory described herein, including system memory 1412, GPGPU memory 1418, or one or more cache memories 1427, 1430 as in FIG. 14.

The combination of the data points within the output buffer 1506 represents an activation map generated by the convolution operation. Each point within the activation map is generated by sliding the receptive field tile across the input volume buffer 1504. The activation map data can be input to an activation function to determine an output activation value. In one embodiment, convolution of the input volume buffer 1504 can be defined within a framework as high-level matrix operation 1505. The high-level matrix operations can be performed via primitive operations, such as a basic linear algebra subprogram (BLAS) operation. The primitive operations can be accelerated via hardware instructions executed by the instruction pipeline 1500.

The instruction pipeline 1500 used to accelerate hardware instructions can include the instruction fetch and decode unit 1421, which can fetch and decode hardware instructions, and the scheduler controller 1422 which can schedule decoded instructions to one or more processing resources within the compute blocks 1424A-1424N and/or the tensor accelerator 1423. In one embodiment, a hardware instruction can be scheduled to the compute blocks 1424A-1424N and offloaded to the tensor accelerator 1423. The one or more hardware instructions and associated data to perform the matrix operation 1505 can be stored in the memory 1530. Output of the hardware instruction can also be stored in the memory 1530.

In one embodiment, the tensor accelerator 1423 can execute one or more hardware instructions to perform the matrix operation 1505 using an integrated systolic array 1508 (DP logic). The systolic array 1508 can include a combination of programmable and fixed function hardware that is configurable to perform dot product operations. While functional units within the compute blocks 1424A-1424N can also be configured to perform dot product operations, the systolic array 1508 can be configured to perform a limited subset of dot product operations at a significantly higher throughput relative to the compute block 1424A-1424N. Additionally, other types of matrix operations can be performed, including matrix multiply and accumulate operations.

Figure 16A:
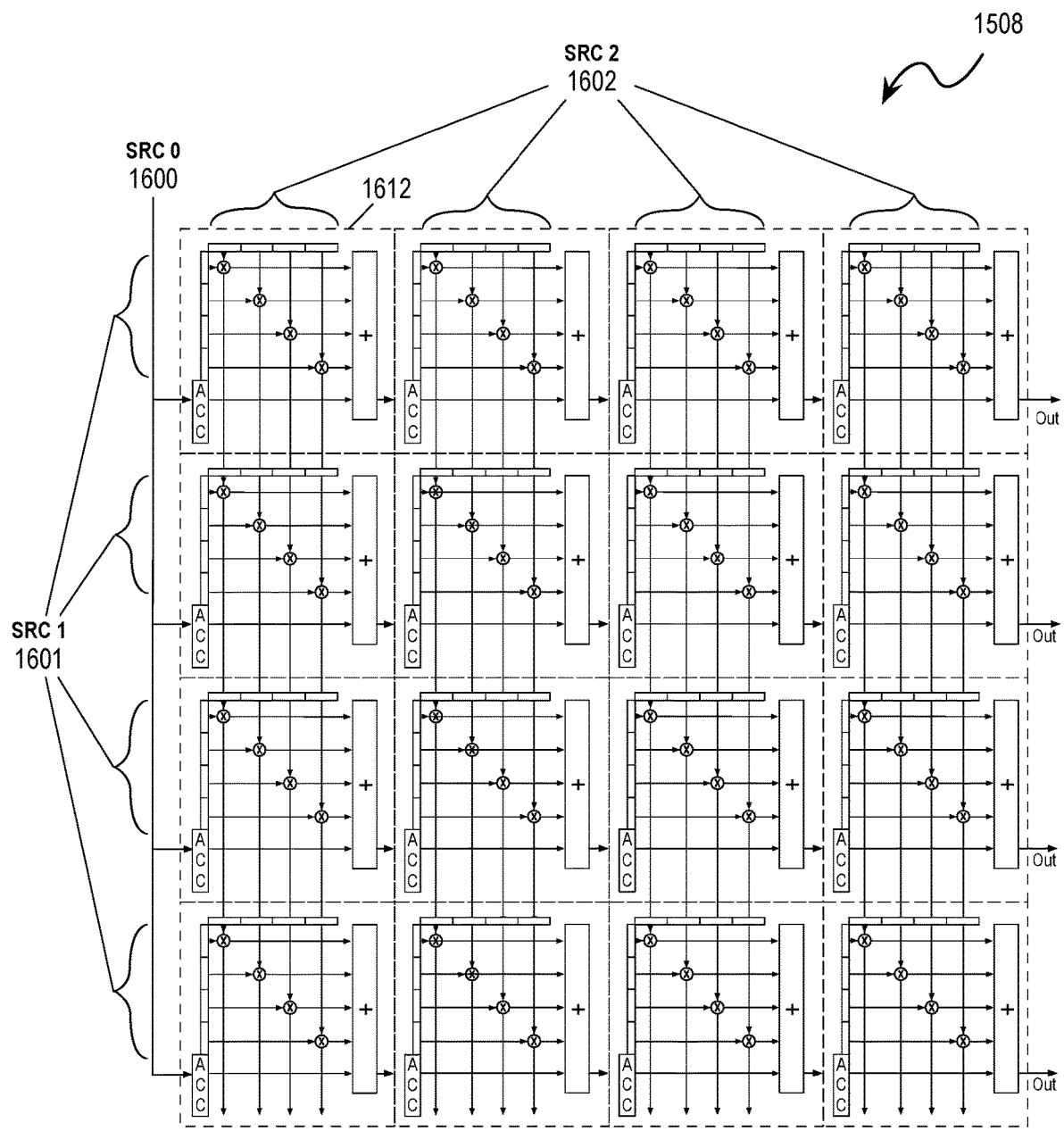
FIG. 16A-16B illustrate details of hardware-based systolic array, according to some embodiments.
Figure 16B:
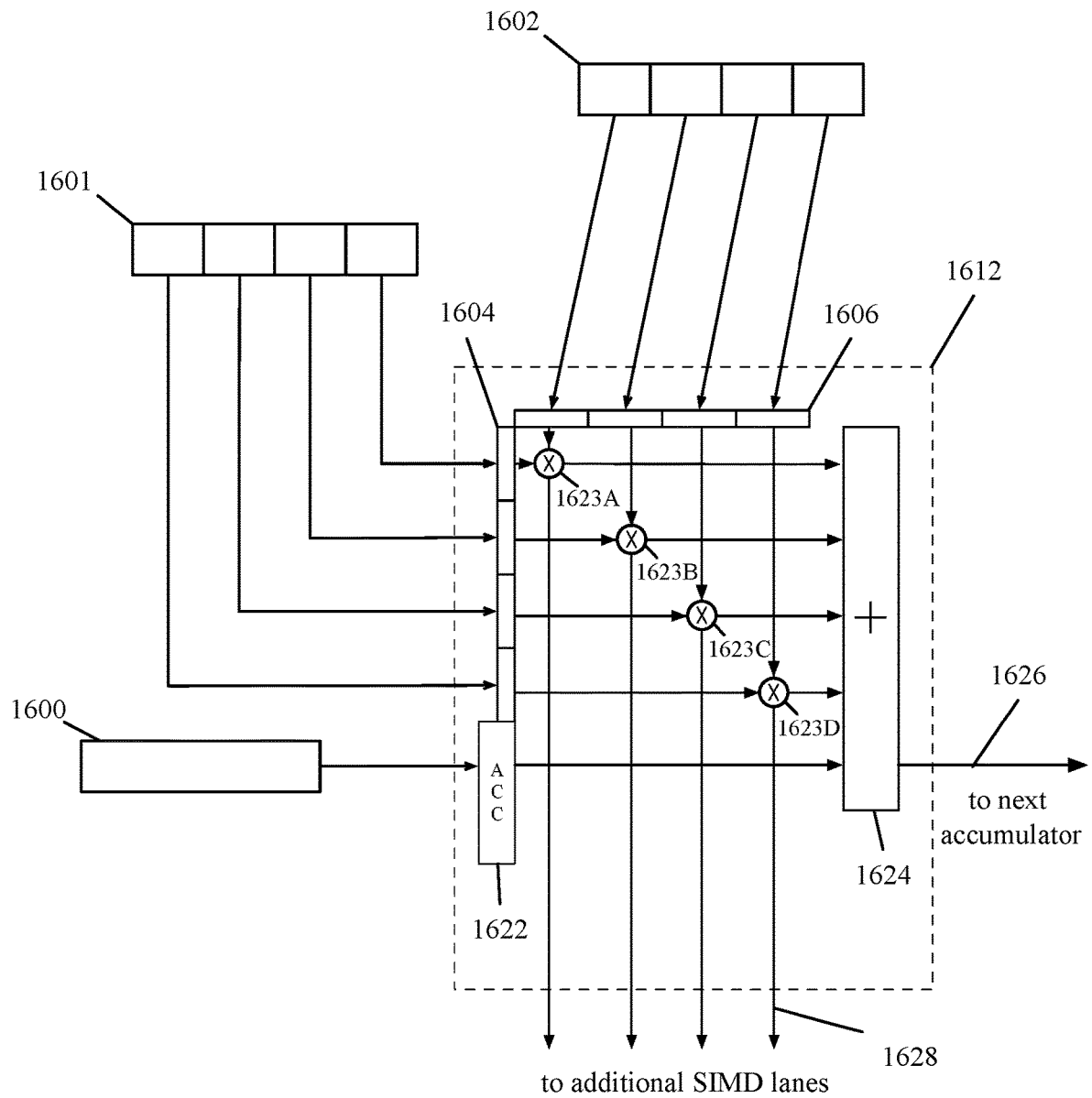

FIG. 16A-16B illustrate details of hardware-based systolic array 1508, according to some embodiments. FIG. 16A illustrates a grid of multiple functional units that are configurable to perform multiple dot product operations within a single clock cycle. FIG. 16B illustrates a single exemplary functional unit.

As shown in FIG. 16A, in one embodiment the systolic array 1508 is configurable to perform a set of parallel dot product operations using a variety of functional units. The dot products can be performed in a 'systolic' manner, in which SIMD data is pumped across multiple layers of functional units. As shown in FIG. 16A, in one embodiment the systolic array 1508 is configurable to perform a set of parallel dot product operations using a variety of functional units. The dot products can be performed in a 'systolic' manner, in which SIMD data is pumped across multiple layers of functional units. The systolic array 1508 is a collection of functional units that are arranged in a grid. The grid of functional units work in lockstep and are optimized to perform multiply-accumulate operations. Matrices to be operated on by the systolic array 1508 are divided in to sub-matrices, which are pumped across the grid of functional units.

In one embodiment the systolic array 1508 can process a configurable number of SIMD channels of data using a configurable systolic depth. For a given instruction, a SIMD width and a systolic depth can be selected to process a set of source data. The systolic depth defines the number of systolic layers of hardware logic that will be used to process an instruction. A systolic layer is a group of multiplier and adder logic units having a variable SIMD width, where the systolic layer can receive, as input, an initial accumulator value and generates a dot product value for output to a successive systolic layer or to an output register.

In some embodiments, three sources can be processed, where each source can be a vector register or an immediate value. In one embodiment, source 1600 (SRC0) can be one or more initial accumulator values, which can be a single value or a vector of accumulator values. The initial accumulator value will be added to the first set of dot products computed by each functional unit within the first systolic layer. The dot product computed by a functional unit can be provided to the next systolic layer for the given SIMD channel. The dot products can be computed based on source 1601 (SRC1) and source 1602 (SRC2), which are vector registers that can contain one more channels of packed data, each channel containing a four-element vector. In one embodiment, each channel is 32-bits wide and provides four, 8-bit vector elements. In one embodiment, each channel is 64-bits wide and provides eight, 8-bit vector elements. Some embodiments are configurable to calculate dot products from input vectors having 32-bit elements, 16-bit elements, 8-bit elements, 4-bit elements, and/or 2-bit elements. In one embodiment, mixed precision operations can be performed using any combination of supported element sizes (e.g., 8-bit×2-bit, 8-bit×4-bit, 4-bit×4-bit, etc.). In one embodiment, the systolic array 1508 is configured for integer calculation, although automatic fixed-point operation is configurable in some embodiments. Although the instruction described herein is a four-element dot product, in some embodiments the systolic array 1508 may also be configured to support floating-point dot-product calculations on a different number of elements per vector.

In one embodiment, multiple channels of four-element vectors can be packed into a single vector register of various widths (e.g., 64-bit, 128-bit, 256-bit, 512-bit, etc.). Simultaneous dot products can be computed via the systolic array 1508 for multiple channels of vector elements provided via source 1601 and source 1602. The number of channels of vector elements to be processed can be configured based on a selected execution size and systolic depth for the dot product calculation. In one embodiment, source vectors that are wider than the specified execution size and/or systolic depth may be calculated using multiple cycles of the systolic array 1508.

The number of calculations that can be performed within a given clock cycle can vary based on the number of SIMD lanes and systolic layers. The systolic array 1508, as illustrated, can perform sixteen dot products per SIMD lane of throughput using a systolic depth of four. If configured for eight SIMD lanes, the logic can perform 128 eight-bit integer (INT8) dot products within a given cycle. If configured for eight SIMD lanes and a systolic depth of eight, each lane can perform 32 eight-bit integer (INT8) dot products and 256 dot products in total. These specific number of operations are exemplary of one embodiment, and other embodiments vary in throughput. Furthermore, if the data types are different, then the number of operations will be scaled based on the different data types.

At each functional unit, a dot product is computed via multiplier and adder logic and the dot product is added to an accumulator value. The resulting data can be output to a destination register or provide to the accumulator of the next systolic layer. Details of a functional unit 1612 are shown in FIG. 16B.

As shown in FIG. 16B a functional unit 1612 can include a set of input data buffers 1604, 1606 and an accumulator 1622, which can each accept input data. In one embodiment, data buffer 1606 can accept source 1602, (SRC2), which can be a packed vector of input data. Input data buffer 1604 can accept a source 1601 (SRC1), which can also be a packed vector of input data. The accumulator 1622 can accept source 1600 (SRC0) that provides an initial accumulator value for the functional unit 1612. The initial accumulator value is added to the dot product computed from the elements of source 1601 and source 1602. The dot product is computed via an element-wise multiplication of the source vectors using a set of multipliers 1623A-1623D and an adder 1624. The multipliers 1623A-1623D are used to compute a set of products. A sum of the set of products is computed by the adder 1624. The sum can be accumulated with (e.g., added to) any initial value provided via source 1600. In one embodiment, this accumulated value can be provided as an input value 1626 to the next accumulator, which can reside in a subsequent systolic layer. In one embodiment, source 1601 may include multiple channels of input data. Additional channels of source 1601 can be relayed as SRC1 input to additional SIMD lanes 1628. In one embodiment, source 1602 may include multiple channels of input data. Additional channels of source 1602 can be used as SRC2 input data to logic units within additional systolic depths. In one embodiment, source 1600 can optionally include multiple channels, with additional channels provided as input to the accumulator within additional functional units. In one embodiment, source 1600 can be a single value that is added to each accumulator in each functional unit of the initial systolic layer.

Figure 17A:
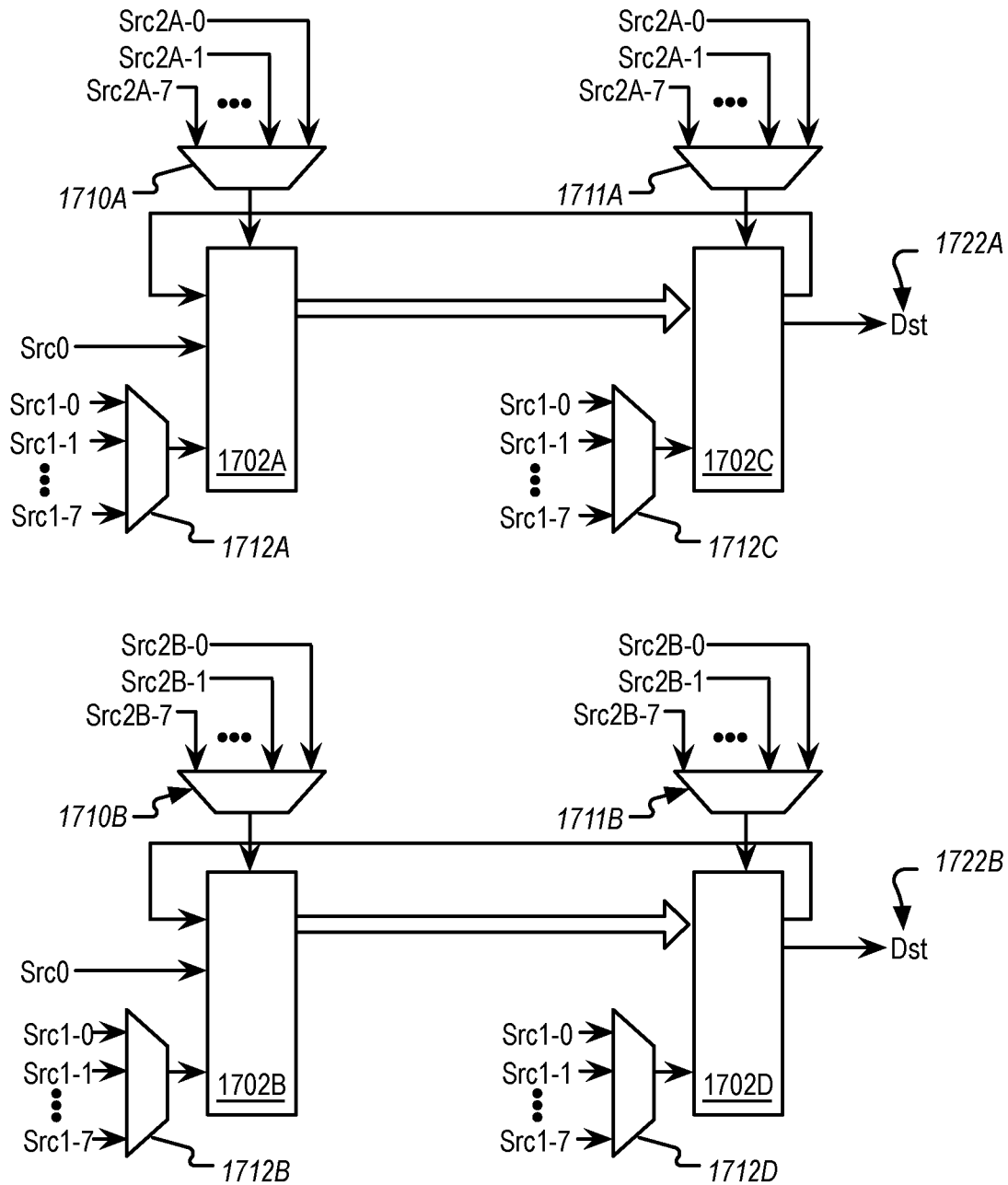

FIG. 17A-17D illustrates a sparse matrix multiply accelerator 1700 using systolic arrays with feedback inputs. FIG. 17A shows a scalable, multi-path sparse matrix multiply accelerator 1700. FIG. 17B illustrates element merge logic within the sparse matrix multiply accelerator 1700. FIG. 17C-17D illustrate merging columns of matrix elements within a sparse matrix.

As shown in FIG. 17A, the sparse matrix multiply accelerator 1700 includes processing elements 1702A-1702D that include arrays of multipliers and adders. In one embodiment, processing elements 1702A-1702D are structurally similar to functional unit 1612 of FIG. 16B. Processing elements 1702A-1702B at the beginning of each path include input logic for Src0. Each stage of each path of scalable sparse matrix multiply accelerator 1700 can receive any element of an independent or shared Src1 via input selectors 1712A-1712D. Each stage of each path can also receive any element of a Src2 input. Independent Src2 inputs can be provided via separate input element selectors (e.g., Src2A via input selector 1710A and input selector 1711A, Src2B via input selector 1710B and input selector 1711B). The separate Src2 input enables the separate paths to compute different instructions if necessary, although the paths can be used for the same instruction. Separate output logic 1722A-1722B is present for each path to enable output for the different instructions. A feedback loop can be used to feed output from processing elements 1702C-1702D back to processing elements 1702A-1702B to enable any number of systolic pipeline stages.

Output 1722A-1722B from the final stage is labeled as Dst. Where d=the systolic depth and e=the number of data elements per channel, the output of a channel is described by equation (2) below:

$$Dst_i = Src0_i + \sum_{j=0}^{d}\sum_{k=0}^{e}(Src1 + j)_{element\ k\ of\ channel\ i} * Src2_{element\ k\ of\ channel\ j} \quad (2)$$

As shown in equation (2), each channel can include multiple data elements on which operations are performed in parallel. In one embodiment, each channel represents a four element data vector, although a different number of elements can be configured for each channel. In one embodiment, the number of data elements within a channel can vary based on the size of each data element. Dot products can be performed using, for example, four element vectors with 8-bit data types per element, two element vectors with 16-bit data types, eight element vectors with 4-bit data types (e.g., INT4), or 16 element vectors with 2-bit data types (e.g., INT2). The number of channels can be automatically adjusted depending on the datatype of Src1 and Src2. An instruction can also specify a required systolic depth to be used for the instruction.

In one embodiment the processing elements 1702A-1702D may read inputs 1710A-1710B, 1711A-1711B directly from the general-purpose register file. In one embodiment systolic array 1700 includes logic to read inputs 1710A-1710B, 1711A-1711B from the general purpose register file and store input data in registers, buffers, or memory that is internal to the systolic array. Internal logic can then feed the input data elements to the processing elements 1702A-1702D for processing. Output 1722A-1722B can be written to internal registers or memory of the systolic array 1700 and/or written directly to the general-purpose register file.

Matrix Multiply with Random Sparsity

Embodiments described herein provide hardware and an associated processing technique that builds on top of the inner-product systolic array described herein, which accepts a first matrix (Matrix A) as broadcast vector input, a second matrix (Matrix B) as stationary matrix input, and multiplies Matrix A with Matrix B and adds to the third input Matrix C to produce output Matrix D using the formula:

$$D=A*B+C$$

Matrix accelerators described herein can take advantage of sparsity in one input matrix, while treading other inputs as dense matrices. The zero value elements in an input vector are filled with non-zero values from a paired input vector input elements positions within a vector that are zeros are filled with non-zero elements in order to fully utilize ALUs in a systolic array. This is achieved by merging input vectors before providing the vectors to the systolic array. This invention merges input vectors at accumulation dimension so it has no impact on output matrix. Unlike structured sparsity, random sparsity doesn't not guarantee perfect merging which leaves no residuals. The sparsity is increased in residual vectors and some of them will be fully empty after merging. The speedup is achieved by skipping empty vectors. This invention merges remaining residual vectors with input vector of next iteration.

To multiply with merged sparse input vector, two iteration worth of stationary Input B is stored in systolic array. Metadata of Vector A is sent along with input itself for systolic array to determine which B element to select. There is no change to the flow of how input Matrix C and output Matrix D are processed, except for higher throughput.

Structured sparsity is treated as special case of random sparsity. Taking Input A with structured sparsity, every other iteration is fully empty and completely skipped. In this case, this invention provides similar performance improvement as other technique only handle structured sparsity.

As shown in FIG. 17B, in one embodiment the sparse matrix multiply accelerator 1700 includes or couples with memory 1720 that can store matrix elements 1722 for a Matrix A (e.g., Src2) input and matrix elements 1724 for a Matrix B (e.g., Src1) input. A load unit 1731 can load a subset of matrix element 1722 into a memory or register of the sparse matrix multiply accelerator 1700. An element merge unit 1742 can merge elements in a first set of column vectors into a second set of column vectors. Output of the element merge unit 1742 can be stored in a matrix element buffer and fed to the functional units 1702 (e.g., 1702A-

1702D) via a feed unit 1744 for Matrix A input (e.g., Src2 input). The merge process can generate metadata 1732 that indicates the original position of an element. The metadata 1732 can be used by a load unit 1737 to determine how to order vector elements of a Matrix B input vector, which is fed to the functional units via an additional feed unit 1738.

As shown in FIG. 17C, a first group of vectors from a sparse input matrix can be a first element group 1746 and a second group of vectors from the sparse input matrix can be a second element group 1747. The element merge unit 1742 can perform an operation 1751 to merge non-zero elements from the first element group 1746 into the second element group 1747. In one embodiment, each element group includes four vectors having four elements per vector. For a given vector, if any non-zero elements of a vector in the first element group 1746 can be merged into a corresponding vector of the second element group 1747, then those non-zero elements are merged into the second element group 1747. The original vector in the first element group 1746 becomes more sparse than before the merge, and in some instances may become fully sparse.

As shown in FIG. 17D, the element merge unit 1742 can generate post-merge elements 1752 in which non-zero values in a pair of corresponding vectors of a sparse input are coalesced into one of the pair of vectors. The efficiency of the parallel compute operations is increased for vectors that become more dense, while multiply operations for vectors that become fully sparse may be skipped.

FIG. 18 illustrates operations 1800 for a matrix multiply in which random sparsity is handled via element merges. A matrix multiply operation M×K×N generally accumulates results at K dimension through multiple iterations on inner-product systolic array (e.g., sparse matrix multiply accelerator 1700 of FIG. 17). Elements of a first matrix 1810 (Matrix B, Src1) are loaded as stationary vector input and elements of a second matrix 1820 (Matrix A, Src0) are loaded as broadcast matrix input. Results of the matrix multiply operation performed between Matrix A and Matrix B are accumulated with a third matrix 1830 (Matrix C, Src0), which in some configurations may also be configured as a destination matrix (Matrix D, Dst). Depending on the size of the input, multiple iterations using multiple submatrix tiles are performed to process an entire matrix. Each iteration operates on submatrix tiles from each input. During each iteration, a previous partial sum or set of initial values is loaded, along with two input matrix tiles. A multiply and add operation is performed and a partial sum is stored to storage. To utilize sparsity in Matrix A, two input tiles 1822 are loaded and merged together to remove zeros in the input. The two input tiles 1822 of Matrix A are processed with two input tiles 1812 of Matrix B. Elements selected from one of input tiles 1812 of Matrix B are multiplied by merged elements in a merge recipient tile of the input tiles 1822 of Matrix A. Metadata generated during the merge of columns in the input tiles 1822 of Matrix A can be used to select elements from the two input tiles 1812 of Matrix B to feed to processing elements of the matrix accelerator. Vector merging is shown in FIG. 17C-17D. The use of vector merging to merge columns across two interactions of input tiles is shown in FIG. 19.

Figure 19:
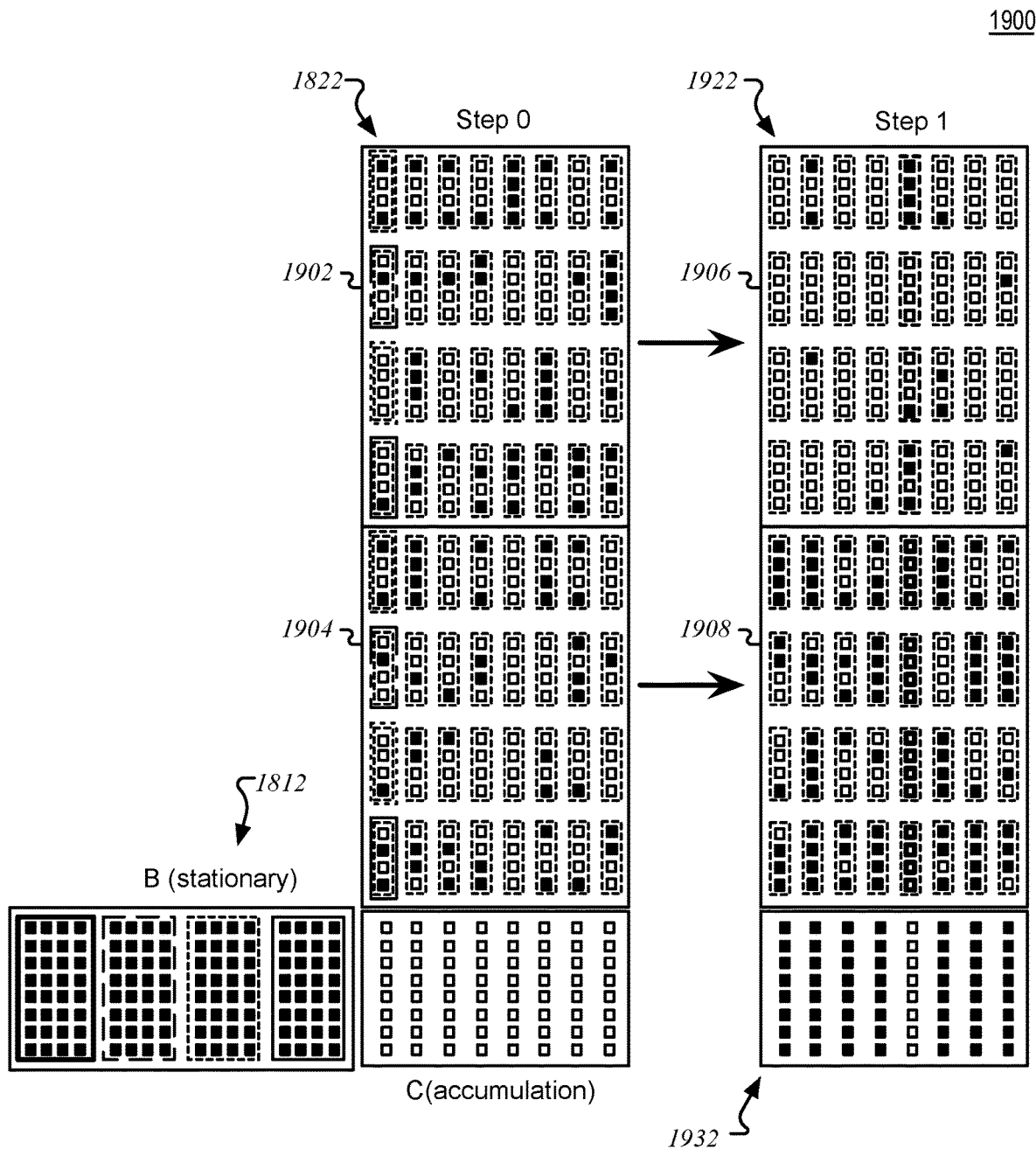
FIG. 19 illustrates operations for column merging to handle random sparsity in an input matrix of a matrix accelerator.

FIG. 19 illustrates operations 1900 for column merging to handle random sparsity in an input matrix of a matrix accelerator. At Step 0, the two input tiles 1822 of the second matrix 1820 (Matrix A) are shown with exemplary original values before the merge. The two input tiles 1812 of the first matrix 1810 are treated as dense matrices and are not merged. At Step 1, each column of a first tile 1902 of the two input tiles 1812 of the first matrix 1810 are merged with a corresponding column of a second tile 1904 of the two inputs 1822. In one embodiment, each column is divided into 4-element groups or vectors, and each pair of groups are merge together to consolidate zero and non-zero values. In such embodiment, elements are merged within the vector or group of elements. However, other embodiments can enable free-form merging across tiles. Metadata is generated to record the element swaps that occur while merging. In various embodiments, the metadata can differ based on the underlying implementation of the merge hardware. In one embodiment, metadata is stored for each vector or element group to indicate the merging pattern of each group pair. In such embodiment, the merge pattern may be referenced indirectly via a look-up table. In one embodiment, a bitfield can be generated for a tile that indicates the position in the original vector or group for an element that is merged.

In one embodiment, merging is performed for each pair of columns within the tiles unless the entire column to of the second tile 1904 is empty. For that case, the merge operation is bypassed for the column, as multiply operations for a fully sparse column may be skipped. A result of an exemplary merge of the first tile 1902 into the second tile 1904 is shown as the two input tiles 1922 of Step 1, which include a residual tile 1906 and a merged tile 1908. Elements of the merged tile 1908 can be transmitted for processing by processing elements of the systolic array, along with metadata that is generated during the merge operation. Elements from two blocks of Input B (e.g., the two input tiles 1812 of Matrix B) are sent to the systolic array during an iteration. In one embodiment, the two sets of elements from Input B are stored at each processing unit of the systolic array as stationary input. The systolic array processing can use one or more multiplexers positioned in front of input B unit to shuffle input elements before processing (e.g., via input selectors 1712A-1712D of FIG. 17A). The multiplexers can use the merge metadata to select the corresponding input B element to multiply with the merged elements from input A to compensate for the position shifts caused by the merge. In one embodiment, instead of sending the entirety of the two sets of elements from input B, only selected elements are sent, with the selected elements to send being determined according to the merge metadata.

If all groups or vectors of a column are determined to be empty, operations for the entire column can be skipped and the systolic array and proceed directly to the next column, as the resulting partial sum associated with the entire column will be zero. The more columns that are empty in input block A, the higher the speed-up that is achieved on the systolic array. Input Matrix C and output Matrix D are processed in the same fashion as in the dense matrix multiply case. Given a zero value accumulation matrix, output of the matrix operation that is performed between the second tile 1904 of elements from input block A and the two input tiles 1812 of input block B is shown as output matrix 1932, which includes a zero value column that corresponds to the fully zero value column of the second tile 1904 of elements from input Block A. While the output matrix 1932 is otherwise dense, speedup or power saving may be realized for each sparse group or vector of elements within a column of the merged input. Increased processing efficiency may be realized for those groups or vectors of elements that are made more dense within the column of merged input.

FIG. 20 illustrates a successive set of operations 2000 that are performed to merge residual input elements during a successive iteration. Two input tiles 2022 of elements associated with input block A can be merged, where one of the two tiles includes residual elements from the previous merge and another of the two tiles includes previously unprocessed elements. Zero value elements within the vectors or groups of elements of the residual tile of the previous merge can be replaced with non-zero values of a corresponding group or vector of the previously unprocessed tile. The tile having the merged elements can be multiplied by elements selected from one of the two input tiles 2012 associated with input block B based on merge metadata. As with the operations 1800 of FIG. 18, elements of the two input tiles 2012 associated with input Block B can be selected based on the metadata output from the merge operation based on the original position of an element in the merged tiled. The output matrix 1932 from the previous iteration is read as input and added to the results of the multiply operation performed.

Figure 21:
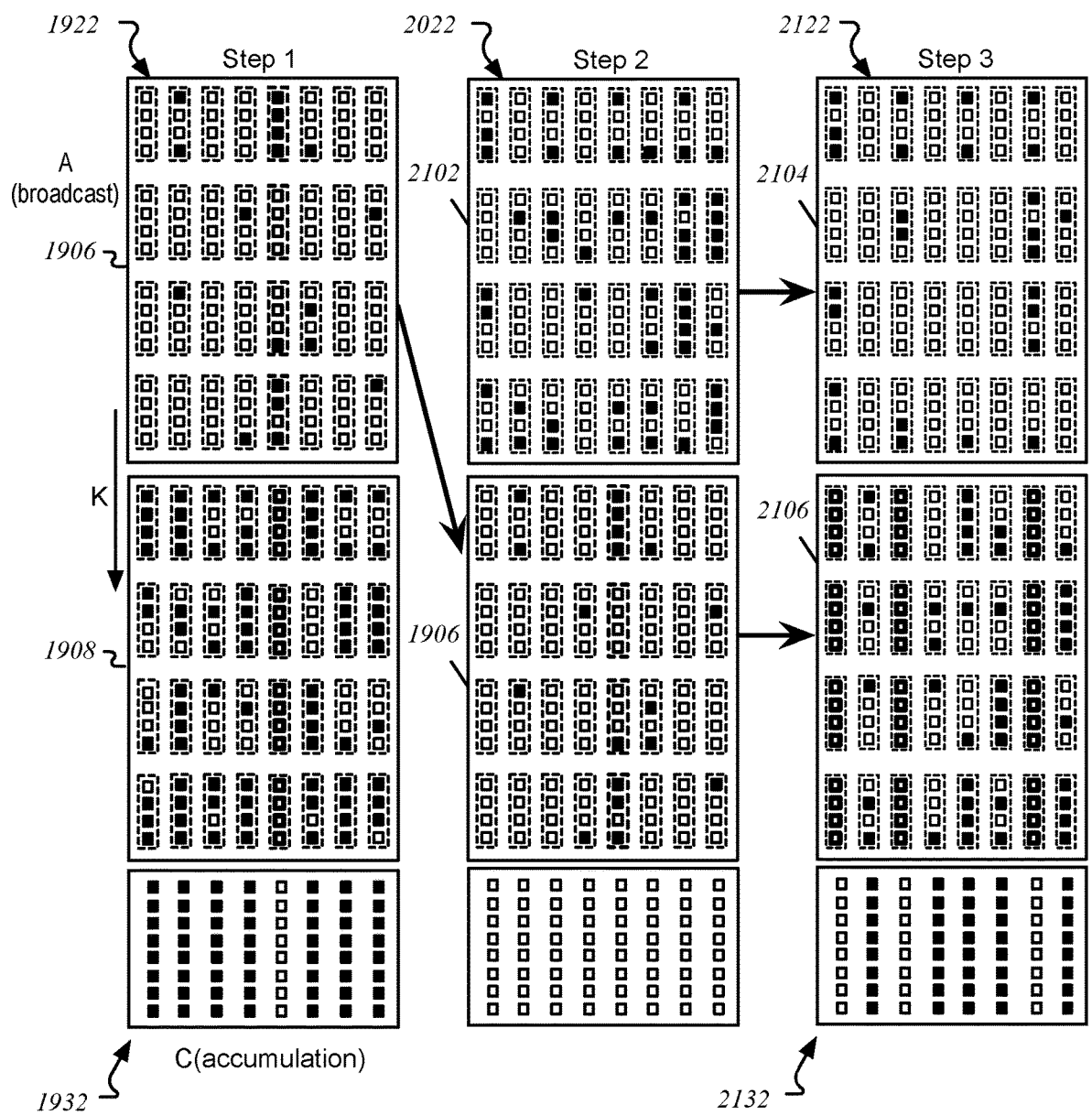
FIG. 21 illustrates operations for a second round of merging.

FIG. 21 illustrates operations 2100 for a second round of merging. The two input tiles 1922 of Step 1 (residual tile 1906, merged tile 1908) are shown. Accumulation operations along the K dimension continue with Step 2. Two input tiles 2022 of Step 2 include an incoming tile 2102 and the residual tile 1906 Step 1. In Step 3, elements of the incoming tile 2102 are merged with elements of the residual tile 1906 to create a new pair of input tiles 2122 that includes a new residual tile 2104 and a new merge tile 2106. The merging process is repeated for each iteration and is performed for each pair of associated columns except if the destination column of the pair is full empty. For example, the illustrated new merge tile 2106, which is the residual of the previous merge, includes three columns that are entirely zero. Merging into those columns are bypassed, as the multiply operation for those columns can be entirely skipped, as reflected in the output matrix 2132 that is generated after the iteration associated with Step 3.

The merging process described above can be performed as an on-the-fly operation for deep learning network training process. Furthermore, the merging process enables the handling of random sparsity in feature maps, which may not be able to be pruned into structured sparsity patterns as with weights. In one embodiment, merging can also be performed as an offline operation for weights that are used for inference applications. Additionally, while the merging of columns within two tiles is described, embodiments described herein can be configured to merge columns of two or more tiles. Merging can be performed for vectors of elements within a vector register file or packed elements that are configured to be distributed to scalar thread engines. While vectors/groups of four elements are illustrated, embodiments are not limited to any particular number of elements per vector or group, and elements can be merged within groups of two, four, eight, or sixteen or more elements depending on the size of the elements and the implementation of the processing elements of the systolic array, matrix accelerator, or tensor processor that implements the techniques described herein.

Experimental throughput increases are shown for an 8-deep systolic array that is configured to process 32-bit input. The systolic array can be configured as a 16-deep systolic array for 16-bit floating point input or a 32-deep systolic array for 8-bit integer input.

The speedup that will be realized from the random sparsity support described herein depends on the level of sparsity, data format, and size of input at the accumulation dimension. The results also depends on sparsity patterns in the sparse input matrix. Structurally sparse input enables a predetermined performance lift, for instance a 2× speedup from 50% structured sparsity with this scheme. While random sparsity may provide lower gains for the same level of sparsity, as the opportunity for merging zeros into empty vectors may be reduced for random and unstructured sparsity, random sparsity implementations support a higher level of sparsity, as the degree of sparsity is not restricted by a sparsity pattern. Accordingly, the potential gains for an architecture having support for random and unstructured sparsity are higher in comparison to structured sparsity implementations.

Figure 22:
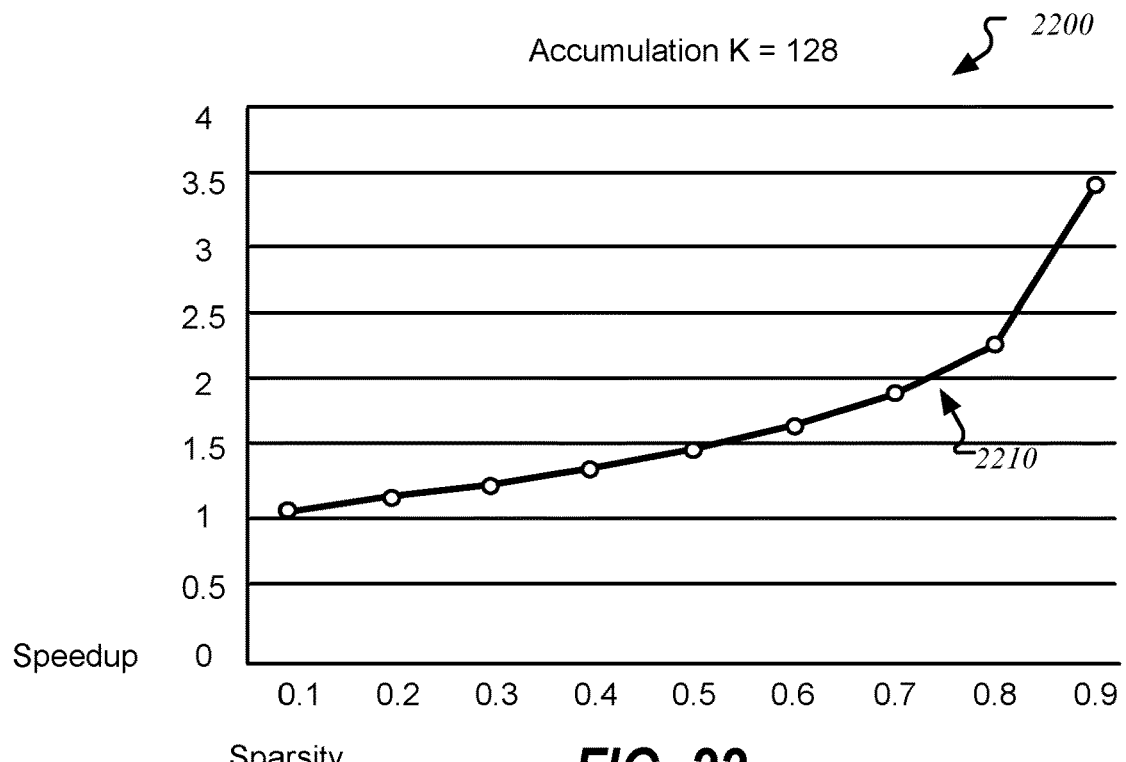
FIG. 22 and FIG. 23 illustrate throughput gains for a matrix multiply unit having support for random sparsity.
Figure 23:
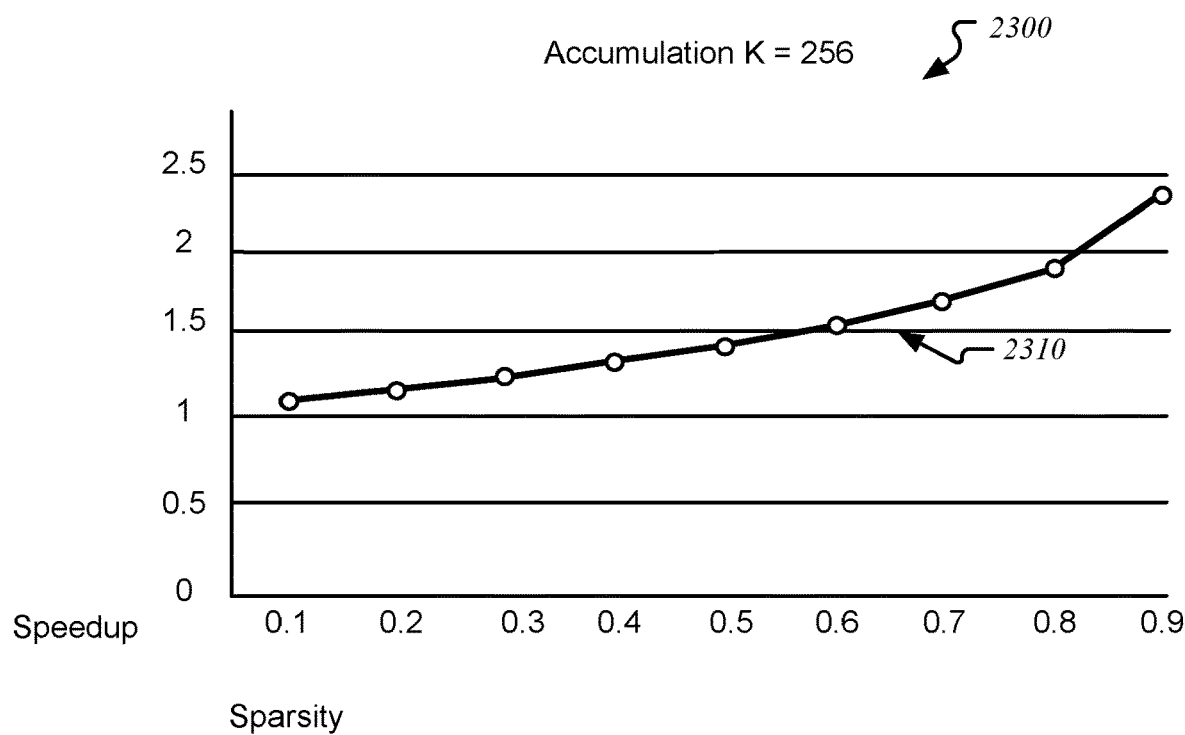

FIG. 22 and FIG. 23 illustrate throughput gains for a matrix multiply unit having support for random sparsity. FIG. 22 illustrates exemplary throughput gain 2200 for a 16-deep systolic array having 16-bit floating-point input. FIG. 23 illustrates exemplary throughput gain 2300 for a 32-deep systolic array having 8-bit integer input. The illustrated speedups 2210, 2310 occur with a fully randomized input Matrix A, with a sweep of multiple sparsity levels. Performance benefits rise as sparsity level increases for both the 16-bit floating point input shown in FIG. 22 and the 8-bit integer input of FIG. 23, with sizes of accumulation in the K dimension of K=128 for FIG. 22 and K=256 for FIG. 23. As noted in the exemplary throughput gains, the techniques described herein show a performance improvement even in the presence of low sparsity. Accordingly, the techniques described herein can be generally enabled in hardware without a negative impact to performance when operating on dense matrices. However, separate sparse and non-sparse instructions may be provided to enable power saving by enabling the matrix multiply logic to disable zero detection and merge logic when inputs are known to be dense. In one embodiment the hardware can be configured to automatically disable zero detection and merge logic for dense input.

Figure 24:
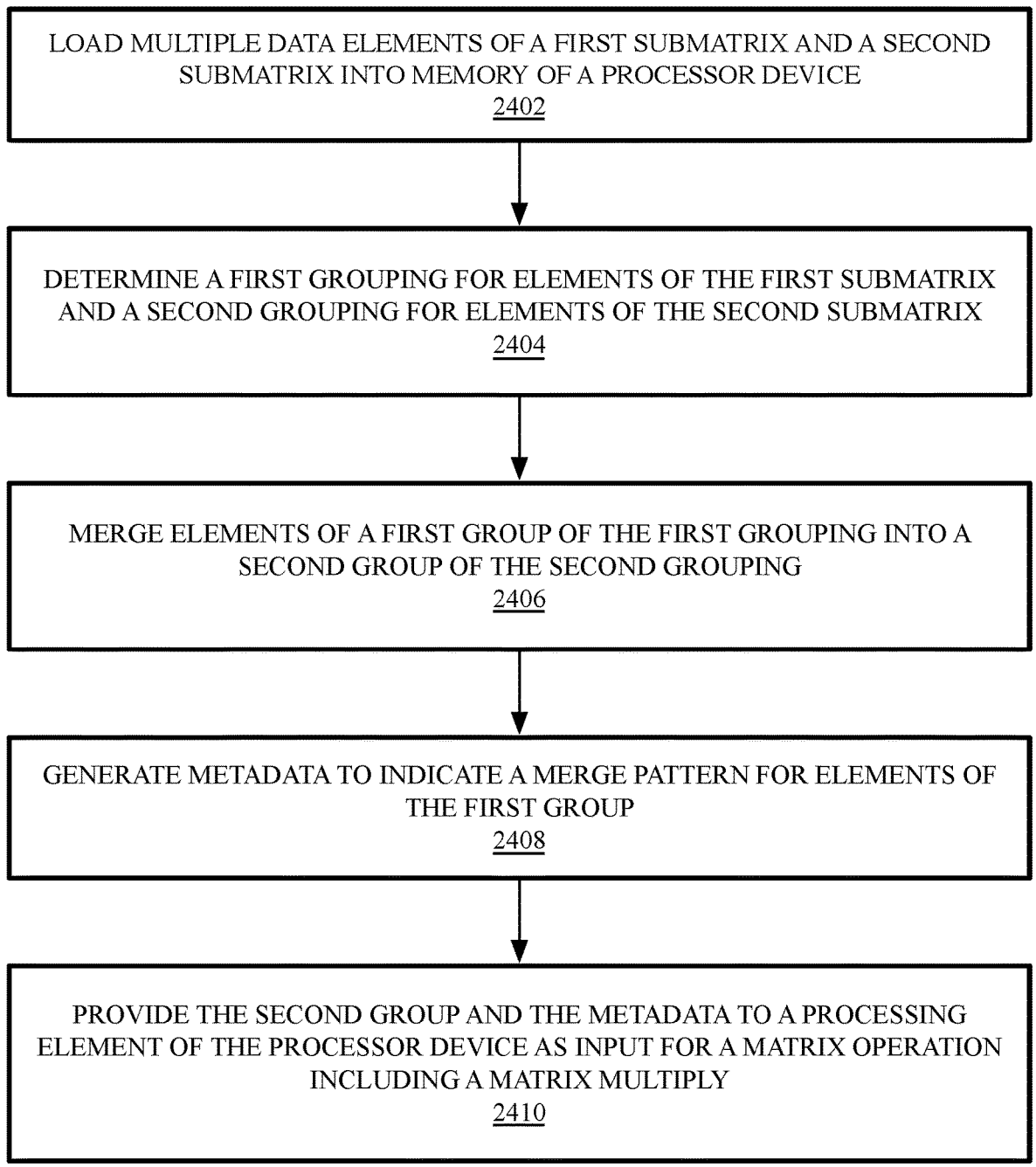
FIG. 24 illustrates a method of merging sparse matrix input having random sparsity.

FIG. 24 illustrates a method 2400 of merging sparse matrix input having random sparsity. The method 2400 of FIG. 24 can be performed by hardware or firmware logic of a matrix accelerator unit of a graphics processor, compute accelerator, or other computing device, including a general-purpose computing device (CPU) or a field programmable gate array (FPGA). In some embodiments, a subset of operations can be performed by driver, compute framework logic, or machine learning framework logic associated with a processor or accelerator.

Logic configured to implement method 2400 can perform an operation to load multiple data elements of a first submatrix and a second submatrix into memory of a processor device (2402). The memory can be a memory within or coupled with a matrix accelerator unit of a processor device. In one embodiment the matrix accelerator includes include a systolic array of processing units. The logic can then determine a first grouping of elements of the first submatrix and a second grouping of elements of the second submatrix (2404). The first grouping and the second grouping can each include multiple groups, where each group in the first grouping has a corresponding group in the second grouping. Corresponding groups can be groups that are stored at the same location in the respective submatrices. For example, a group at the given row and column index of the first matrix has a corresponding group at the same row and column index of the second matrix.

In one embodiment, the groupings correspond with multiple-element vectors that are read from or stored to vector registers within the processor and/or matrix accelerator unit. In one embodiment the vectors include four matrix elements, although embodiments are not so limited. The number of elements within a vector can vary based on the size of the data elements and the size of the vector register. The groupings can also correspond with packed data elements that are to be provided to scalar compute units, for example in a single instruction, multiple thread (SIMT) GPU.

The logic can then perform an operation to merge elements of a first group of the first grouping into a second group of the second grouping (2406). In one embodiment the second group, in to which elements are merged, is the corresponding group of the first group and is located at the same row and column index of the second submatrix as the first group is located in the first submatrix. In one embodiment, the merge process includes to read an element from the first group and determine if space exists within the second group at the corresponding location of the first group. Space exists within the second group if one or more elements of the second group are zero. If space exists in the second group, the first group and the second group can swap the corresponding elements, such that the zero value is written to the first group and the non-zero value is written to the second group. In one embodiment, instead of explicitly swapping elements, the non-zero value can be written to the second group and the original location in the first group can be cleared. The merge process can then repeat for each element in the first group until all values in the second group are non-zero.

The logic can then generate metadata to indicate a merge pattern for elements of the first group (2408). The metadata can include a bitfield that indicates an original position of a merged element in the original group from which the element is read. Other metadata formats may also be used. The logic can then provide the second group and the metadata to a processing element of the processor device as input for a matrix operation including a matrix multiply (2410). The second group can be provided as input along with elements of a third and fourth submatrix of a second input matrix, where elements are selected from the third or fourth submatrix based on the metadata.

Figure 25B:
Figure 25C:
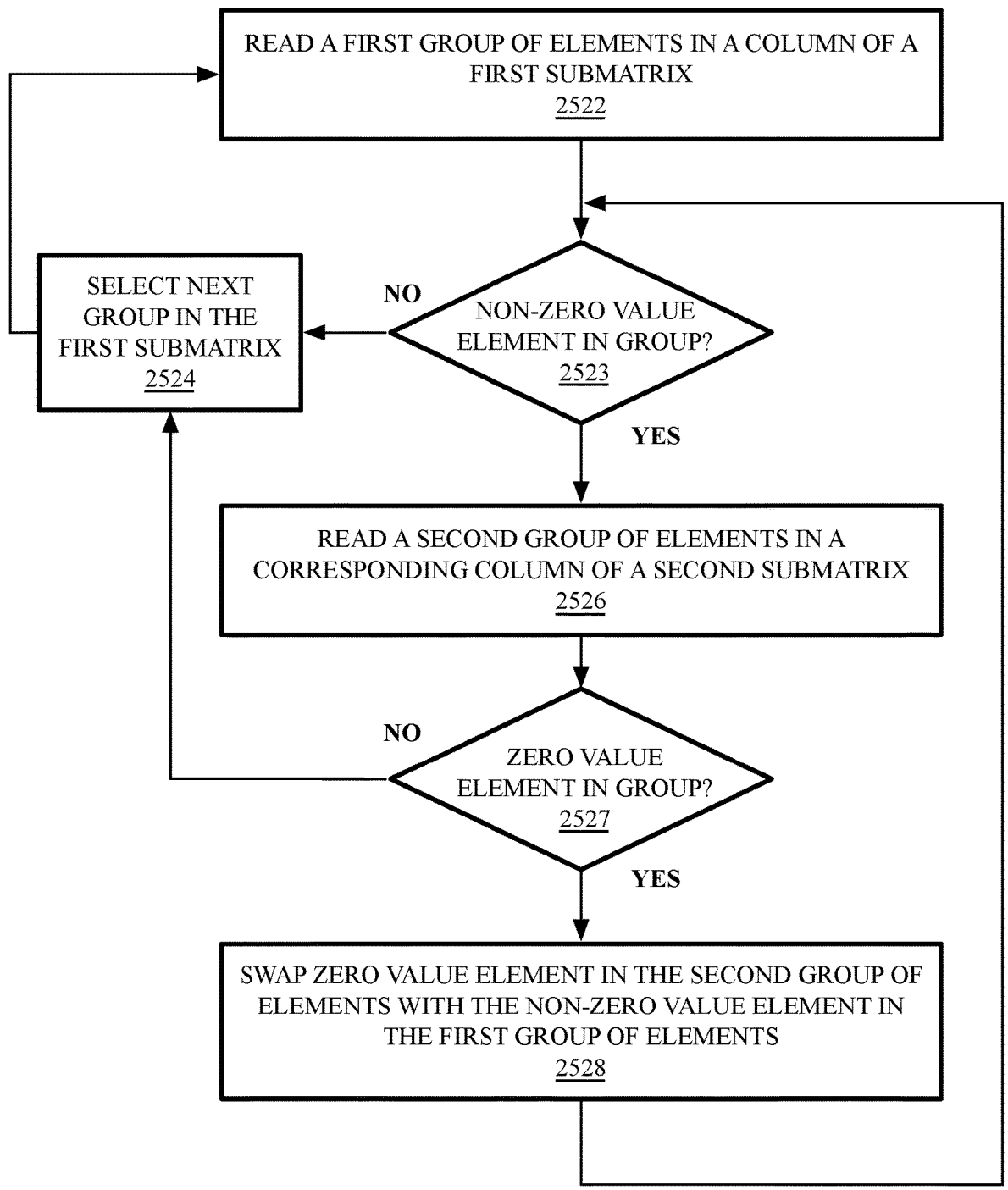

FIG. 25A-25C illustrates methods 2500, 2510, 2520 of handling random sparsity of an input matrix during a matrix multiply operation. The methods 2500, 2510 can be performed by hardware or firmware logic of a matrix accelerator unit of a graphics processor, compute accelerator, or other computing device, including a general-purpose computing device (CPU) or a field programmable gate array (FPGA). In some embodiments, a subset of operations can be performed by driver, compute frame work logic, or machine learning framework logic associated with a processor or accelerator.

As shown in FIG. 25A, logic configured to implement method 2500 can read a first set of two or more tiles of elements associated with a first matrix (2502). The first set of two or more tiles can include two or more submatrix tiles of a matrix input having elements to be broadcast across processing elements of the matrix accelerator unit. The logic can then merge a first group of elements in a first tile of the two or more tiles of elements into a second group of elements of a corresponding group of elements in a second tile of the two or more tiles of elements (2504). The merging can be performed based on operations described with respect to method 2400 of FIG. 24. Merging the first group of elements is performed to reduce the sparsity of the second tile and increases sparsity of the second tile, such that non-zero elements of the first tile are coalesced into the second tile. The merge process produces metadata that indicates an original position for merged elements to enable corresponding elements of a matrix multiply operation to be identified.

The logic can additionally perform an operation to read a second set of two or more tiles of elements associated with a second matrix. The second matrix include elements that will remain stationary within the matrix accelerator during a systolic matrix multiply operation. (2506). The logic can then perform a matrix multiply operation having input including the second group of elements in the second tile and selected elements from the second set of two or more tiles of elements (2508). The selected elements from the second set of two or more tiles are selected based on the metadata generated based on the merging, such that the matrix multiply operation is performed between the correct elements, as though the merge process did not occur.

As shown in FIG. 25B, during the merge operation and the matrix operation, the operations can be skipped when an entire column of a submatrix tile is zero, as the dot product associated with that column will be zero. According to method 2510, merge logic, during a merge operation, can bypass a merge of a first column of elements into a second column of elements when all elements of the second column are zero (2512). Additionally, matrix multiply logic, during a matrix multiply operation, can bypass a dot product operation including the aforementioned second column of elements when all elements of the second column are zero (2514).

As shown in FIG. 25C, according to method 2520, the merge operation, in one embodiment, is performed on corresponding groups within columns of submatrix tiles of an input matrix for a matrix multiply operation. Method 2520 include operations performed by logic such as an element merge unit 1742 of FIG. 17B. The operations include read a first element of a first group of elements (2522). The first group of elements can be elements of a vector stored in a vector register or an element in a packed group of elements. The operations additionally include to determine whether there is a non-zero value element in the first group (2523). If there are no non-zero values in the first group ("No," 2523), the logic can select the next group in the first submatrix (2524). In one embodiment the next group is the next group along the K dimension in the same column as the first submatrix. If there is a non-zero value element in the first group ("Yes", 2523), the logic can read a second group of elements in a corresponding column of a second submatrix (2526). The second group of elements is a group of elements of the same size and at the same location in the second submatrix as the first group in the first submatrix. If there is a zero value element in the second group ("Yes", 2527), the logic can swap the zero value element in the second group of elements with the non-zero value element in the first group of elements (2528). The logic can then determine if additional non-zero value elements remain in the first group (2523). If there are no zero value elements in the second group ("No", 2527), the logic can select the next group in the first submatrix (2524) and operations can continue by reading the selected next group (2522).

According to the above disclosure, one embodiment described herein provides a method comprising loading multiple data elements of a first submatrix and a second submatrix into memory of a processor device, determining a first grouping of elements of the first submatrix and a second grouping of elements of the second submatrix, wherein the first grouping and the second grouping include multiple groups and each group in the first grouping has a corresponding group in the second grouping, merging elements of a first group of the first grouping into a second group of the second grouping, wherein the second group is the corresponding group of the first group, generating metadata to indicate a merge pattern for elements of the first group, and providing the second group and the metadata to a processing element of the processor device as input for a matrix operation including a matrix multiply.

A further embodiment provides a method comprising reading a first set of two or more tiles of elements associated with a first matrix, merging a first group of elements in a first tile of the two or more tiles of elements into a second group of elements of a corresponding group of elements in a second tile of the two or more tiles of elements, wherein merging the first group of elements reduces sparsity of the second tile and increases sparsity of the second tile and generates metadata based on the merging of the first group of elements into the second group of elements, reading a second set of two or more tiles of elements associated with a second matrix, and performing a matrix multiply operation having input including the second group of elements in the second tile and selected elements from the second set of two or more tiles of elements, the selected elements from the second set of two or more tiles selected based on the metadata generated based on the merging.

Additional Exemplary Computing Device

Figure 26:
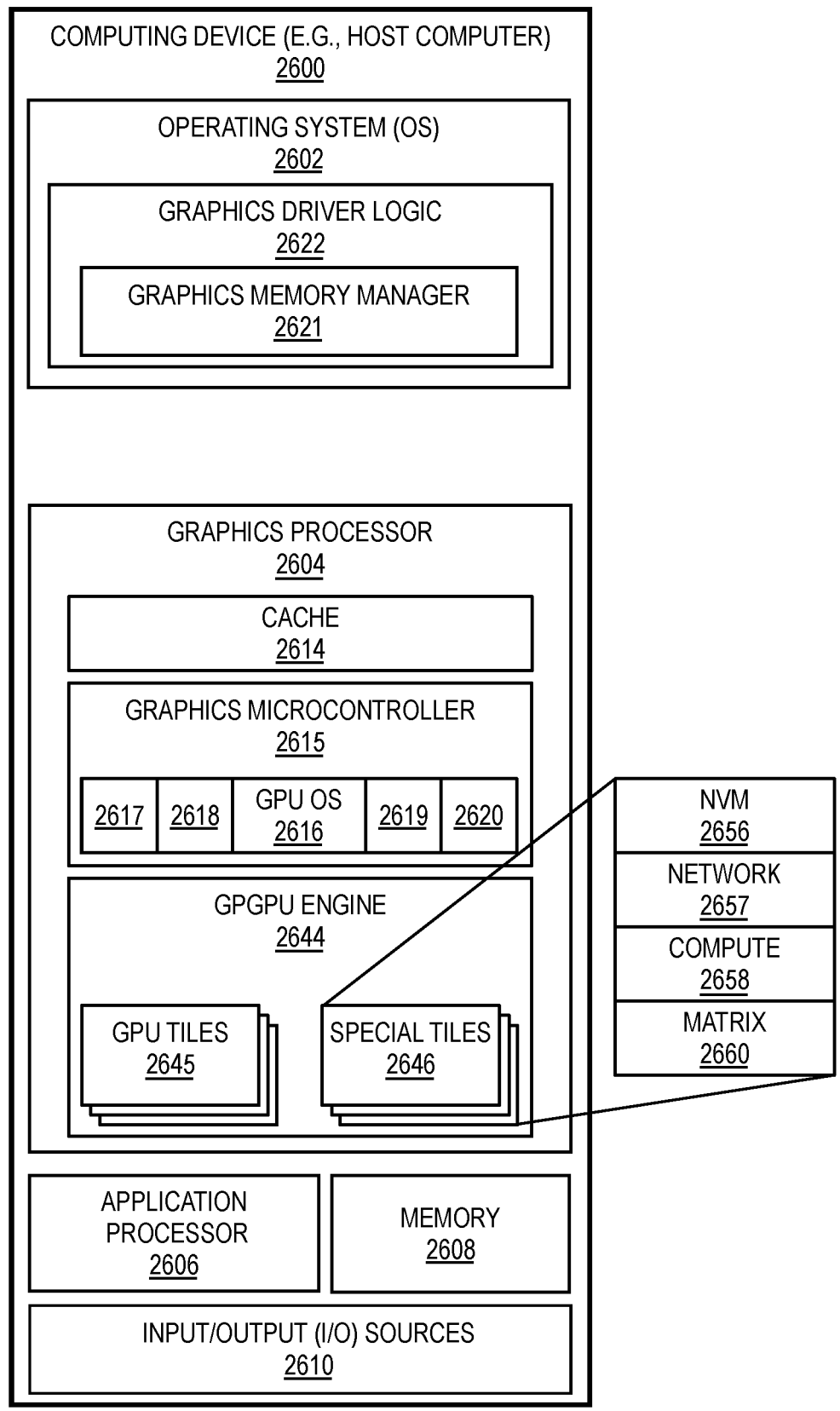
FIG. 26 is a block diagram of a computing device including a graphics processor, according to an embodiment.

FIG. 26 is a block diagram of a computing device 2600 including a graphics processor 2604, according to an embodiment. Versions of the computing device 2600 may be or be included within a communication device such as a set-top box (e.g., Internet-based cable television set-top boxes, etc.), global positioning system (GPS)-based devices, etc. The computing device 2600 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2600 includes a mobile computing device employing an integrated circuit ("IC"), such as system on a chip ("SoC" or "SOC"), integrating various hardware and/or software components of computing device 2600 on a single chip. The computing device 2600 can be a computing device such as the data processing system 100 as in of FIG. 1.

The computing device 2600 includes a graphics processor 2604. The graphics processor 2604 represents any graphics processor described herein. In one embodiment, the graphics processor 2604 includes a cache 2614, which can be a single cache or divided into multiple segments of cache memory, including but not limited to any number of L1, L2, L3, or L4 caches, render caches, depth caches, sampler caches, and/or shader unit caches. In one embodiment the cache 2614 may be a last level cache that is shared with the application processor 2606.

In one embodiment the graphics processor 2604 includes a graphics microcontroller that implements control and scheduling logic for the graphics processor. The control and scheduling logic can be firmware executed by the graphics microcontroller 2615. The firmware may be loaded at boot by the graphics driver logic 2622. The firmware may also be programmed to an electronically erasable programmable read only memory or loaded from a flash memory device within the graphics microcontroller 2615. The firmware may enable a GPU OS 2616 that includes device management/driver logic 2617, 2618, and a scheduler 2619. The GPU OS 2616 may also include a graphics memory manager 2620 that can supplement or replace the graphics memory manager 2621 within the graphics driver logic 2622.

The graphics processor 2604 also includes a GPGPU engine 2644 that includes one or more graphics engine(s), graphics processor cores, and other graphics execution resources as described herein. Such graphics execution resources can be presented in the forms including but not limited to execution units, shader engines, fragment processors, vertex processors, streaming multiprocessors, graphics processor clusters, or any collection of computing resources suitable for the processing of graphics resources or image resources, or performing general purpose computational operations in a heterogeneous processor. The processing resources of the GPGPU engine 2644 can be included within multiple tiles of hardware logic connected to a substrate, as illustrated in FIG. 11B-11D. The GPGPU engine 2644 can include GPU tiles 2645 that include graphics processing and execution resources, caches, samplers, etc. The GPU tiles 2645 may also include local volatile memory or can be coupled with one or more memory tiles, for example, as shown in FIG. 3B-3C.

The GPGPU engine 2644 can also include and one or more special tiles 2646 that include, for example, a non-volatile memory tile 2656, a network processor tile 2657, and/or a general-purpose compute tile 2658. The GPGPU engine 2644 also includes a matrix multiply accelerator 2660. The general-purpose compute tile 2658 may also include logic to accelerate matrix multiplication operations. The non-volatile memory tile 2656 can include non-volatile memory cells and controller logic. The controller logic of the non-volatile memory tile 2656 may be managed by one of device management/driver logic 2617, 2618. The network processor tile 2657 can include network processing resources that are coupled to a physical interface within the input/output (I/O) sources 2610 of the computing device 2600. The network processor tile 2657 may be managed by one or more of device management/driver logic 2617, 2618.

The matrix multiply accelerator 2660 is a modular scalable sparse matrix multiply accelerator as described herein. The matrix multiply accelerator 2660 can includes multiple processing paths, with each processing path including multiple pipeline stages. Each processing path can execute a separate instruction. In various embodiments, the matrix multiply accelerator 2660 can have architectural features of any one of more of the matrix multiply accelerators described herein. For example, in one embodiment, the matrix multiply accelerator 2660 is a four-deep systolic array 1700 with a feedback loop that is configurable to operate with a multiple of four number of logical stages (e.g., four, eight, twelve, sixteen, etc.). In one embodiment the matrix multiply accelerator 2660 includes one or more instances of a two-path matrix multiply accelerator 1900 with a four stage pipeline or a four-path matrix multiply accelerator 2000 with a two stage pipeline. In one embodiment the matrix multiply accelerator 2660 includes processing elements configured as the scalable sparse matrix multiply accelerator 2100 or the scalable sparse matrix multiply accelerator 2300. The matrix multiply accelerator 2660 can be configured to operate only on non-zero values of at least one input matrix. Operations on entire columns or submatrices can be bypassed where block sparsity is present. The matrix multiply accelerator 2660 can also include any logic based on any combination of these embodiments, and particularly include logic to enable support for random sparsity, according to embodiments described herein.

As illustrated, in one embodiment, and in addition to the graphics processor 2604, the computing device 2600 may further include any number and type of hardware components and/or software components, including, but not limited to an application processor 2606, memory 2608, and input/output (I/O) sources 2610. The application processor 2606 can interact with a hardware graphics pipeline, as illustrated with reference to FIG. 3A, to share graphics pipeline functionality. Processed data is stored in a buffer in the hardware graphics pipeline and state information is stored in memory 2608. The resulting data can be transferred to a display controller for output via a display device, such as the display device 318 of FIG. 3A. The display device may be of various types, such as Cathode Ray Tube (CRT), Thin Film Transistor (TFT), Liquid Crystal Display (LCD), Organic Light Emitting Diode (OLED) array, etc., and may be configured to display information to a user via a graphical user interface.

The application processor 2606 can include one or processors, such as processor(s) 102 of FIG. 1 and may be the central processing unit (CPU) that is used at least in part to execute an operating system (OS) 2602 for the computing device 2600. The OS 2602 can serve as an interface between hardware and/or physical resources of the computing device 2600 and one or more users. The OS 2602 can include driver logic for various hardware devices in the computing device 2600. The driver logic can include graphics driver logic 2622, which can include the user mode graphics driver 1026 and/or kernel mode graphics driver 1029 of FIG. 10. The graphics driver logic can include a graphics memory manager 2621 to manage a virtual memory address space for the graphics processor 2604.

It is contemplated that in some embodiments the graphics processor 2604 may exist as part of the application processor 2606 (such as part of a physical CPU package) in which case, at least a portion of the memory 2608 may be shared by the application processor 2606 and graphics processor 2604, although at least a portion of the memory 2608 may be exclusive to the graphics processor 2604, or the graphics processor 2604 may have a separate store of memory. The memory 2608 may comprise a pre-allocated region of a buffer (e.g., framebuffer); however, it should be understood by one of ordinary skill in the art that the embodiments are not so limited, and that any memory accessible to the lower graphics pipeline may be used. The memory 2608 may include various forms of random-access memory (RAM) (e.g., SDRAM, SRAM, etc.) comprising an application that makes use of the graphics processor 2604 to render a desktop or 3D graphics scene. A memory controller hub, such as memory controller 116 of FIG. 1, may access data in the memory 2608 and forward it to graphics processor 2604 for graphics pipeline processing. The memory 2608 may be made available to other components within the computing device 2600. For example, any data (e.g., input graphics data) received from various I/O sources 2610 of the computing device 2600 can be temporarily queued into memory 2608 prior to their being operated upon by one or more processor(s) (e.g., application processor 2606) in the implementation of a software program or application. Similarly, data that a software program determines should be sent from the computing device 2600 to an outside entity through one of the computing system interfaces, or stored into an internal storage element, is often temporarily queued in memory 2608 prior to its being transmitted or stored.

The I/O sources can include devices such as touchscreens, touch panels, touch pads, virtual or regular keyboards, virtual or regular mice, ports, connectors, network devices, or the like, and can attach via a platform controller hub 130 as referenced in FIG. 1. Additionally, the I/O sources 2610 may include one or more I/O devices that are implemented for transferring data to and/or from the computing device 2600 (e.g., a networking adapter); or, for a large-scale non-volatile storage within the computing device 2600 (e.g., SSD/HDD). User input devices, including alphanumeric and other keys, may be used to communicate information and command selections to graphics processor 2604. Another type of user input device is cursor control, such as a mouse, a trackball, a touchscreen, a touchpad, or cursor direction keys to communicate direction information and command selections to GPU and to control cursor movement on the display device. Camera and microphone arrays of the computing device 2600 may be employed to observe gestures, record audio and video and to receive and transmit visual and audio commands.

The I/O sources 2610 can include one or more network interfaces. The network interfaces may include associated network processing logic and/or be coupled with the network processor tile 2657. The one or more network interface can provide access to a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), $5^{th}$ Generation (5G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing devices described herein may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

One embodiment provides a processing apparatus comprising a tile of processing resources including a general-purpose parallel processing engine and a matrix accelerator, the matrix accelerator including first circuitry to load multiple data elements of a first submatrix and a second submatrix into memory accessible to the matrix accelerator and second circuitry determine a first grouping of elements of the first submatrix and a second grouping of elements of the second submatrix. The first grouping and the second grouping include multiple groups and each group in the first grouping has a corresponding group in the second grouping. The apparatus additionally includes third circuitry to merge elements of a first group of the first grouping into a second group of the second grouping and generate metadata to indicate a merge pattern for elements of the first group. The second group is the corresponding group of the first group. The processing apparatus additionally includes fourth circuitry to provide the second group and the metadata to an array of processing elements within the matrix accelerator as input for a matrix operation.

In one embodiment, the memory accessible to the matrix accelerator is internal to the matrix accelerator. Additionally, the matrix operation to be performed can include a dot product operation. The dot product operation may be a sub-operation of a matrix multiply operation. The array of processing elements can include a systolic array. In one embodiment, to merge elements of a first group of the first grouping into a second group of the second grouping includes to read a first group of elements in a column of the first submatrix, read a second group of elements in a corresponding column of the second submatrix, and swap a non-zero value element in the first group of elements with a zero value element in the second group of elements. To swap the non-zero value element in the first group of elements with the zero value element in the second group of elements includes to write the value of the non-zero value element to a position in the second group of elements and clear the memory that stores the position of the non-zero value element in the first group of elements. In one embodiment, the first group of elements and the second group of elements are multi-element vectors. The group of elements may also be a packed group of elements to be operated on by a scalar and/or SIMT processor. To merge elements of the first group of the first grouping into the second group of the second grouping includes to determine that the column of the second submatrix that includes the second grouping includes only zero value elements and bypass merge operations for the column. In one embodiment, the metadata to indicate the merge pattern for elements of the first group includes a bitfield to indicate an origin position of a merged element.

One embodiment provides an apparatus comprising means for reading a first set of two or more tiles of elements associated with a first matrix, means for merging a first group of elements in a first tile of the two or more tiles of elements into a second group of elements of a corresponding group of elements in a second tile of the two or more tiles of elements, wherein merging the first group of elements reduces sparsity of the second tile and increases sparsity of the second tile and generates metadata based on the merging of the first group of elements into the second group of elements, means for reading a second set of two or more tiles of elements associated with a second matrix, and means for performing a matrix multiply operation having input including the second group of elements in the second tile and selected elements from the second set of two or more tiles of elements, the selected elements from the second set of two or more tiles selected based on the metadata generated based on the merging.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A processing apparatus including:
   a tile of processing resources including a general-purpose parallel processing engine and a matrix accelerator, the matrix accelerator including:
   first circuitry to load multiple data elements of a first submatrix and a second submatrix into memory accessible to the matrix accelerator;
   second circuitry to determine a first grouping of elements of the first submatrix and a second grouping of elements of the second submatrix, wherein the first grouping and the second grouping include multiple groups and each group in the first grouping has a corresponding group in the second grouping;
   third circuitry to merge elements of a first group of the first grouping into a second group of the second grouping, wherein the second group is the corresponding group of the first group, and generate metadata to indicate a merge pattern for elements of the first group; and
   fourth circuitry to provide the second group and the metadata to an array of processing elements within the matrix accelerator as input for a matrix operation.

2. The processing apparatus as in claim 1, wherein the memory accessible to the matrix accelerator is internal to the matrix accelerator.

3. The processing apparatus as in claim 1, wherein the matrix operation to be performed includes a dot product operation.

4. The processing apparatus as in claim 3, wherein the dot product operation is a sub-operation of a matrix multiply operation.

5. The processing apparatus as in claim 4, wherein the array of processing elements includes a systolic array.

6. The processing apparatus as in claim 1, wherein to merge elements of a first group of the first grouping into a second group of the second grouping includes to:
   read a first group of elements in a column of the first submatrix;
   read a second group of elements in a corresponding column of the second submatrix; and
   swap a non-zero value element in the first group of elements with a zero value element in the second group of elements.

7. The processing apparatus as in claim 6, wherein to swap the non-zero value element in the first group of elements with the zero value element in the second group of elements includes to:
   write the value of the non-zero value element to a position in the second group of elements; and
   clear the memory that stores the position of the non-zero value element in the first group of elements.

8. The processing apparatus as in claim 6, wherein the first group of elements and the second group of elements are multi-element vectors.

9. The processing apparatus as in claim 6, wherein to merge elements of the first group of the first grouping into the second group of the second grouping includes to:
   determine that the column of the second submatrix that includes the second grouping includes only zero value elements; and
   bypass merge operations for the column.

10. The processing apparatus as in claim 1, wherein the metadata to indicate the merge pattern for elements of the first group includes a bitfield to indicate an origin position of a merged element.

11. A method including:
loading multiple data elements of a first submatrix and a second submatrix into memory of a processor device;
determining a first grouping of elements of the first submatrix and a second grouping of elements of the second submatrix, wherein the first grouping and the second grouping include multiple groups and each group in the first grouping has a corresponding group in the second grouping;
merging elements of a first group of the first grouping into a second group of the second grouping, wherein the second group is the corresponding group of the first group;
generating metadata to indicate a merge pattern for elements of the first group; and
providing the second group and the metadata to an array of processing elements of the processor device as input for a matrix operation including a matrix multiply.

12. The method as in claim 11, wherein the memory of the processor device is internal to a matrix accelerator of the processor device and the matrix operation to be performed includes a dot product operation.

13. The method as in claim 12, wherein the dot product operation is a sub-operation of a matrix multiply operation.

14. The method as in claim 13, wherein the array of processing elements includes a systolic array.

15. The method as in claim 11, wherein merging elements of a first group of the first grouping into a second group of the second grouping includes:
reading a first group of elements in a column of the first submatrix;
reading a second group of elements in a corresponding column of the second submatrix; and
swapping a non-zero value element in the first group of elements with a zero value element in the second group of elements.

16. The method as in claim 15, wherein swapping the non-zero value element in the first group of elements with the zero value element in the second group of elements includes:
writing the value of the non-zero value element to a position in the second group of elements; and
clearing the memory that stores the position of the non-zero value element in the first group of elements.

17. The method as in claim 15, wherein the first group of elements and the second group of elements are multi-element vectors and merging elements of the first group of the first grouping into the second group of the second grouping includes:
determining that the column of the second submatrix that includes the second grouping includes only zero value elements; and
bypassing merge operations for the column.

18. The method as in claim 11, wherein the metadata to indicate the merge pattern for elements of the first group includes a bitfield to indicate an origin position of a merged element.

19. A system comprising:
a memory device; and
a graphics processor including:
a tile of processing resources including a general-purpose parallel processing engine and a matrix accelerator, the matrix accelerator including:
first circuitry to load multiple data elements of a first submatrix and a second submatrix into memory accessible to the matrix accelerator;
second circuitry to determine a first grouping of elements of the first submatrix and a second grouping of elements of the second submatrix, wherein the first grouping and the second grouping include multiple groups and each group in the first grouping has a corresponding group in the second grouping;
third circuitry to merge elements of a first group of the first grouping into a second group of the second grouping, wherein the second group is the corresponding group of the first group, and generate metadata to indicate a merge pattern for elements of the first group; and
fourth circuitry to provide the second group and the metadata to an array of processing elements within the matrix accelerator as input for a matrix operation.

20. The system as in claim 19, wherein the memory accessible to the matrix accelerator is internal to the matrix accelerator, the matrix operation to be performed includes a dot product operation, and the dot product operation is a sub-operation of a matrix multiply operation.

* * * * *